June 1, 1948.   D. J. STEWART ET AL   2,442,383
GUN FIRE CONTROL PREDICTION COMPUTER
Filed May 30, 1942   28 Sheets-Sheet 1

INVENTORS
Duncan J. Stewart
Howard D. Colman
By Parker, Carlson, Pitzner & Hubbard
ATTORNEYS

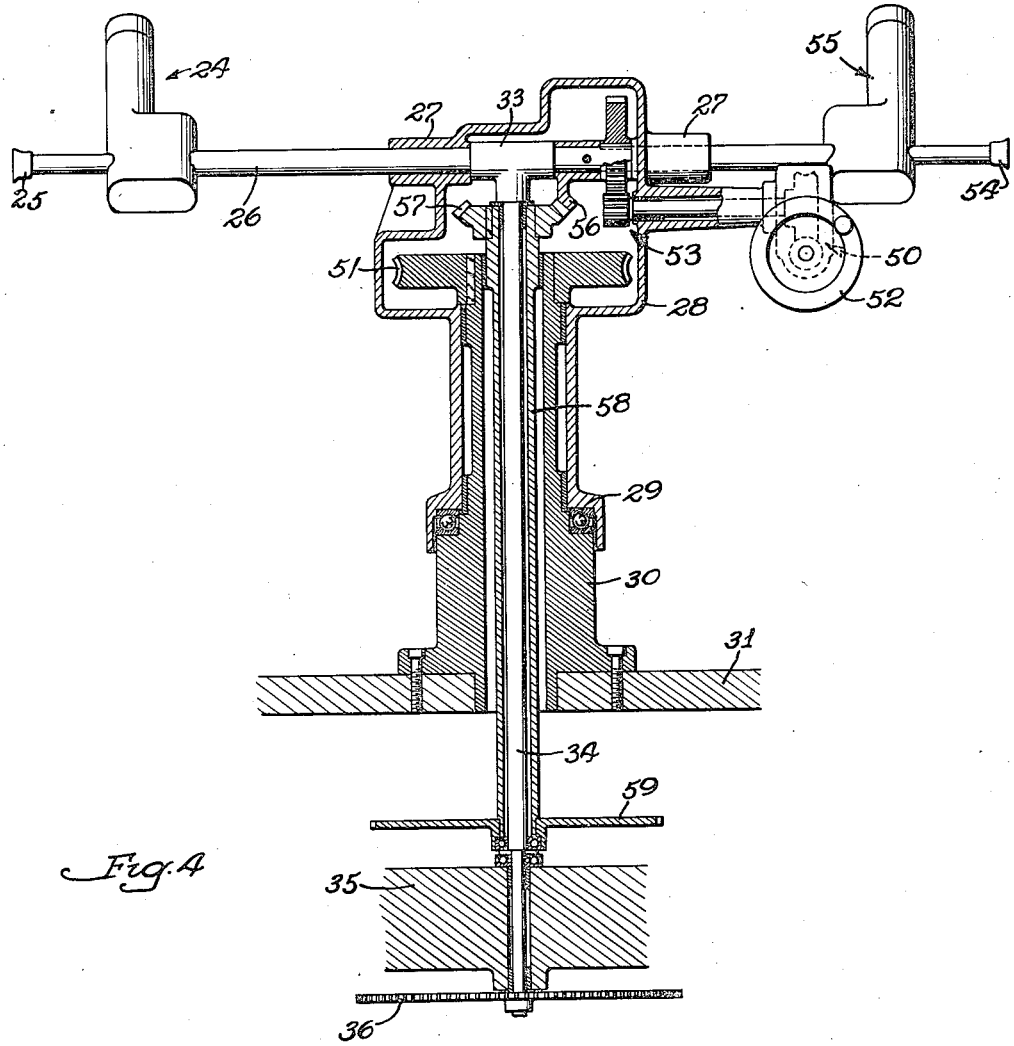

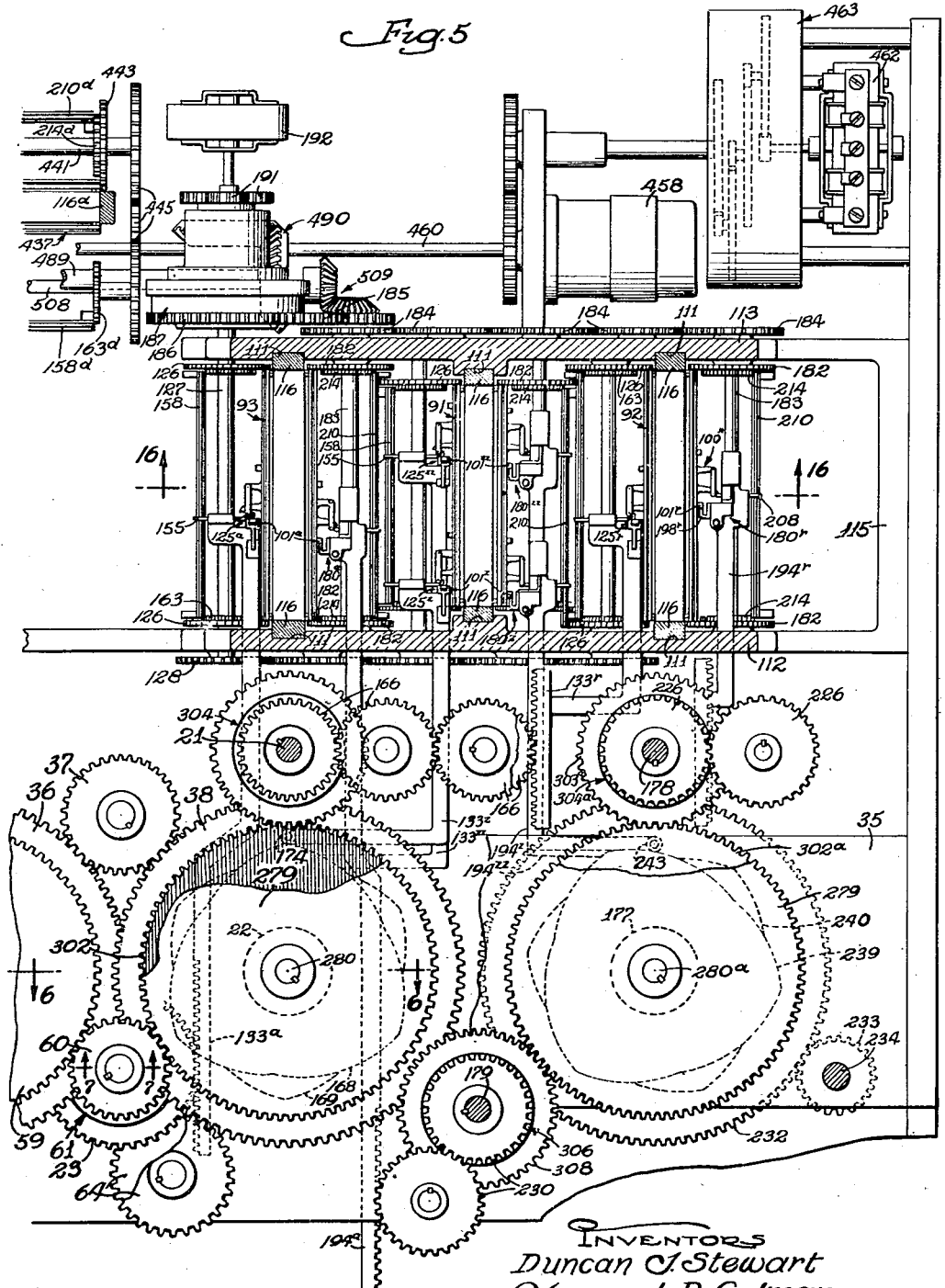

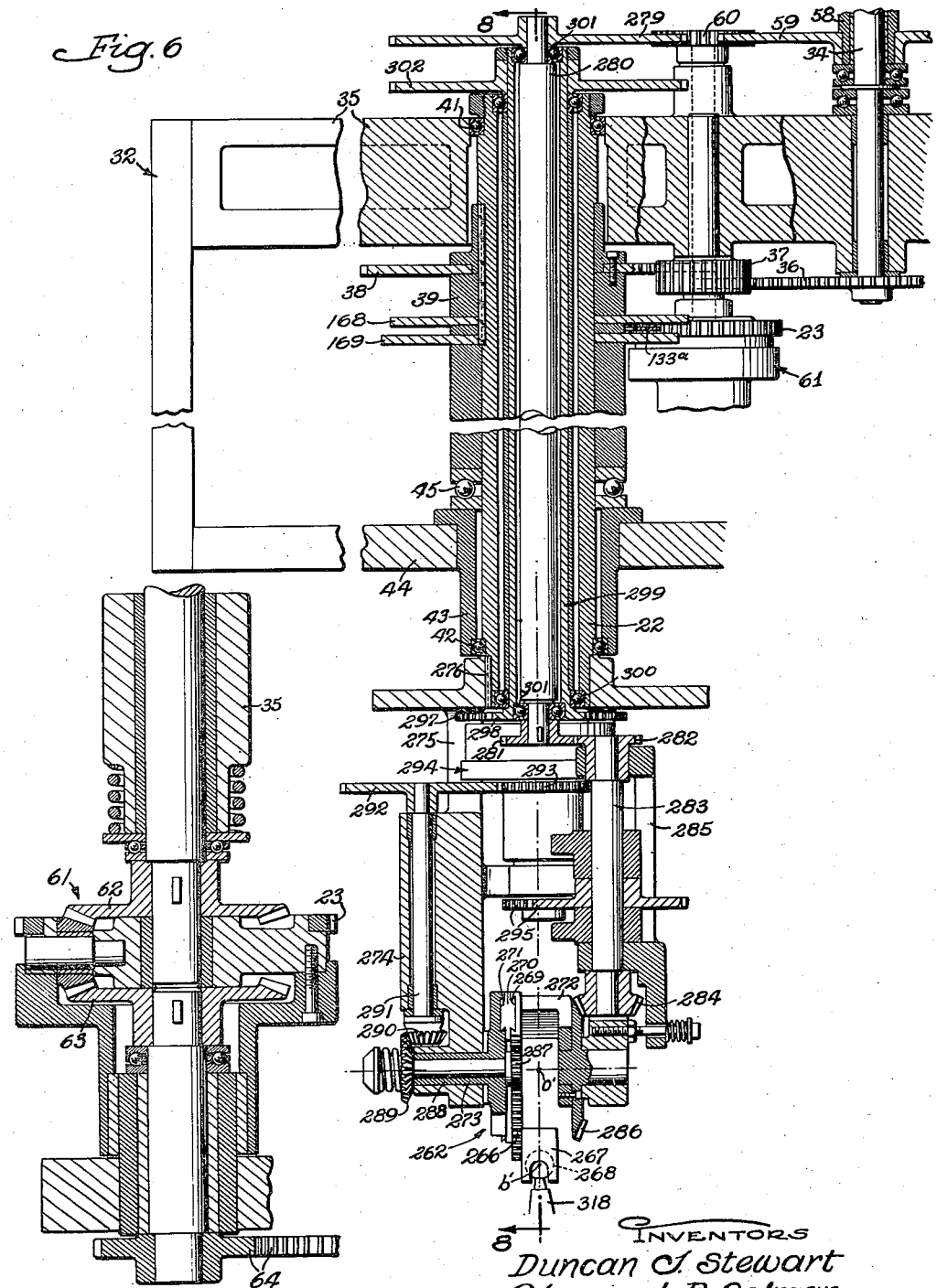

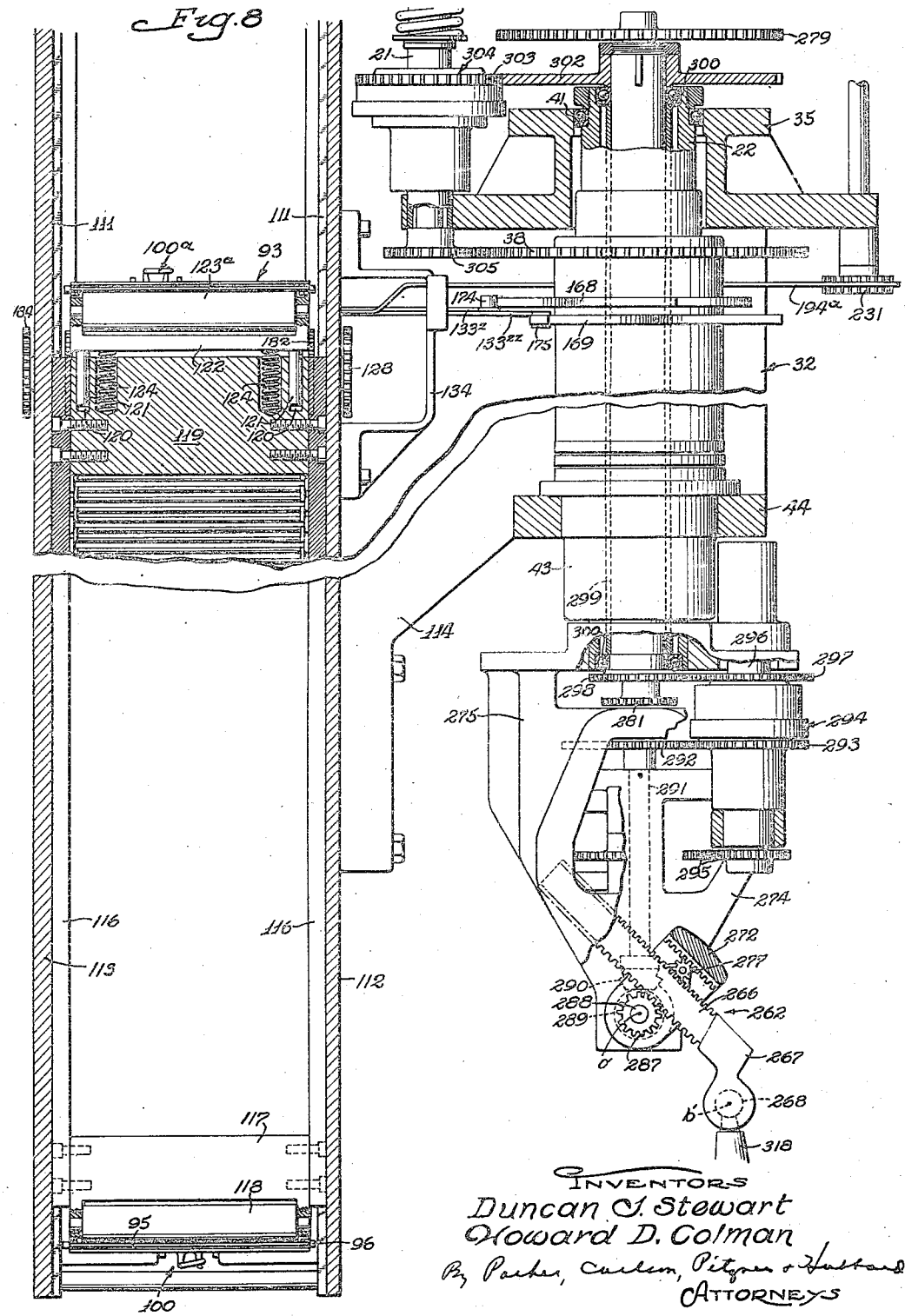

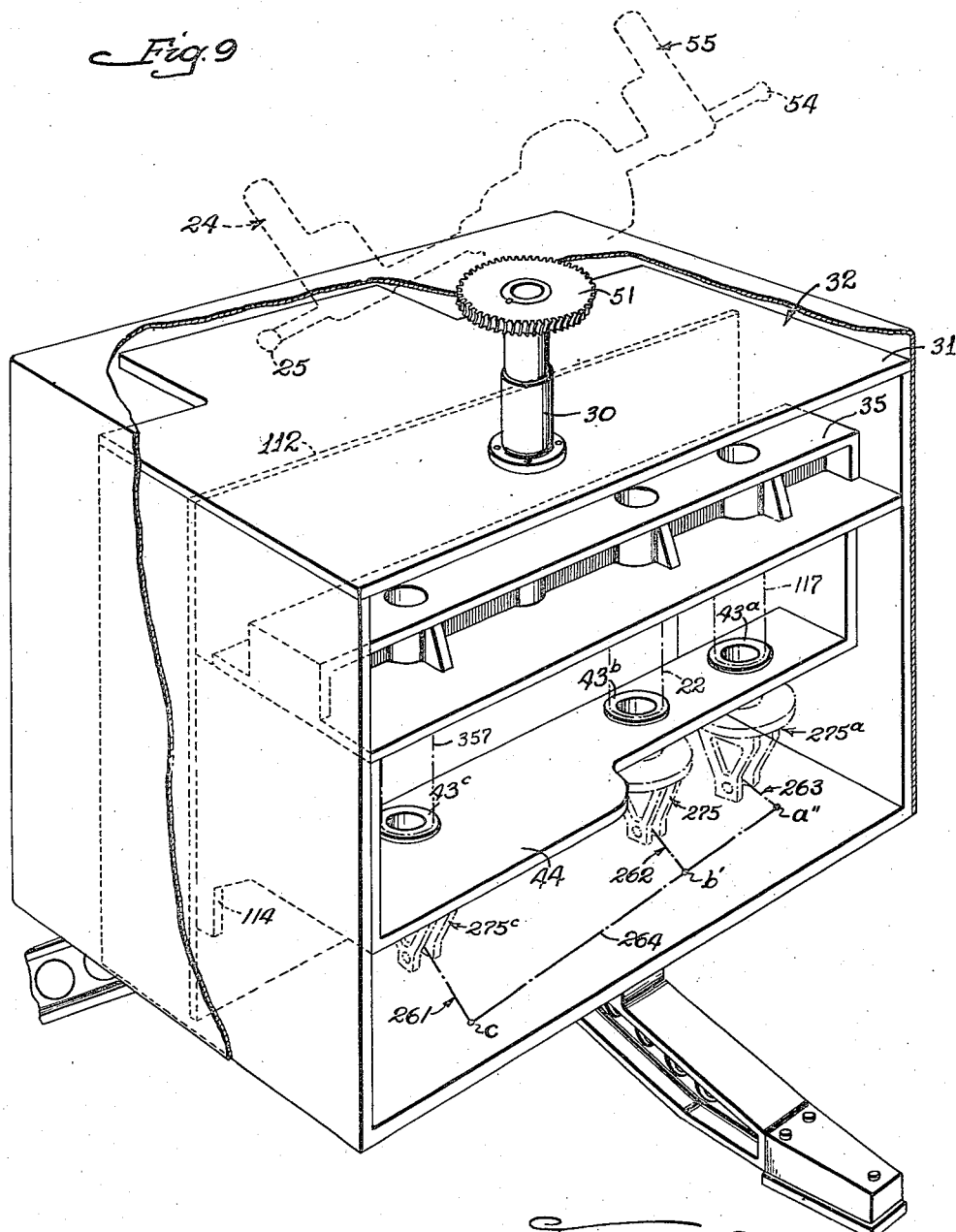

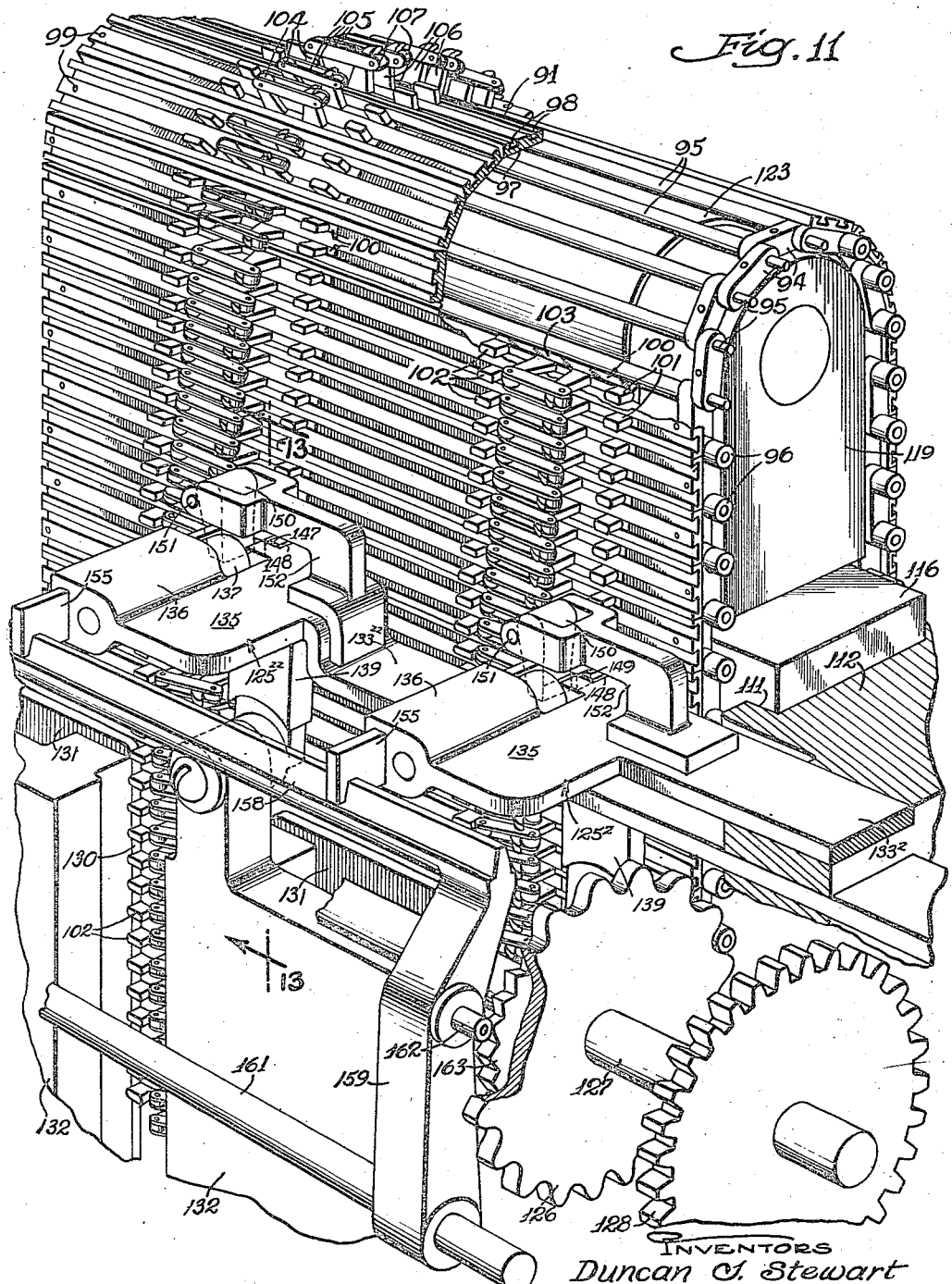

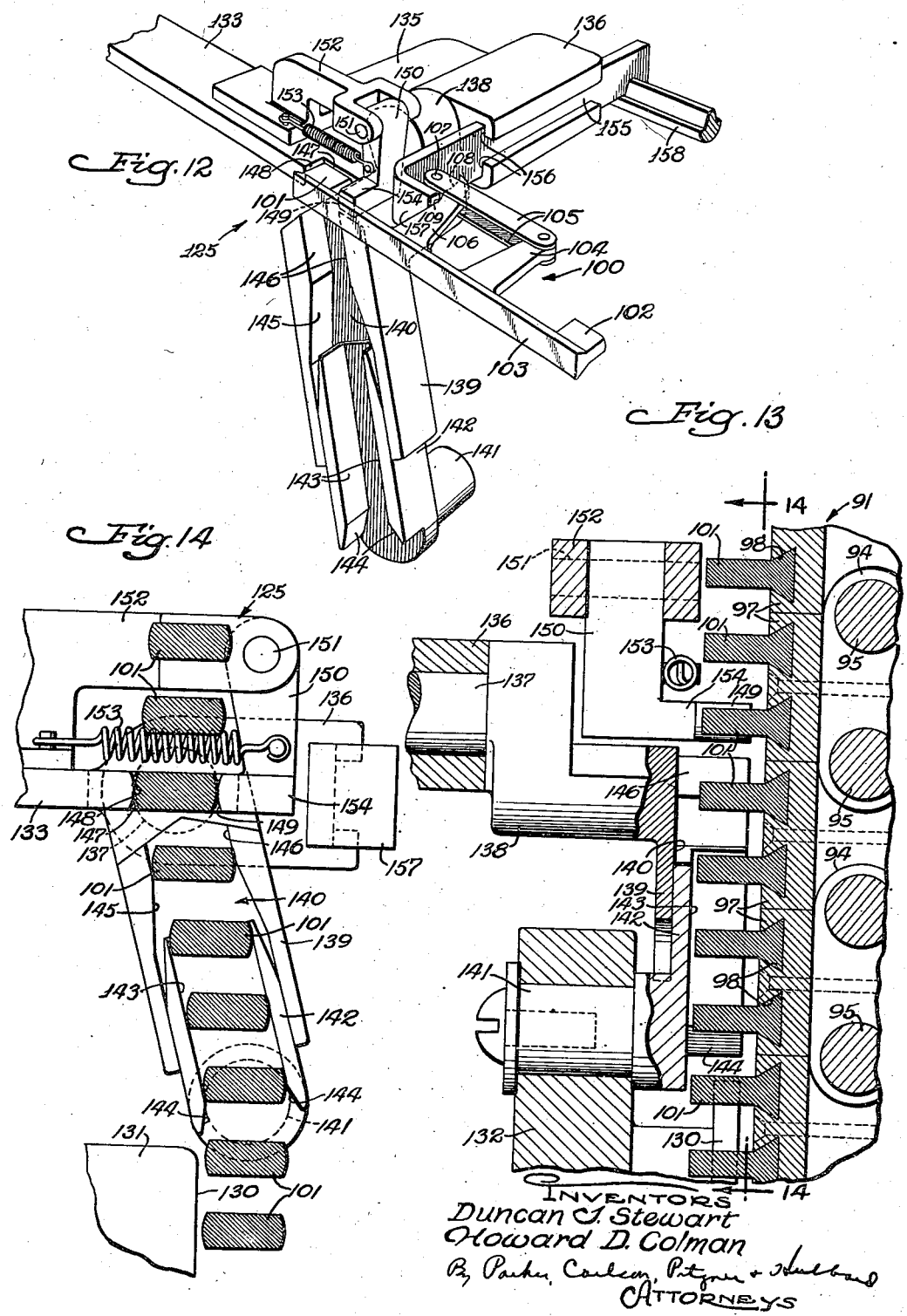

June 1, 1948.  D. J. STEWART ET AL  2,442,383
GUN FIRE CONTROL PREDICTION COMPUTER
Filed May 30, 1942                                      28 Sheets-Sheet 13

INVENTORS
Duncan J. Stewart
Howard D. Colman
By Parker Carlson Pitzner & Hubbard
ATTORNEYS

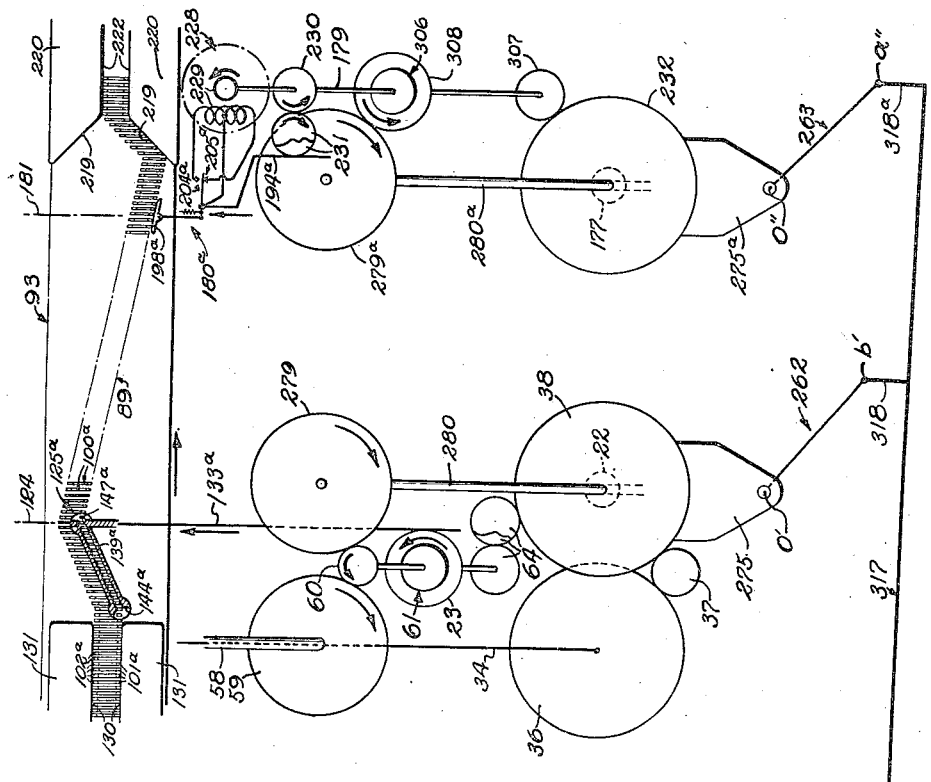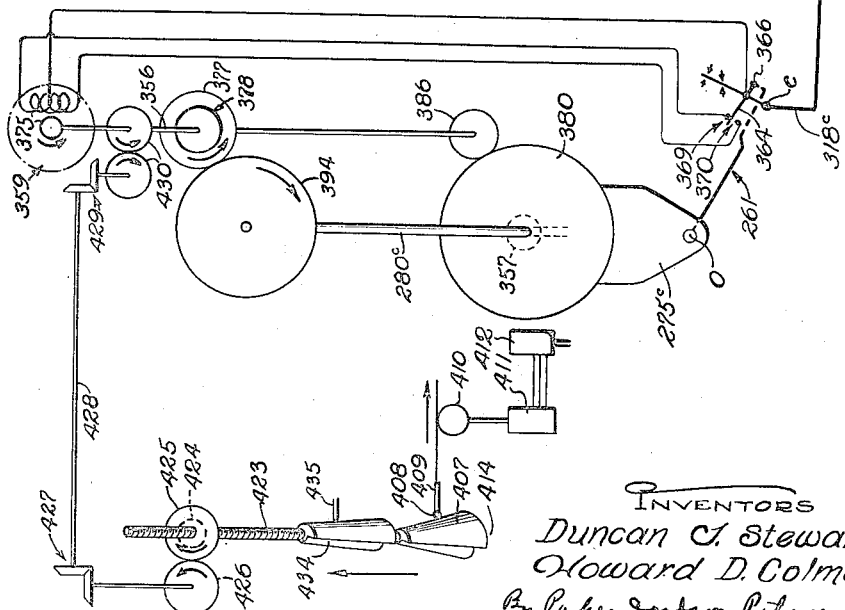
Fig. 18

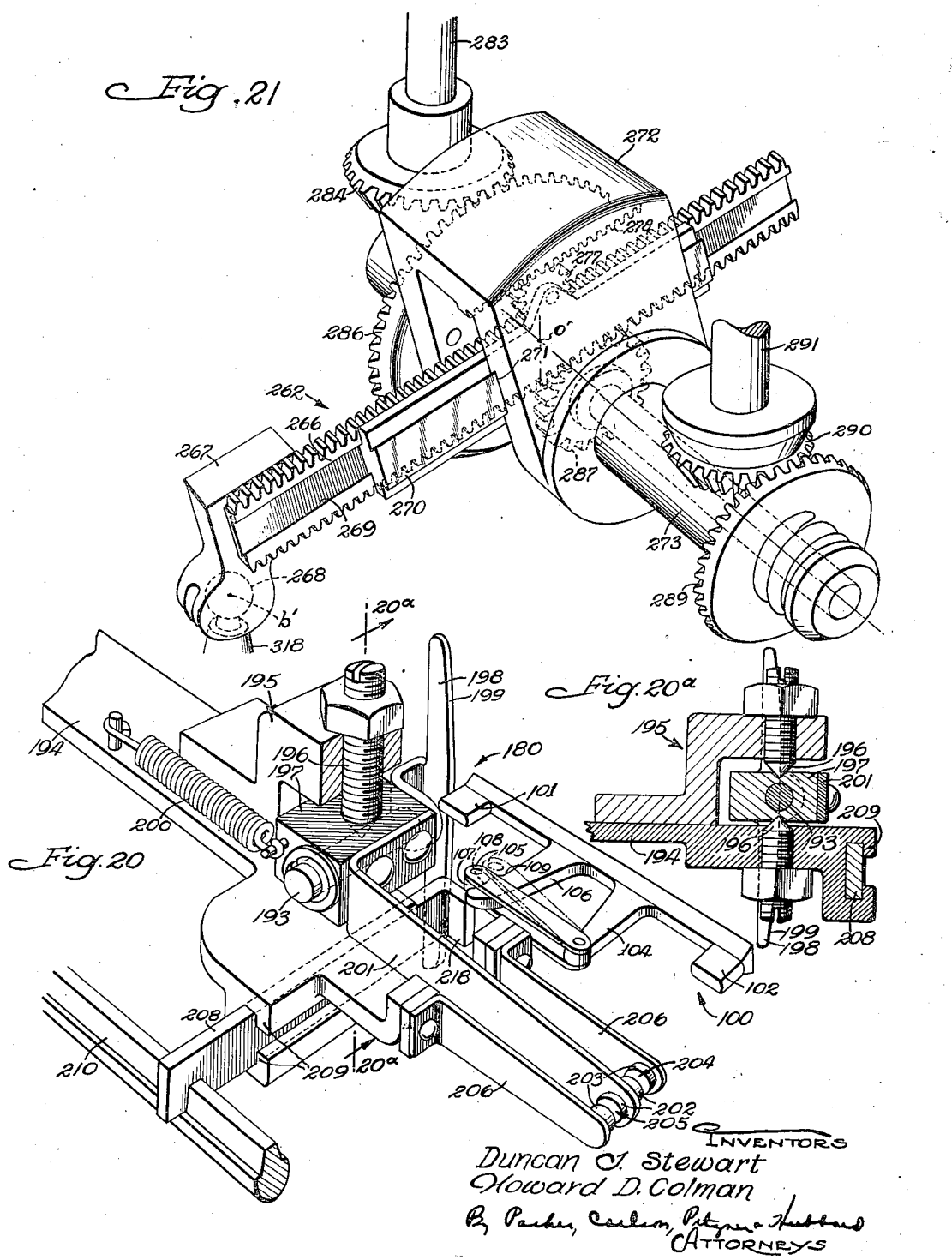

June 1, 1948.                D. J. STEWART ET AL                2,442,383
                      GUN FIRE CONTROL PREDICTION COMPUTER
Filed May 30, 1942                                           28 Sheets-Sheet 17

INVENTORS
Duncan J. Stewart
Howard D. Colman
ATTORNEYS

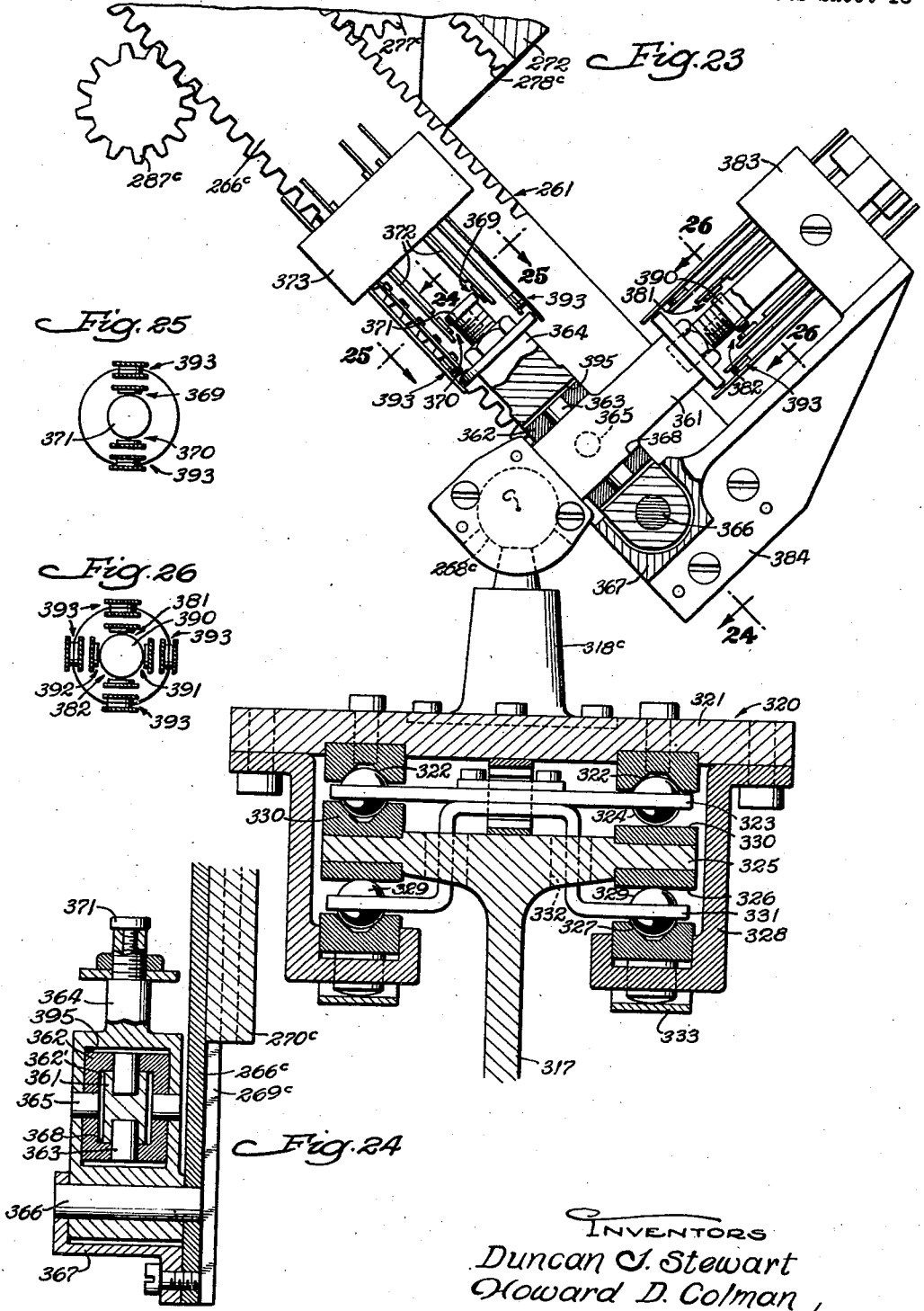

June 1, 1948.   D. J. STEWART ET AL   2,442,383
GUN FIRE CONTROL PREDICTION COMPUTER
Filed May 30, 1942   28 Sheets-Sheet 19

INVENTORS
Duncan J. Stewart
Howard D. Colman
ATTORNEYS

June 1, 1948. D. J. STEWART ET AL 2,442,383
GUN FIRE CONTROL PREDICTION COMPUTER
Filed May 30, 1942 28 Sheets-Sheet 20

INVENTORS
Duncan J. Stewart
Howard D. Colman
By Parker, Carlson, Pitzner + Hubbard
ATTORNEYS June 1, 1948.  D. J. STEWART ET AL  2,442,383
GUN FIRE CONTROL PREDICTION COMPUTER
Filed May 30, 1942  28 Sheets-Sheet 26

INVENTORS
Duncan J. Stewart
Howard D. Colman
ATTORNEYS

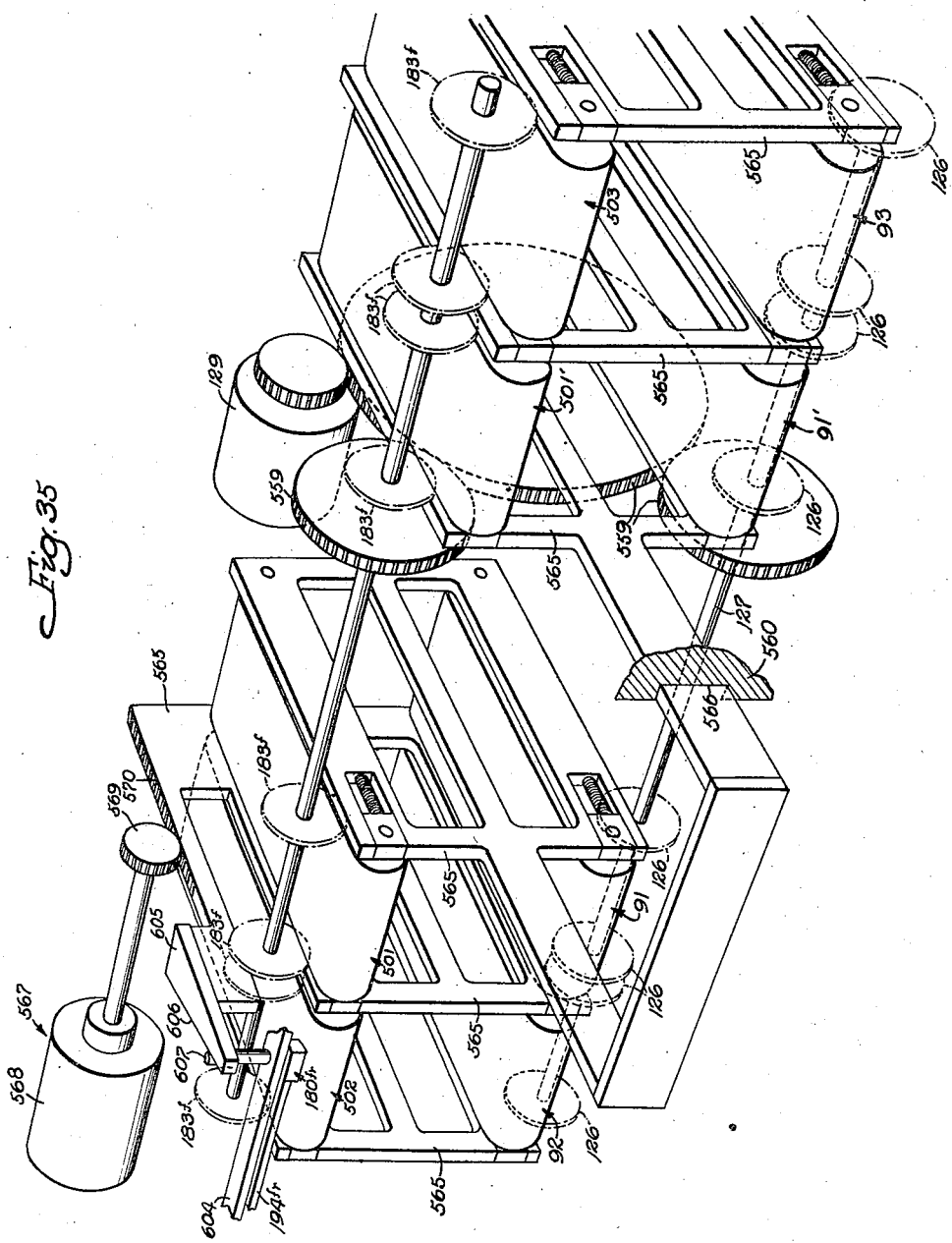

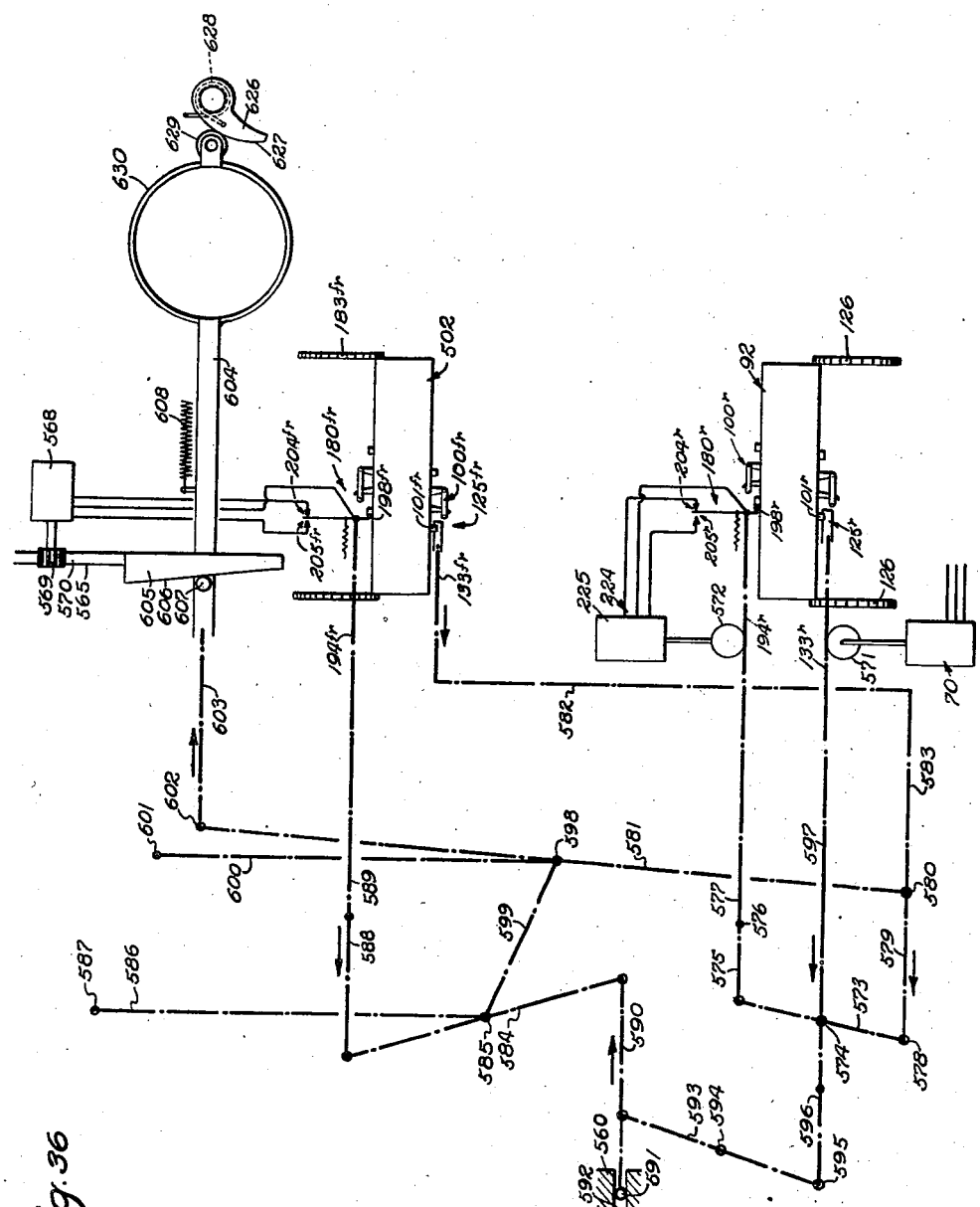

Patented June 1, 1948

2,442,383

UNITED STATES PATENT OFFICE 2,442,383

GUN FIRE CONTROL PREDICTION COMPUTER

Duncan J. Stewart and Howard D. Colman, Rockford, Ill., assignors to Barber-Colman Company, Rockford, Ill., a corporation of Illinois Application May 30, 1942, Serial No. 445,259

28 Claims. (Cl. 235—61.5)

The invention pertains to the art of predicting the future position of a moving object or target so that the prediction may be used in controlling the firing of a projectile to intercept the target.

The general object is to provide a novel apparatus by which such predictions may be made with substantially greater accuracy than has been possible heretofore.

In prior fire control systems, the general practice has been to track the moving target and predict its future position on the basis of instantaneous characteristics of the target motion. This method is open to the objection that the observers are unable to follow the target exactly at every instant and as a consequence the measurements thus made do not provide an accurate basis of the computation.

The present invention aims to predict the future target position in accordance with the performance of the target as observed over a past time interval of substantial duration so as to be based on average instead of instantaneous measurements.

Another object is to predict the future position of a target by measuring the velocity and path of travel during a time interval of known duration immediately preceding the present and computing the future position on the basis of the average rate of change in direction and velocity.

Another object is to compute future target position from the measurements of the present position of the target and its position at a known past time.

Another object is to ascertain the past position of the object by measuring and recording the values of the coordinates that locate the object in its present position and reading these records after the lapse of a known interval.

Another object is to make a continuous record of the performance of a moving object as measured in terms of its several coordinate values and upon the basis of such record to compute at any given instant the position of the target at a time spaced from the present by the time required for a projectile fired from the point of observation to intercept the target whereby to condition the gun or projector for continuous firing.

Another object is to provide a predictor of the above character in which the past time interval is a predetermined function of the computed time of flight of the projectile to the target.

Another object is to introduce a correction compensating for non-linear flight of the target.

Another object is to measure the degree of deviation of the target from an assumed straight line of flight and to modify the future prediction correspondingly so as to increase the accuracy of firing on targets moving at a non-uniform velocity or in a non-linear path.

Another object is to provide a novel mechanism for computing the future target position under the control of the measured coordinates.

Another object is to provide a predictor having a computer involving means for representing geometrically the present, past and future target positions.

Another object is to provide a novel pantograph system for effecting such geometrical representation.

Another object is to provide a novel mechanism for measuring the azimuth coordinate including a target follower having an unlimited movement in azimuth.

Other objects and advantages of the invention will become apparent from the following detailed description taken in connection with the accompanying drawings, in which Figure 1 is a view illustrating various target positions in relation to the predicting and projecting apparatus.

Fig. 4 is a section taken along the line 4—4 of Fig. 3.

Fig. 5 is a fragmentary plan section with certain of the parts shown in section.

Figs. 6 and 7 are fragmentary sections taken respectively along the lines 6—6 and 7—7 of Fig. 5.

Fig. 8 is a section taken along the line 8—8 of Fig. 6.

Fig. 9 is a perspective view of the frame structure.

Figure 10:
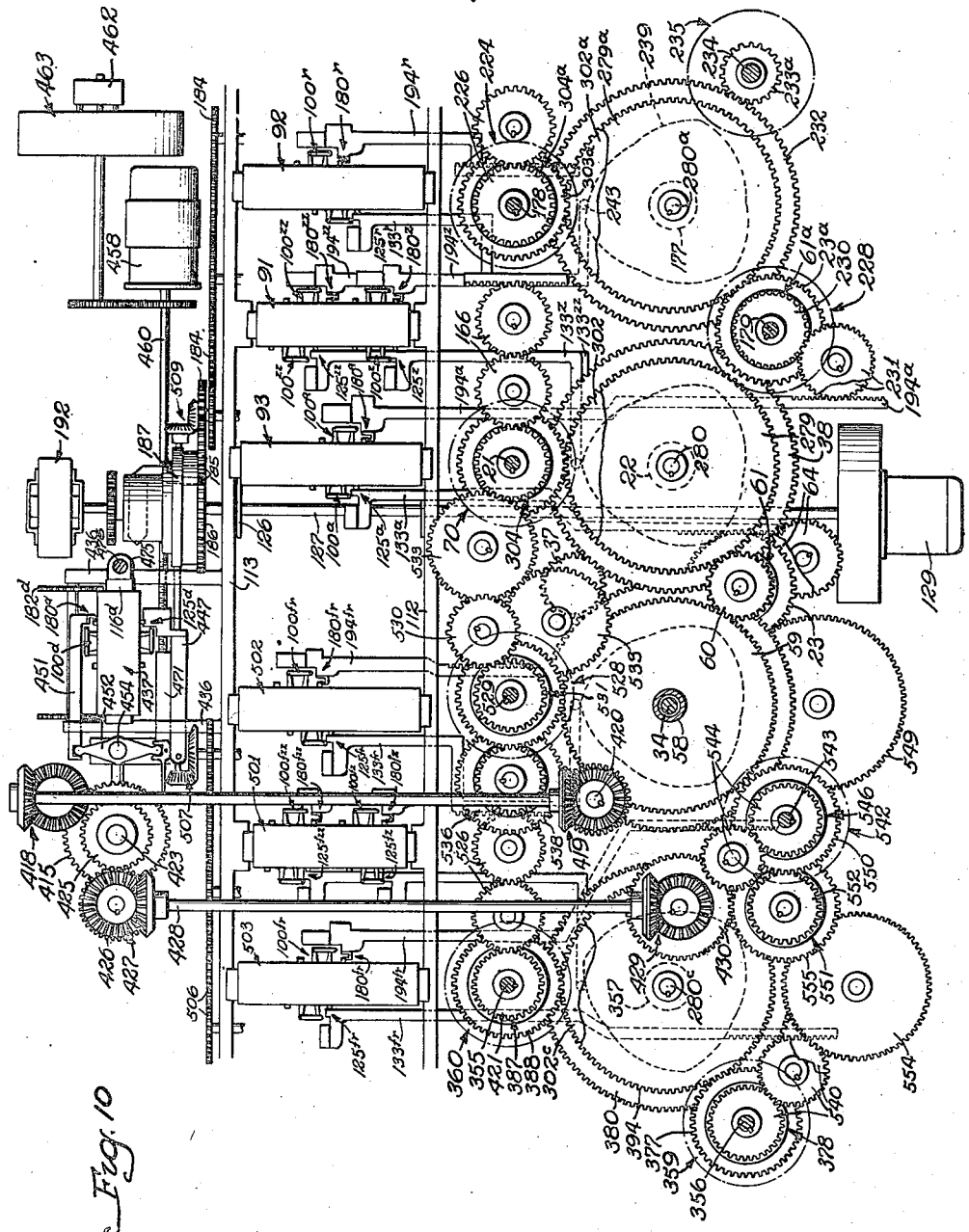

Fig. 10 is a plan view similar to Fig. 5 but on a smaller scale.

Fig. 11 is a fragmentary perspective view of one of the coordinate record carriers.

Fig. 12 is a perspective view of one of the coordinate recorders.

Fig. 13 is a fragmentary sectional view taken along the line 13—13 of Fig. 11.

Fig. 14 is a section taken along the line 14—14 of Fig. 13.

Figure 15:
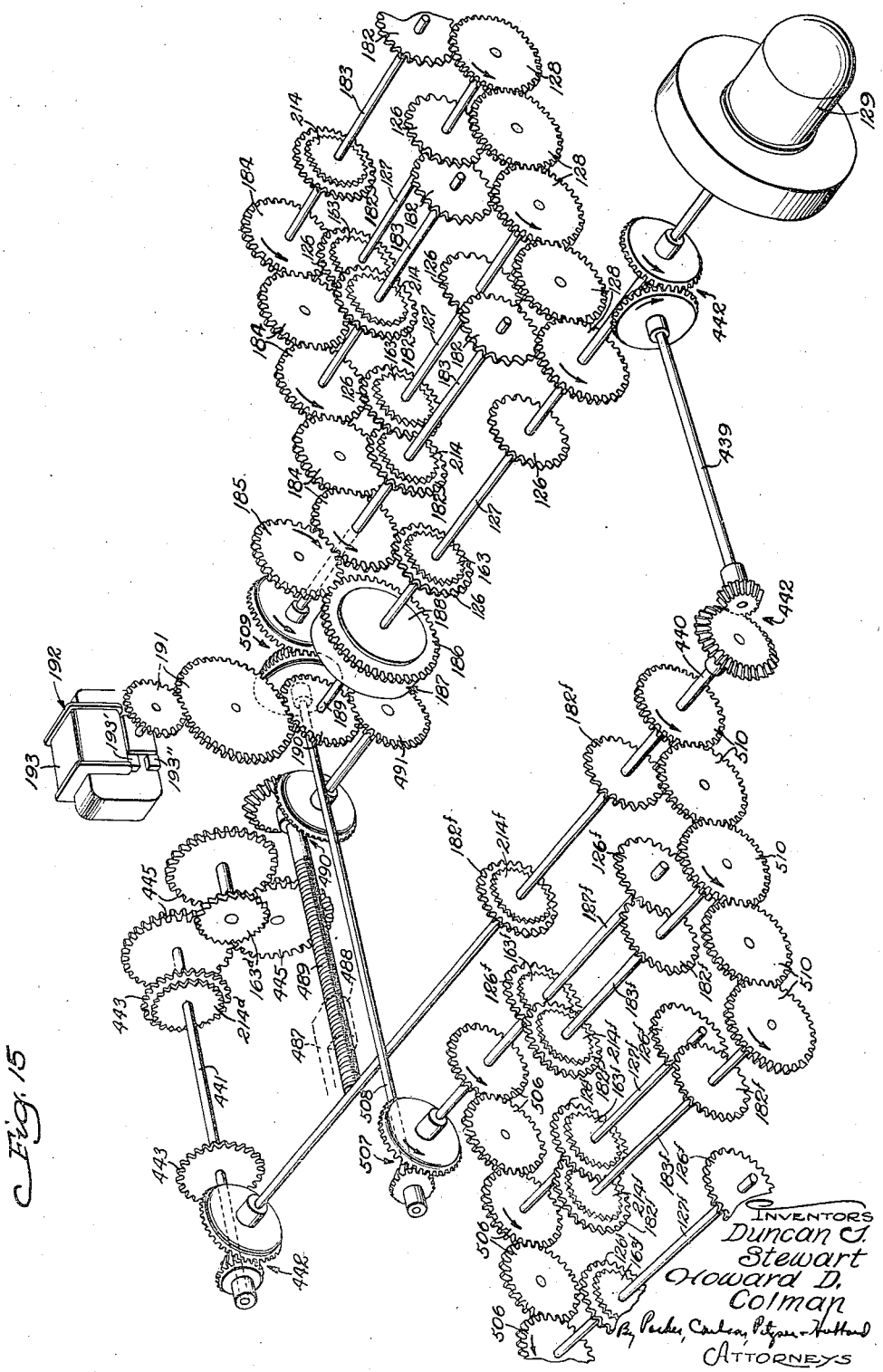

Fig. 15 is a fragmentary perspective view of the mechanism for driving the record carriers.

Figure 16:
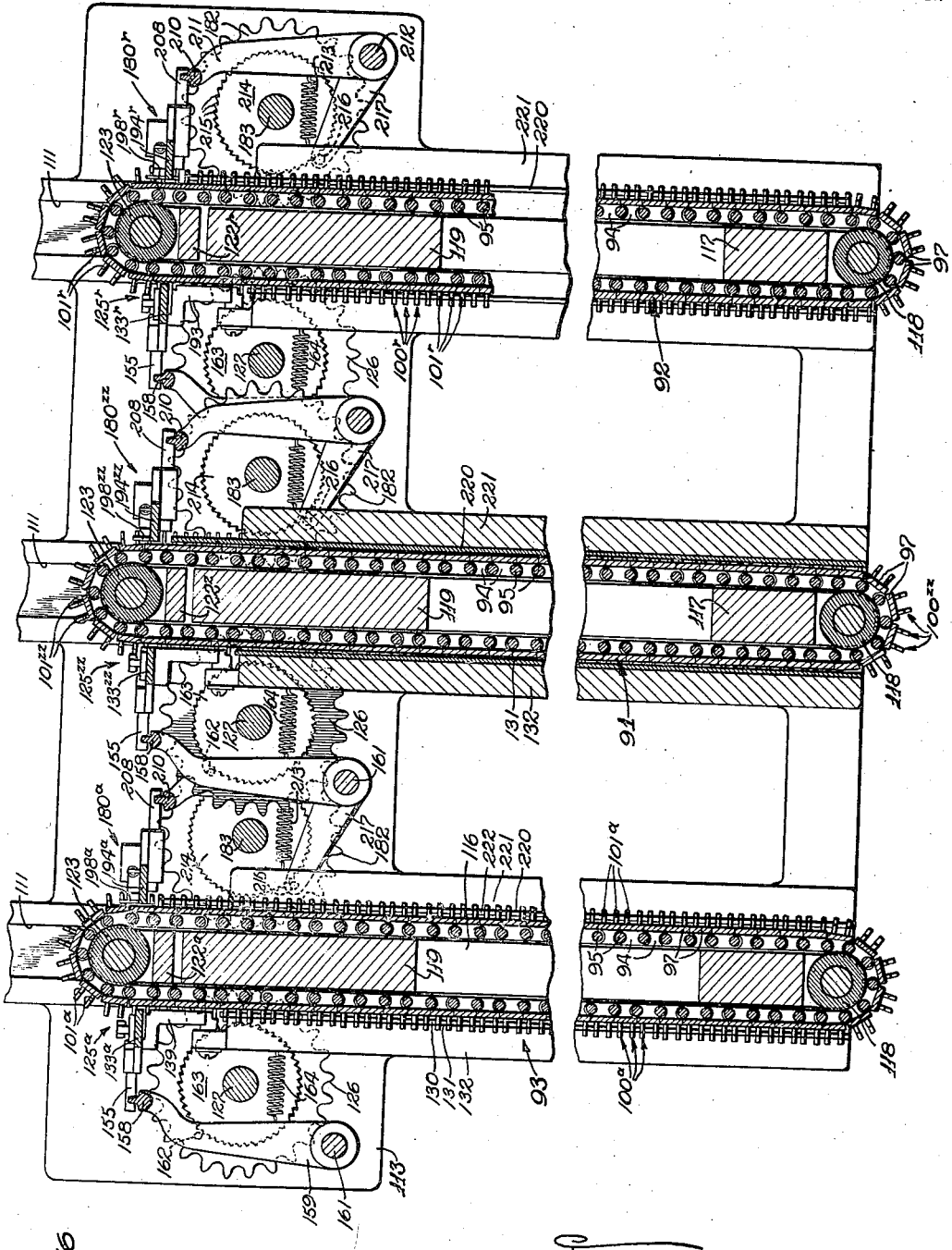

Fig. 16 is a section taken along the line 16—16 of Fig. 5.

Figure 17:
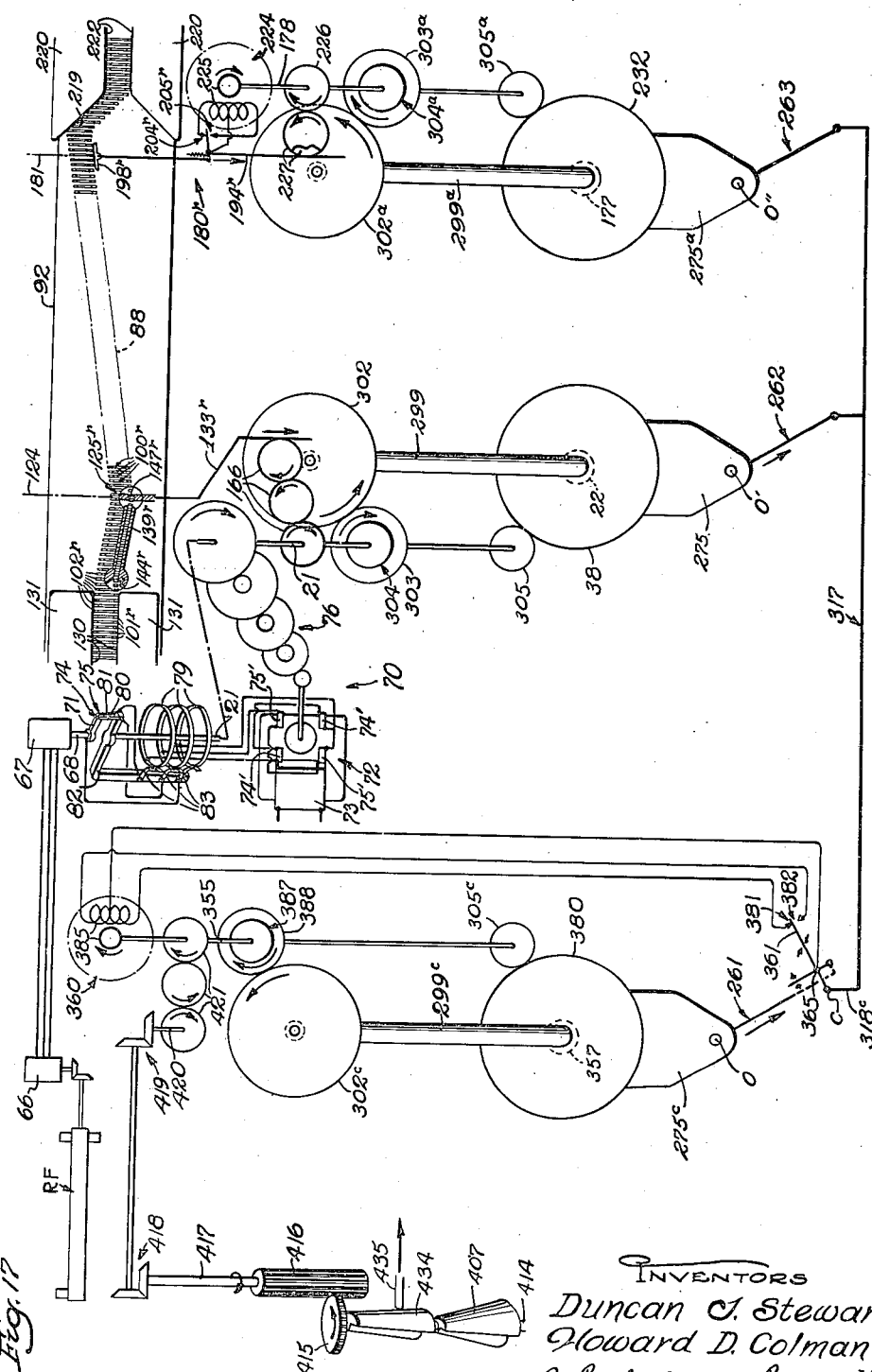
Figure 19:
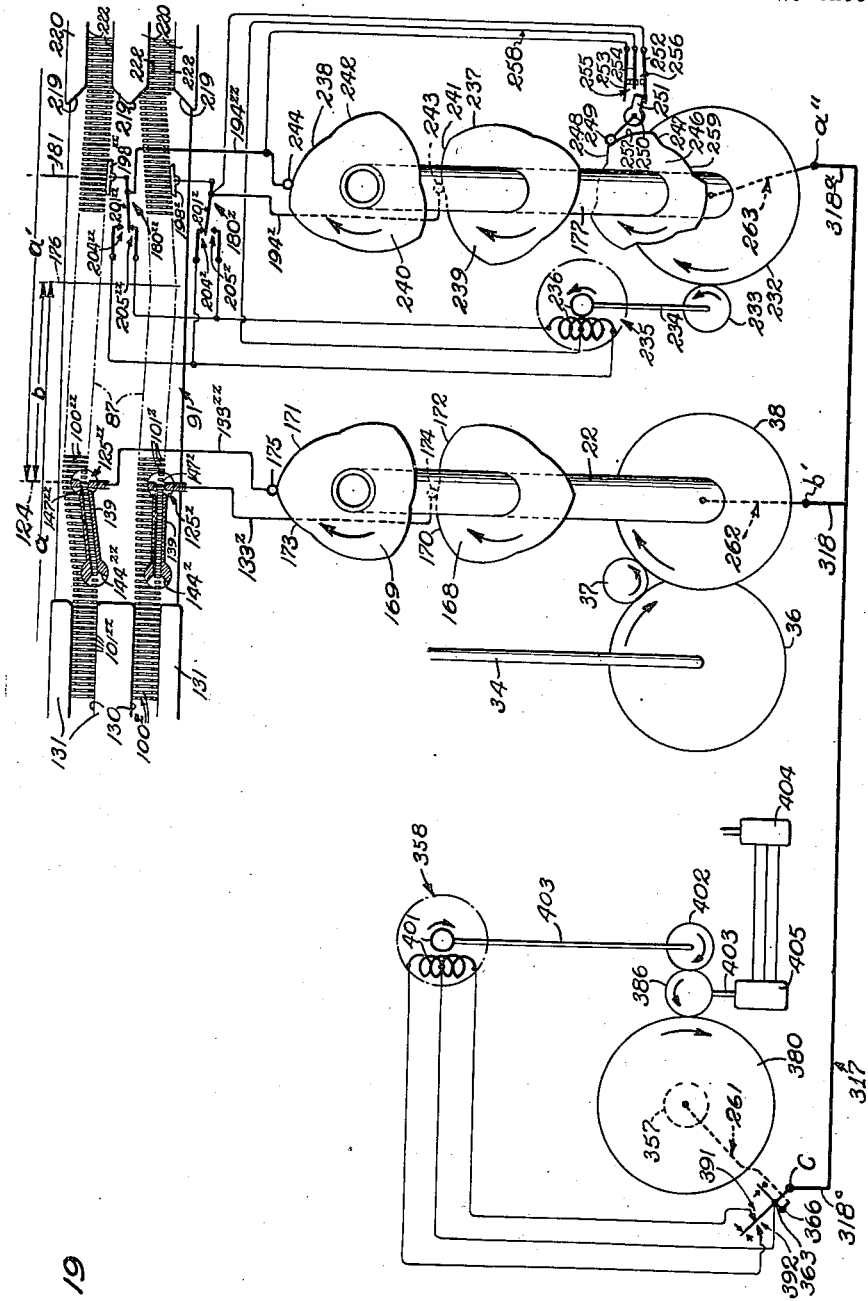

Figs. 17, 18, and 19 are schematic views and wiring diagrams of the range, altitude and azimuth records and the mechanisms for recording and reading the same.

Fig. 20 is a perspective of one of the record readers.

Fig. 20ª is a fragmentary section taken along the line 20ª—20ª of Fig. 20.

Fig. 21 is a fragmentary perspective view of a part of the computing mechanism.

Figure 22:
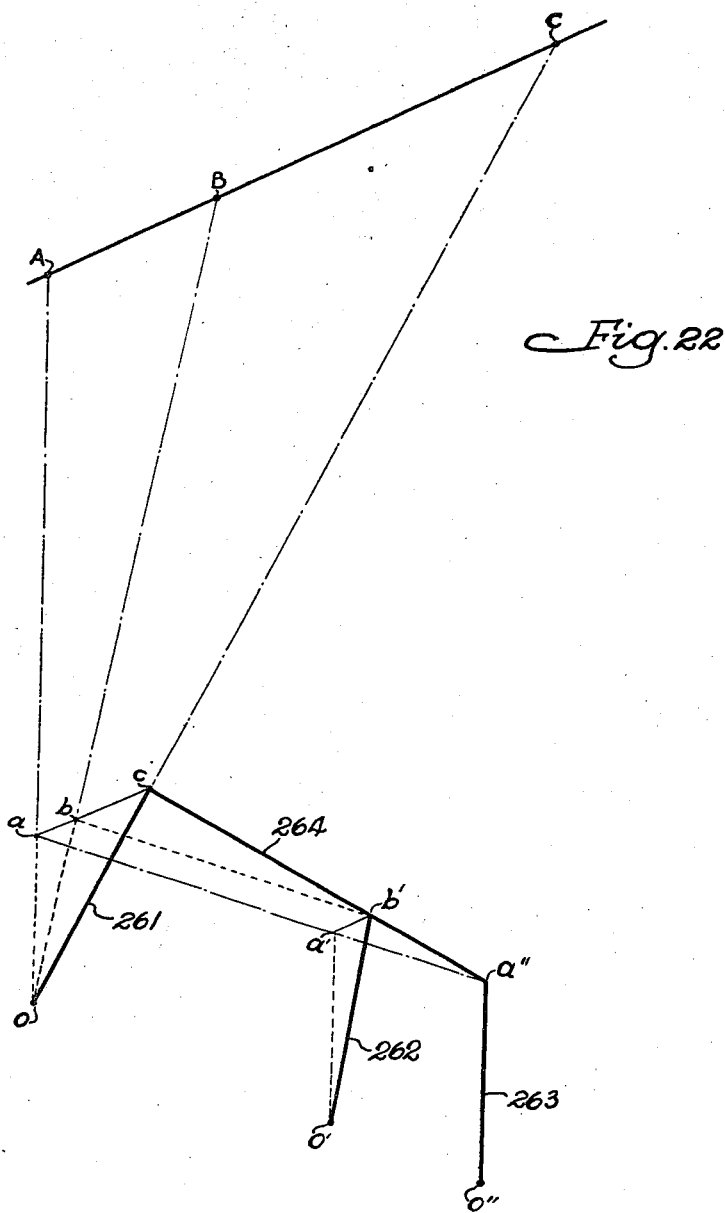

Fig. 22 is a diagrammatic view of the principal parts of the computer.

Figure 3:
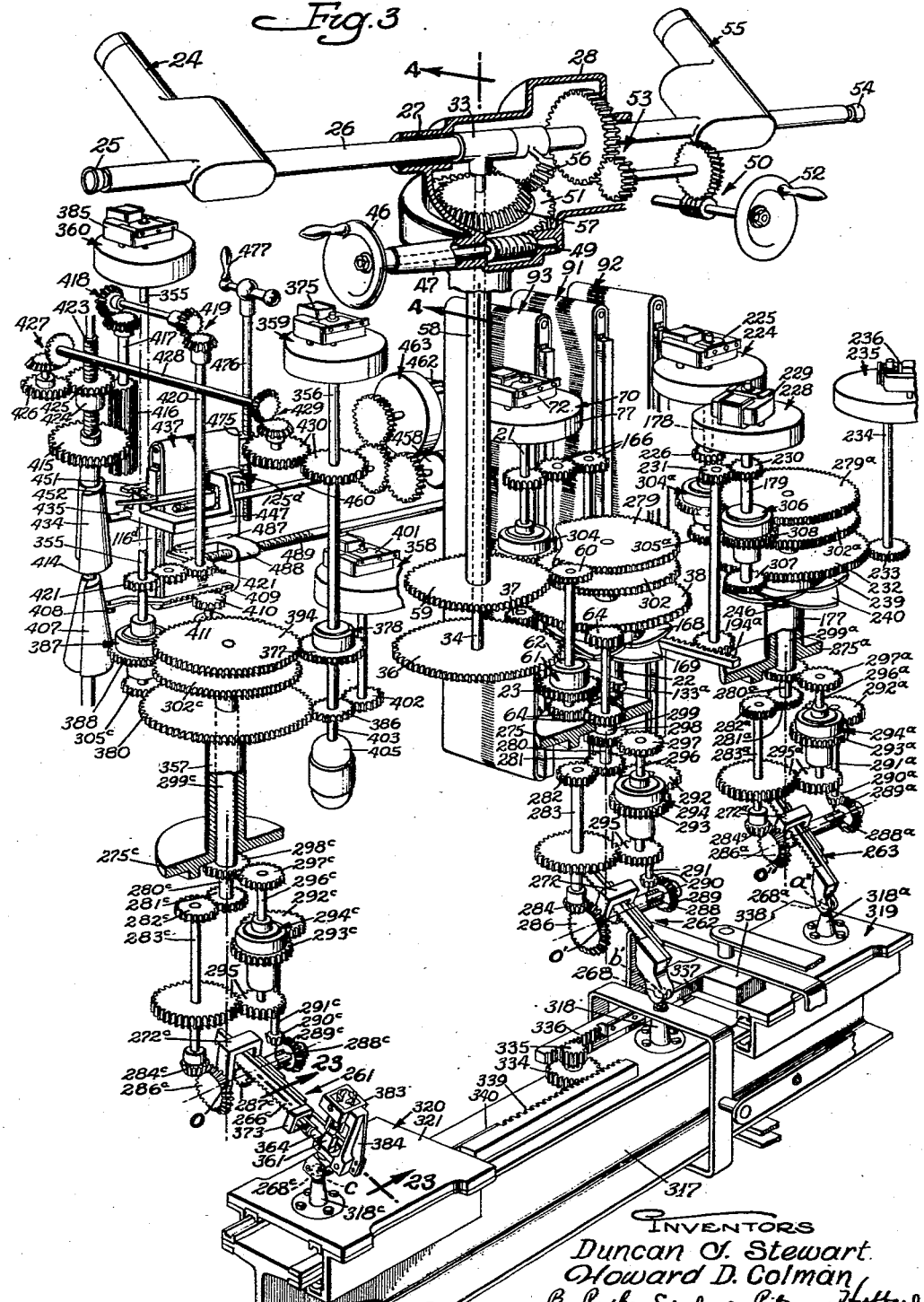
Fig. 3 is a fragmentary perspective view of the main operating parts.

Fig. 23 is a section taken along the line 23—23 of Fig. 3.

Figs. 24, 25, and 26 are fragmentary sections taken respectively along the lines 24—24, 25—25, and 26—26 of Fig. 23.

Figure 27:
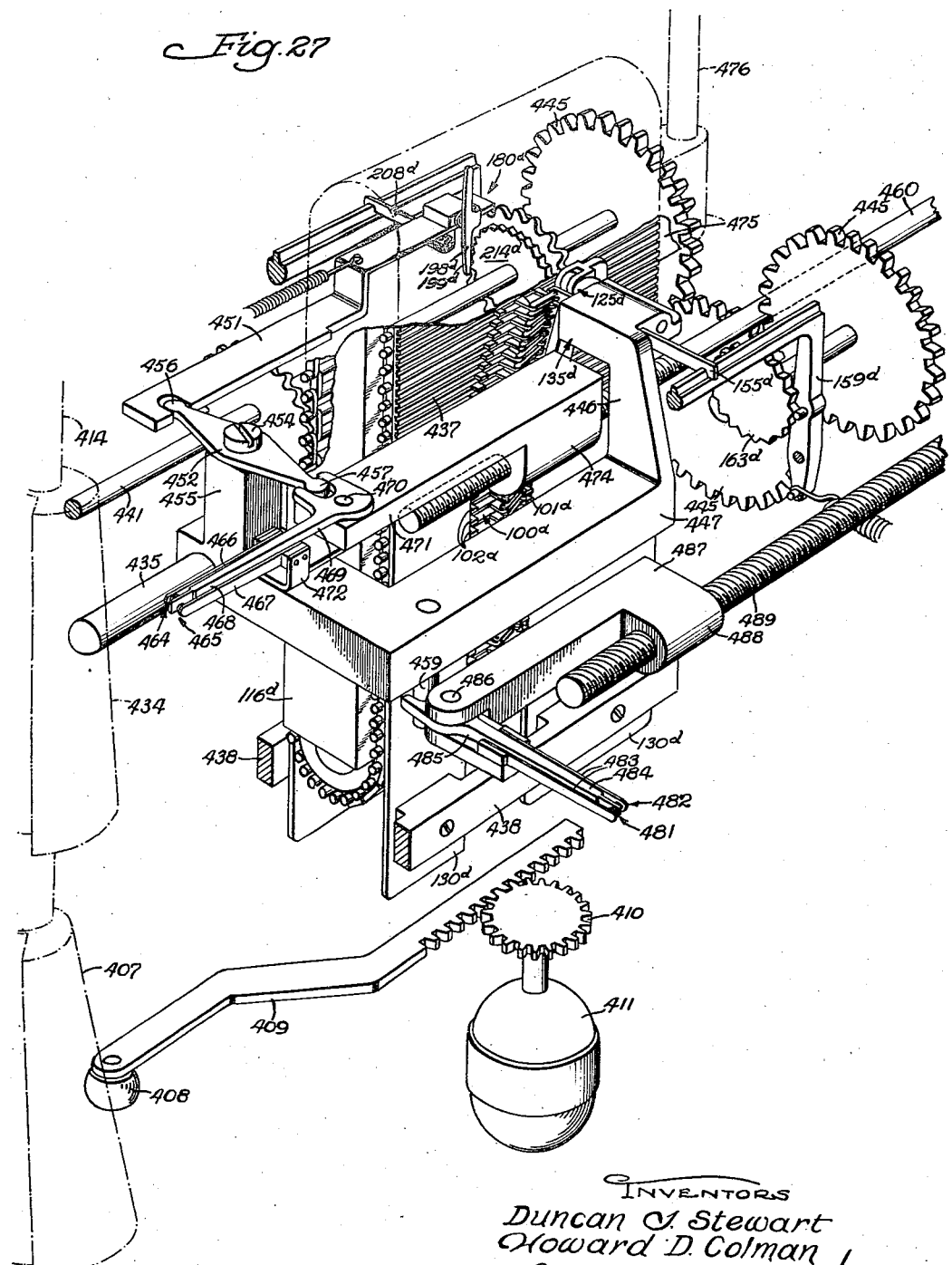

Fig. 27 is a fragmentary perspective view of the dead time mechanism.

Figure 28:
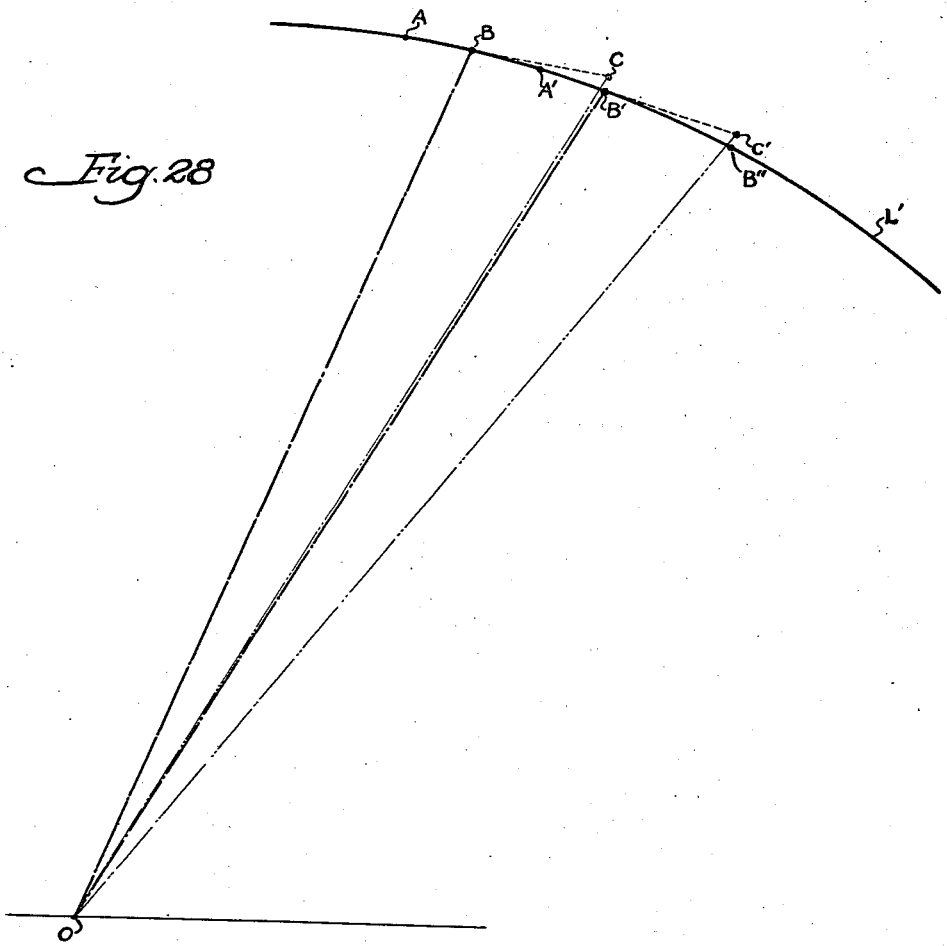

Fig. 28 is a diagrammatic view showing different target positions involved in making the correction for non-linear flight.

Figure 29:
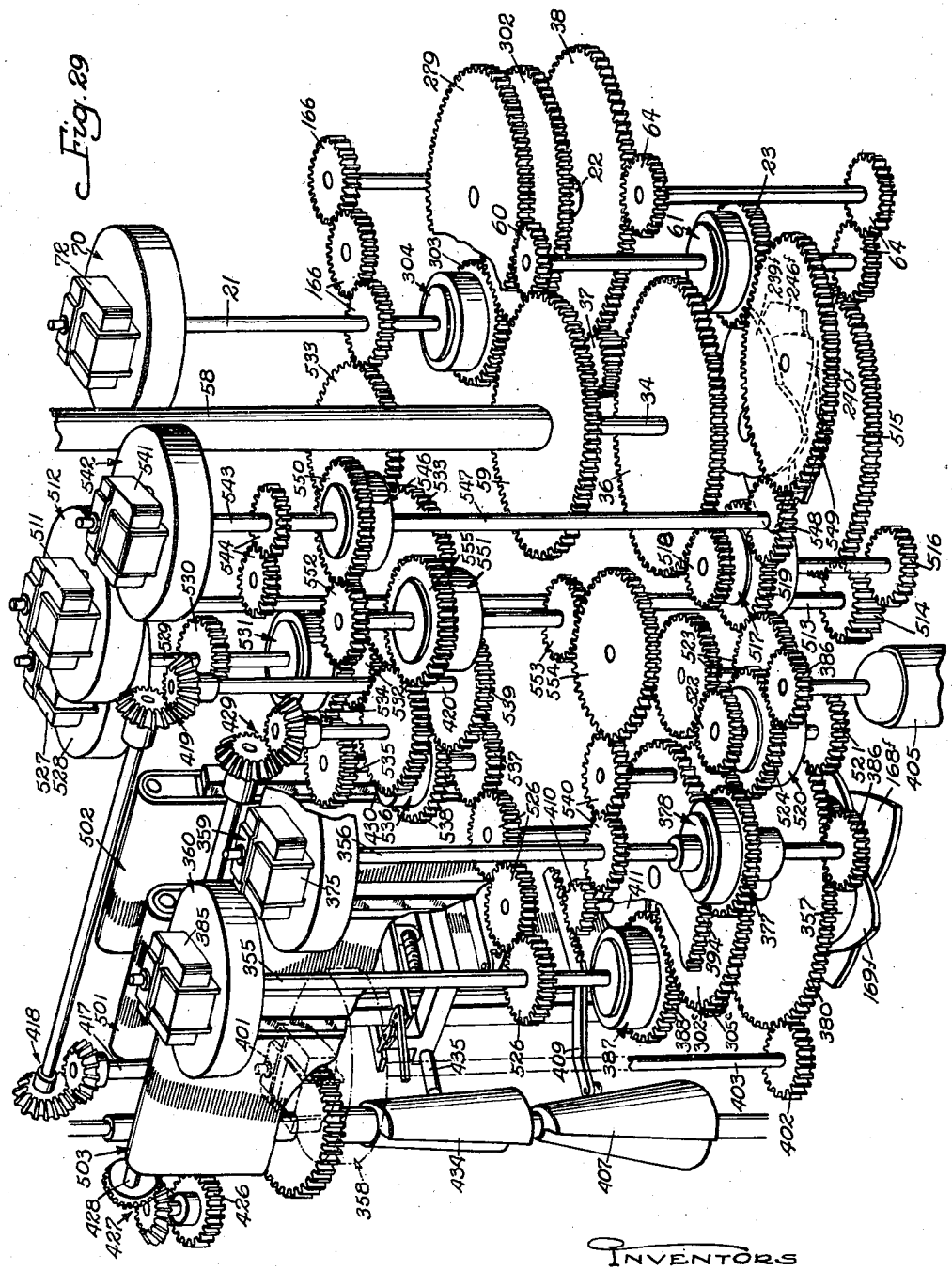

Fig. 29 is a perspective view similar to Fig. 3 but on a larger scale and including the mechanism for correcting for non-linear flight.

Figure 30:
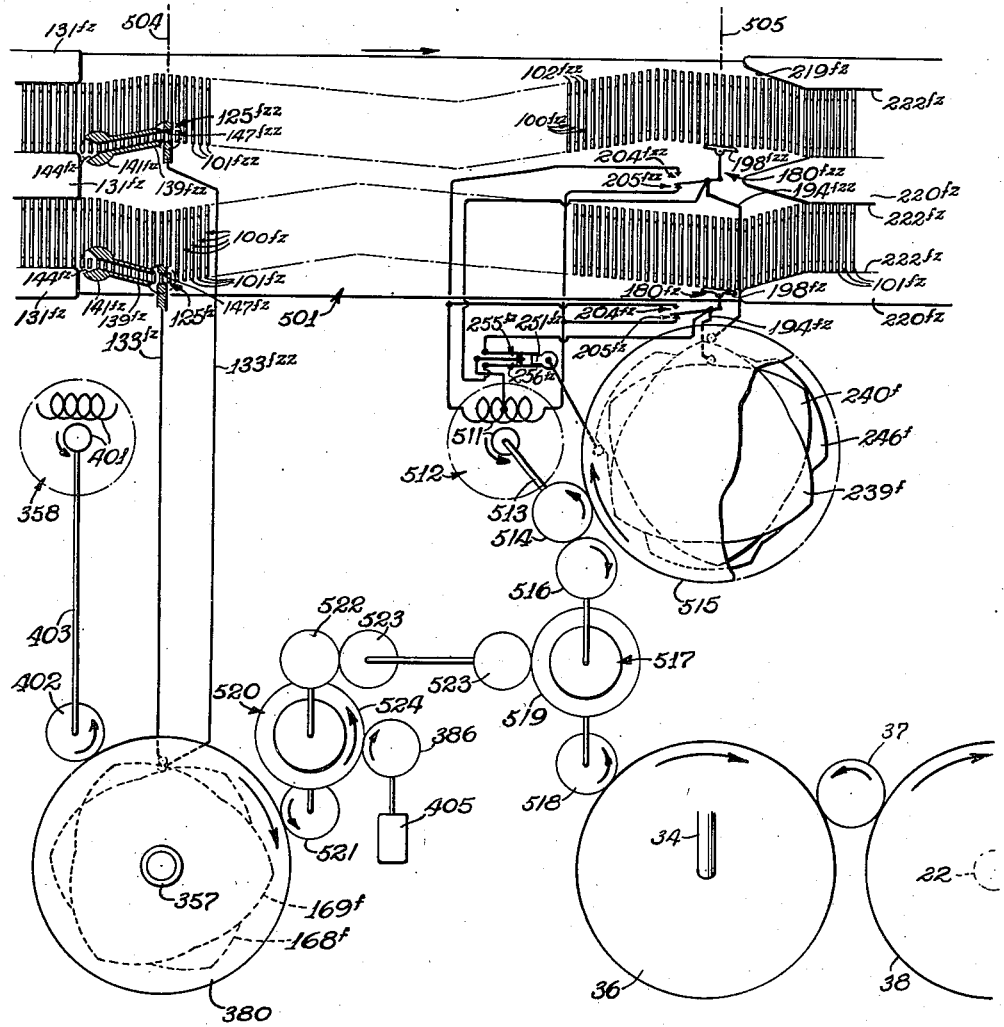
Figure 31:
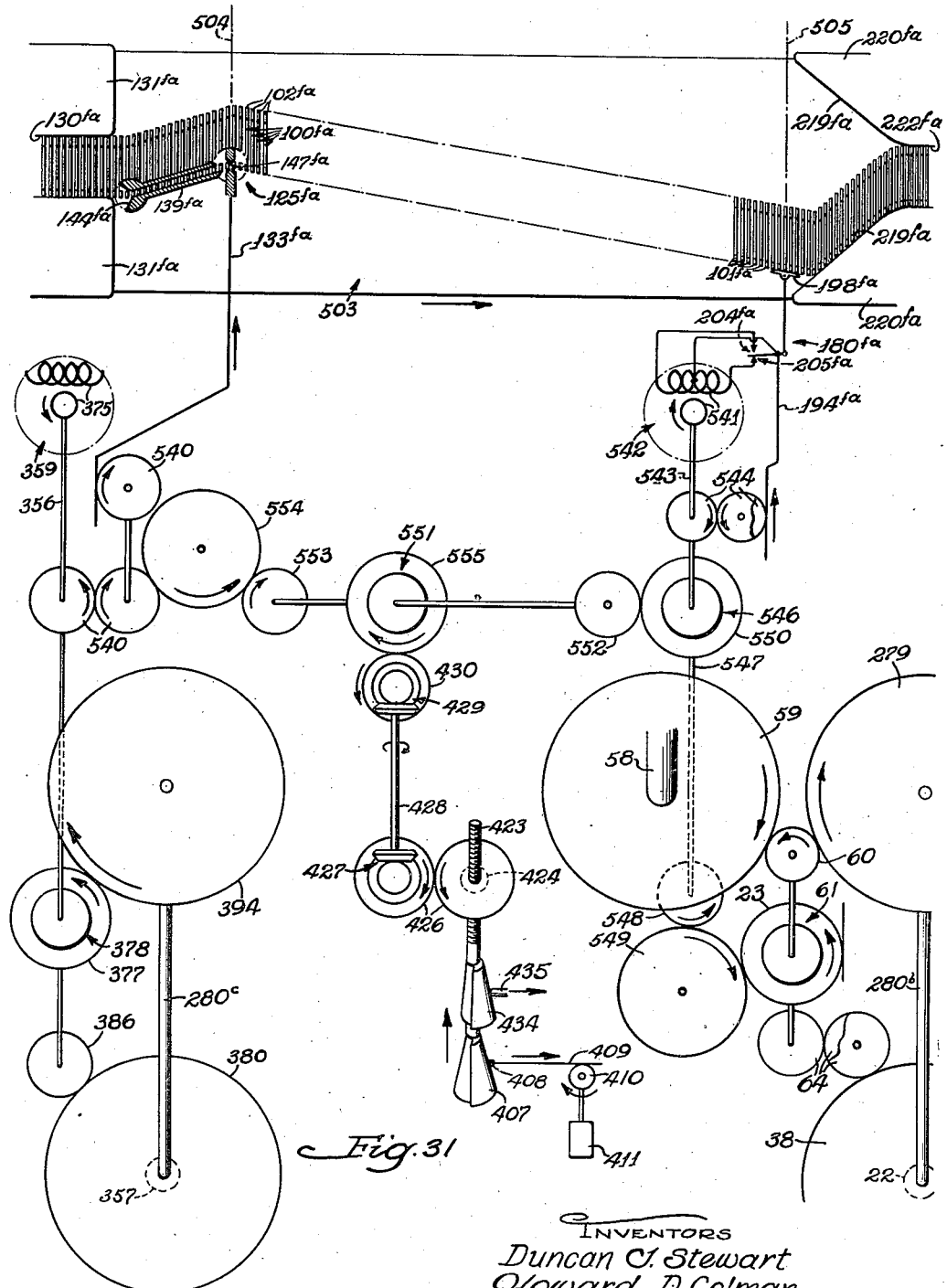
Figure 32:
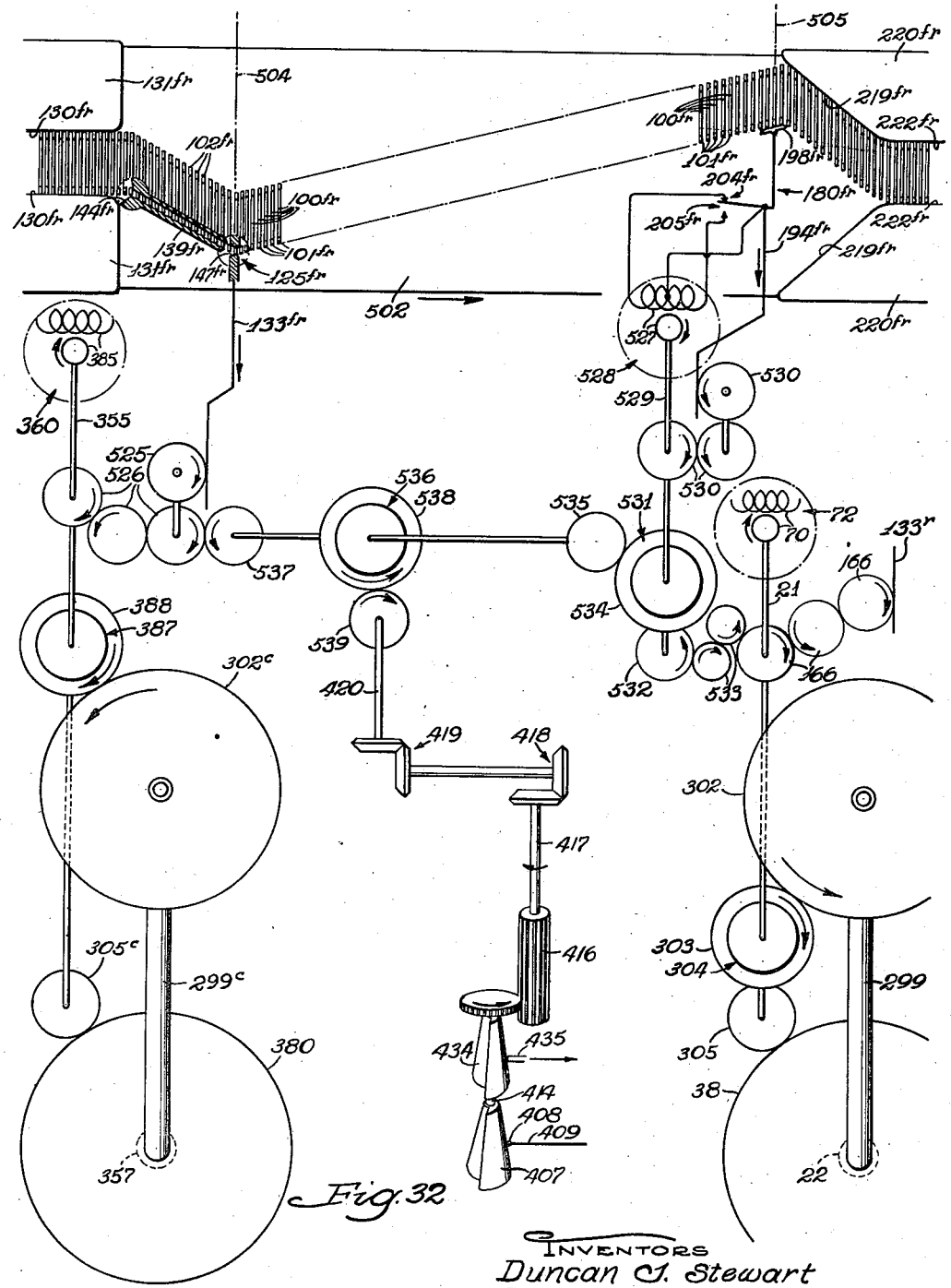

Figs. 30, 31, and 32 are schematic views and wiring diagrams of the mechanisms for setting and reading the azimuth, altitude and range records of the computed future position and for introducing the corrections for non-linear flight.

Figure 33:
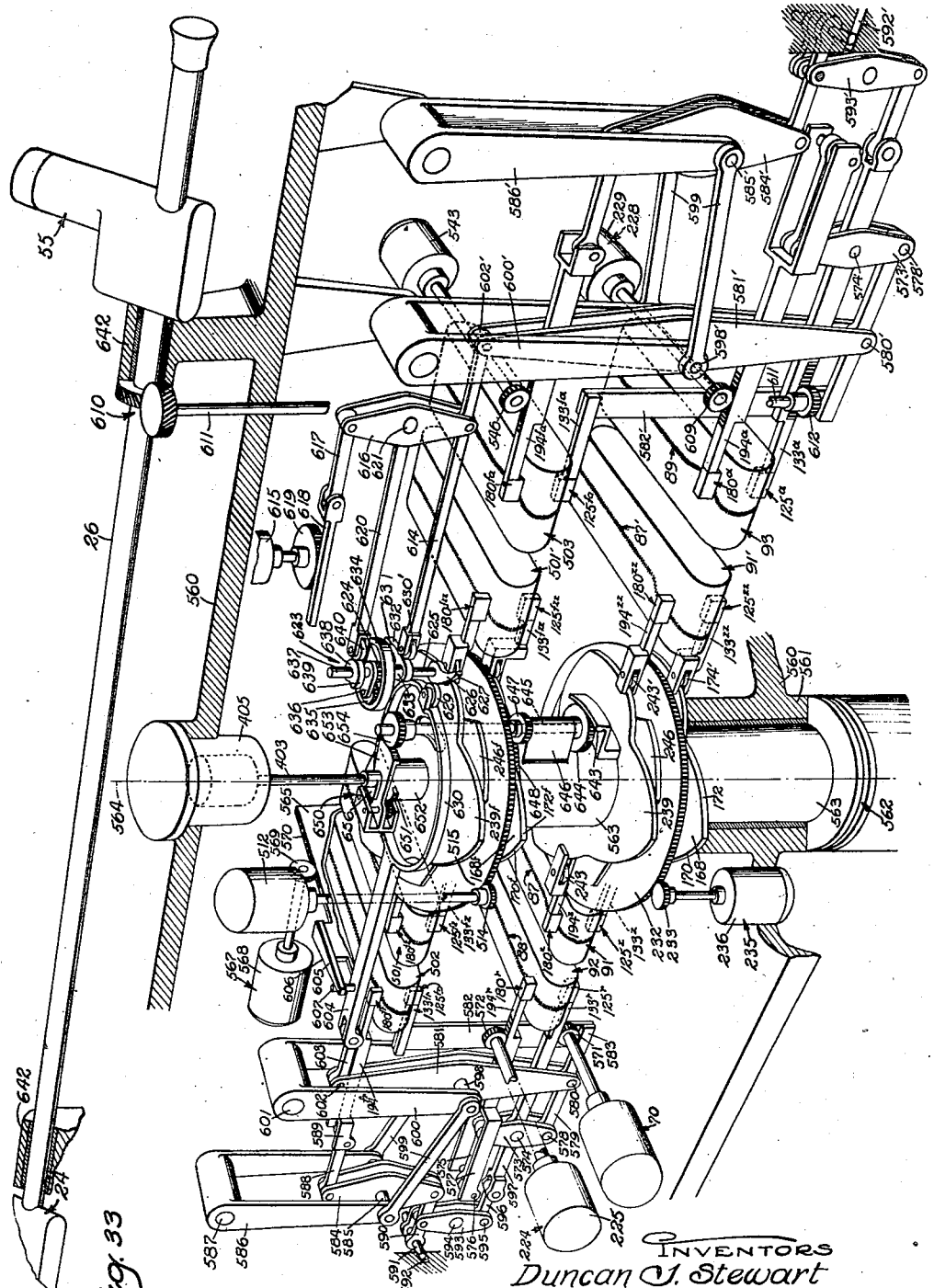

Fig. 33 is a fragmentary perspective view of a simplified director.

Figure 34:
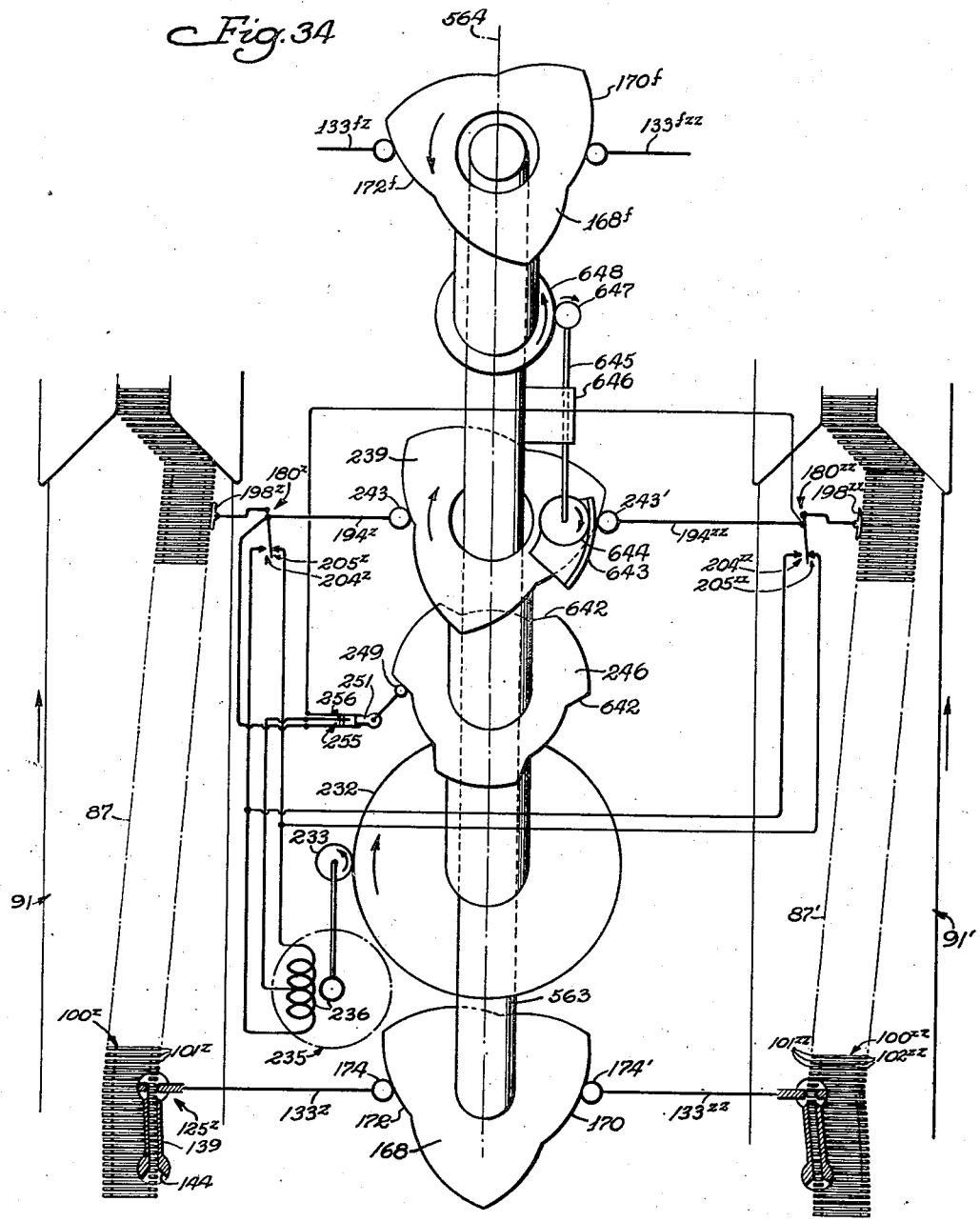

Fig. 34 is a plan view of the cam patterns for recording present azimuth and reading past azimuth in the simplified director.

Fig. 35 is a fragmentary perspective view showing the coordinate recorders and the manner of driving the same in the simplified director.

Fig. 36 is a schematic view and wiring diagram of the system for measuring and correcting the range coordinate in the simplified director.

It will be apparent as the description proceeds that the invention may be practiced in various ways and is susceptible of embodiment in many different forms depending on numerous factors including the coordinate system employed and the kind of projectile to be controlled. Also certain of the individual mechanisms or groups thereof such as the coordinate registers, the coordinate records, the computer, and the various correcting mechanisms may be constructed in various ways. It is to be understood, therefore, that I do not intend to limit the invention by the present disclosures, but aim to cover all modifications, alternative constructions, methods and uses falling within the spirit and scope of the invention as expressed in the appended claims.

*The general method of prediction*

Figure 1:
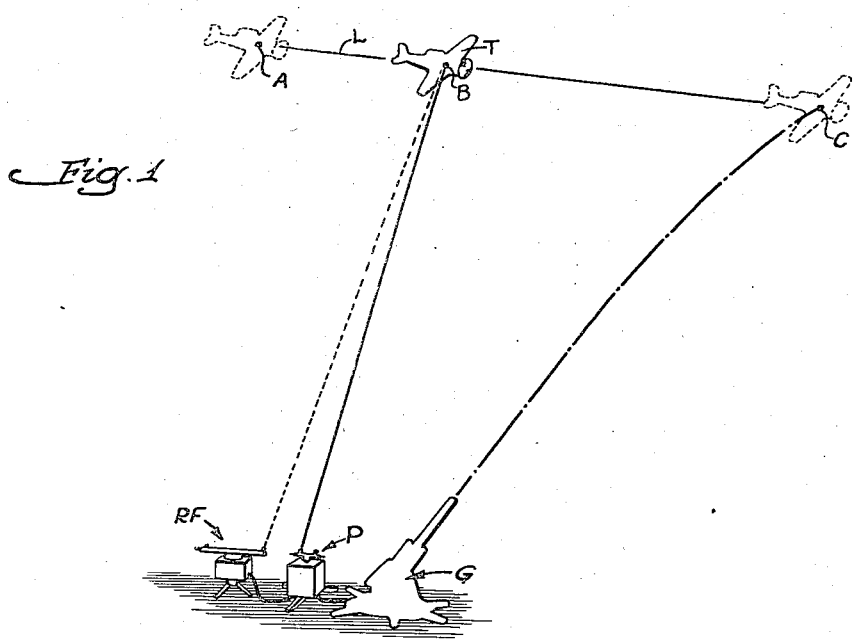
Figure 2:
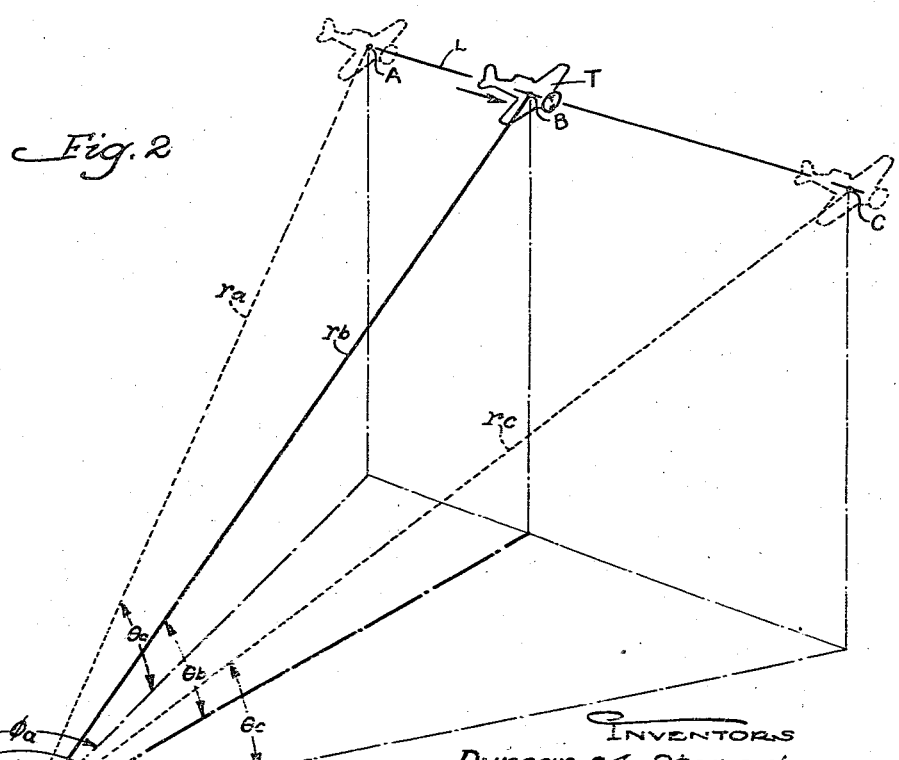
Fig. 2 is a similar view illustrating one coordinate system that may be used.

The general purpose of the invention is to make an accurate prediction of the position of a moving object or target T (Figs. 1 and 2) at a future time sufficiently advanced from the present to enable a projectile to be fired from a gun or other projector G and reach the predicted position C coincident with the arrival of the target at such position. The prediction is based on the assumption that the target travels in a straight line at a uniform velocity. Its computation involves location of the path or line L which the target is traversing and measurement of the average velocity of the target along a substantial length of the path L immediately preceding the present target position B. The line of flight is determined by measuring the coordinates of the target in its present position B and also in a past position A and the average velocity is ascertained by establishing a known time spacing of the positions A and B. On the basis of these measurements, prediction of the future target position C is made by computing the coordinates of a point on the line L advanced from the present position B in a predetermined ratio to the spacing of the points A and B. The coordinate measurements of the present position are made continuously, and the future time, that is, the interval represented by the distance BC is varied progressively in such a manner that the gun G will be conditioned for firing continuously.

The general method comprises continuously measuring the present position B of the moving target, keeping a record of the measurements to ascertain the position A that the target occupied at a known past time, and, from the past and present positions thus determined, computing the future target position C. More particularly, the improved method of prediction involves tracking the target continuously from a point O of observation to measure the values of the separate coordinates that locate the target in its present position, positioning a plurality of elements or indicators in accordance with the changing values of these present coordinates, preparing continuous records of these present coordinate values, sensing such records and controlling thereby the setting of other elements or indicators in accordance with the coordinates of the target at a past time immediately preceding the present by a known interval, and from the positions of all of present and past position indicators, computing the coordinates of the target in its future position C. Preferably, a predetermined ratio is maintained between the interval that the selected past position A lags the present position B and the interval by which the computed target position C leads the present position B, and this past interval is varied progressively so that the future time represented by BC will always be equal to the time required for the projectile to travel from the projector G to the computed position C. In this way, the projector is always aimed correctly and thus is conditioned for continuous firing. Of course, the prediction does not become accurate until after the target has been located and tracked for a time equal to the prevailing value of the past interval, that is, followed from A to B.

The future coordinates thus computed may be modified by corrections for trajectory, parallax, windage, etc., and utilized to control the aiming of the projector and also the fuse setting in the case of adjustably timed projectiles. The invention also involves a comparison of the actual and computed future positions of the target and the introduction of a correction to compensate for the differences thereby increasing the firing accuracy when the target is traversing a non-linear path.

While the foregoing method of prediction may be practiced using any of the many coordinate systems that are available, the polar system is employed in the apparatus to be described herein. That is to say, the present target position is ascertained by measuring the slant range $r_b$ of the target in its present position (distance OB Fig. 2), the altitude angle or elevation $\theta_b$ (hereinafter called "altitude" only), and the azimuth angle $\phi_b$ relative to any desired reference line. The coordinates locating the target in the past position A will be referred to herein as $r_a$, $\theta_a$, and $\phi_a$ while the predicted coordinates corresponding to the future position C are $r_c$, $\theta_c$ and $\phi_c$.

With the exception of a finder RF for measuring the range coordinate, all of the parts of the predictor are combined in a single unit indicated generally at P and joined by suitable electrical connections by which the coordinate measurements are transmitted from the range finder and to the projector or gun G. The latter incorporates suitable servo mechanism for quadrant elevation and azimuth angle adjustment, and in the case of explosive projectiles, a fuse setter of well known construction.

*Indicating present target position*

This step of the improved method of prediction involves setting up or positioning three rotary elements or indicators in accordance with the changing values of the polar coordinates of range $r_b$, azimuth angle $\phi_b$, and altitude angle $\theta_b$ which determine the present instantaneous position B of the moving target. Herein, the true values of the present coordinates are indicated, the range on a shaft 21 (Figs. 3, 5, 8, 17, 29 and 32), the azimuth on a sleeve 22 (Figs. 3, 5, 6, 8, 9, 10, 17, 18, 19, 29, 30, 31, and 32), and the altitude on a gear 23 (Figs. 3, 5, 6, 7, 10, 18, 29, and 31).

The azimuth indicator or sleeve 22 is adjusted through a direct mechanical connection with a telescope 24 (Figs. 3 and 4) on the predictor P having an eye piece 25 through which the target is viewed to track it in azimuth. The telescope is mounted on one end of a horizontal shaft 26 journaled in bearings 27 on a casing 28 whose lower tubular end is supported by a bearing 29 to turn about a vertical post 30. The latter projects from the top plate 31 of the main frame 32 (Fig. 9) of the predictor.

The shaft 26 is connected by a coupling 33 to a vertical shaft 34 which projects down through the post 30 and is journaled near its lower end in a cross plate 35 (Figs. 4, 6, 8 and 9) of the frame 32. The shaft carries a gear 36 meshing with a pinion 37 which turns a gear 38 fast on the upper end of a sleeve 39. The latter is keyed to the sleeve 22 which is journaled in a bearing 41 in the frame plate 35 and in a bearing 42 (Fig. 6) at the lower end of a bushing 43 in a cross plate 44 of the main frame. A thrust bearing 45 supports the two sleeves.

As the telescope shaft 26 is turned about the vertical axis in tracking the target in azimuth, the angular position of the sleeve 22 will be changed correspondingly so that this sleeve constitutes a continuous indication of the azimuth coordinate of the target in its instantaneous present position. Such turning of the shaft 26 may be effected conveniently by rotating a hand wheel 46 on a shaft 47. This shaft is journaled in the casing 28 and carries a worm 49 meshing with a worm wheel 51 which is keyed to the upper end of the stationary post 30. By turning the wheel 46 while viewing the target through the eye piece 25, the tracker or observer may readily follow the motion of the target in the azimuth coordinate. If desired, other well known aids may be incorporated to facilitate accurate tracking of the target.

A hand crank 52 operating through a worm and wheel 50 and gearing 53 journaled in the housing 28 may be turned to rotate the shaft 26 and enable a second observer, looking through an eye piece 54 of a telescope 55 on the other end of the shaft, to follow the target and thereby measure its elevation. The angular motion of the shaft is transmitted through a segment 56 meshing with a bevel gear 57 on the upper end of a sleeve 58 journaled in the post 30 (Fig. 4). At its lower end, the sleeve carries a gear 59.

It will be observed that since the segment 56 is on the shaft 26, turning of the latter in azimuth will cause the sleeve 58 to turn correspondingly and independently of its motion in altitude. Thus, the sleeve indicates the motion in azimuth as well as altitude. To cancel out the azimuth component, the gear 59 is connected through a gear 60 to one terminal gear 62 of a differential gearing 61 (Figs. 3, 5, 6, 7, and 10) having its other terminal gear 63 driven through gears 64 from the gear 38 on the azimuth indicator 22. The relative directions of rotation are such that the azimuth motion of the gear 38 is subtracted by the differential from the total motion of the gear 59 with the result that the angular position of the intermediate differential gear 23 or altitude indicator exactly corresponds to the instantaneous value of the altitude coordinate as measured by tilting of the telescope 55.

The range finder RF (Figs. 1 and 17) is employed to track the moving target and measure its present range. Adjustment of the finder results in positioning of a Selsyn transmitter 66 to give a continuous indication of the distance OB between the point of observation and the present target position. This indication is transmitted electrically to a Selsyn receiver 67 having a shaft 68 whose instantaneous angular position corresponds to the present range of the target. To obtain the desired accuracy, these Selsyns may be of the well known high speed type and, if desired, low speed Selsyns may be associated with each to keep the two in step in a manner known in the art.

The range indicator or shaft 21 is positioned by a power driven follow-up mechanism 70 (Figs. 3 and 17) controlled from an arm 71 on the shaft 68 of the receiving Selsyn. This follow-up mechanism, which is duplicated in numerous instances throughout the present apparatus, comprises a reversible electric induction motor 72 of the shaded pole type shown in Patent No. 2,010,869 with a main winding 73 constantly energized by alternating current and shading or control windings 74' and 75' which are short-circuited selectively to determine the direction of rotation of the motor. The latter operates through gearing 76 within a housing 77 (Fig. 3) to effect a large reduction in the transmission of the motion to the shaft or range indicator 21 which is the slowest speed shaft of the gear train. This shaft carries an arm 82 having thereon contacts 80 and 81 coacting with the arm 71 to form switches 74 and 75. The arm 82 also carries brushes 83 engaging stationary collector rings 79 respectively connected to the common and insulated terminals of the motor windings 74' and 75'.

With this arrangement, opening of one switch in response to movement of the arm 71 and a change in the range of the target will deenergize one winding and cause operation of the motor by the other or short-circuited winding. The shaft 21 will be turned until the resulting follow-up motion imparted to the arm 82 causes the then open motor switch to be closed, the motor stopping abruptly because both sets of windings 74' and 75' are short-circuited. As a result, the motor drives the shaft 21 to follow the movements of the Selsyn control shaft 68, the shaft 21 thus being positioned accurately in accordance with the values measured by the range finder.

The servo mechanism 70 is only one of the many well-known types which may be used alternatively and substituted for the various servo and follow-up mechanisms above and hereafter described.

It will be seen from the foregoing that the angular positions of the shaft 21, the sleeve 22, and the gear 23 are changed continuously with changes in the range, azimuth, and altitude coordinates of the target being followed by three observers. Thus, the true values of the three coordinates of the present target position B are indicated accurately and simultaneously and one of the points determining the line L of target flight is ascertained by measurements that are usable in computing the furture position.

Concurrently recording present coordinates

As a preliminary to indicating the coordinates of the target at a selected past time, separate records are prepared of the present coordinates as set up on the indicators 21, 22 and 23. Each record may comprise a line on a traveling web, an electrical conductor on a traveling medium, a moldable medium, magnetic devices, adjustable pins, perforations or any other device the shape of which may be varied progressively in accordance with the changing present value of one of the target coordinates.

In the present instance, each record comprises a succession of mechanical elements or lugs arranged in one or more rows that extend longitudinally of a flexible band which constitutes a traveling carrier. The elements, as they are presented successively to a setting position, are shifted edgewise of the carrier in accordance with the values of the coordinate so that the shape of each row beyond the setting or recording position constitutes a progressive record of the coordinate changes during the past time interval.

*Record carriers.*—Herein, the carriers for the individual azimuth, range and altitude records 87, 88, and 89 comprise endless chains 91, 92, and 93 (Figs. 3, 5, 8, 10, 11, 16, 17, 18, and 19) arranged in elongated loops which are mounted for endwise movement to permit of the variation of the length of the past time or distance AB. Referring to Figs. 11 and 16, the chain 91 on which the azimuth coordinate is recorded comprises two marginal rows of overlapping short links 94 pivotally connected together by shouldered pins 95 having heads 96 on their projecting ends. Elongated bars 97 each having two parallel and outwardly opening dove-tail channels 98 are fastened by pins 99 to the corresponding links 94 of the two rows, the channels of the same and adjacent links being uniformly spaced along a straight run of the chain.

Each channel 98 provides a guideway for two similarly constructed metal cars 100 (Figs. 11 and 12) spaced apart across the chain and each comprising a bar 103 of a cross-section complementing that of the guide channel and having rigid lugs or control fingers 101 and 102 at opposite ends protruding from the guideway and outwardly from the chain. The lugs 101 constitute the control elements or fingers referred to above which are shifted along the channels 98 and laterally of the chain as will be described presently to form a continuous record which varies in shape in accordance with the changing values of present azimuth.

Means is provided for locking the cars 100 against endwise movement after they have been set. While this may be effected in various ways, for example, magnetically, mechanically acting detents are employed herein each movable relative to the car transversely of the direction of adjustment thereof and operable in any position of adjustment of the car to impose a frictional force resisting movement of the car in its guideway. For this purpose, a projection 104 intermediate the lugs pivotally supports two arms 105 which straddle a second spaced projection 106 and carry a cross-pin 107 (Fig. 11) at their free ends. When this pin is disposed in a cam depression 108 (Fig. 12) in the projection 106, the projections are drawn together thereby bending the car base 103 sufficiently to lock the latter securely in its guideway 98. Now, if the arms 105 are shifted toward the car, moving the pin 107 into an adjacent depression 109, the bending force is released and the car is free to slide longitudinally in its guide 98.

Each chain is maintained in the form of an elongated loop with straight parallel sides and is mounted for bodily vertical movement along opposed guideways 111 (Figs. 5, 8, 11, and 16) formed in plates 112 and 113 rigidly connected by end plates 115 (Fig. 5) and supported by brackets 114 (Fig. 8) on the back of the frame 32 and rigid with the plate 44. The ways 111 slidably receive bars 116 disposed within the chain loop at the side edges thereof. The lower ends of the bars are connected by a yoke 117 supporting a roller 118 engageable with the chain pins 95 to define one bight of the loop. At the other ends, the side bars 116 are connected by a block 119 (Figs. 8, 11, and 16) having parallel holes 120 receiving pins 121 at the base of a yoke 122 which rotatably supports a roller 123 defining the other bight of the chain loop. Springs 124 act between the yoke 122 and block 119 to spread the rollers 118 and 123 apart and thereby maintain the chain taut and the two runs thereof straight.

The chains 92 and 93 on which the range and altitude coordinates are recorded are of the same construction as the chain 91 and their major parts are numbered correspondingly, the exponent $z$ being used to designate the parts of the azimuth record and exponents $r$ and $a$ for the range and altitude records. To form the range record 88, only one row of control lugs $101^r$ is employed, (see Figs. 3, 5, and 17) as compared to the two rows $101^z$ and $101^{zz}$ for the azimuth record 87 (see Figs. 5, 11, and 19). A single row of fingers $101^a$ form the altitude record 89 (Figs. 3, 5, and 18).

The control lugs $101^z$, $101^{zz}$, $101^r$, and $101^a$ are shifted along their guide channels by azimuth, range and altitude setters $125^z$, $125^{zz}$, $125^r$, and $125^a$ (Figs. 11, 12, and 16–19) which engage the lugs at points 124 (Figs. 17, 18, and 19) which are fixed along straight runs of the chains and are actuated transversely of the chain in accordance with changes in the angular positions of the present indicators 22, 21, and 23. To advance the chains past the setters, the heads 96 at opposite edges of the chains mesh with constant speed sprockets 126 (Figs. 5, 11, 15, and 16). These are carried on parallel shafts 127 interconnected by gears 128 and driven through appropriate speed reduction gearing by a constant speed motor 129. In the absence of alternating current of closely regulated frequency, this motor would be controlled by a governor to produce the constant speed drive.

As the cars 100 approach their setter, while unlocked, they are held in a predetermined position laterally of the chain. This is accomplished by stationary rails 131 (Figs. 11, 14, and 16 to 19) on a vertical plate 132 at the rear of the main frame 32. The rails have side guide surfaces 130 extending along the chain and receiving the lugs 101 and 102 between them. Preferably, these guides are centered approximately with respect to the range through which the associated chain cars 100 are shifted to record the maximum and minimum values of a given coordinate. As shown in Fig. 16, the rails project downwardly along the chain to the lower end of the chain loop in its lowermost position of the latter shown in this figure.

*Record setter.*—Each setter 125 is carried on the end of a slide 133 (Figs. 5, 11, 12, 14, and 16) extending through the plate 112 and a bracket 134 (Fig. 8) and guided thereby for endwise movement parallel to the car guides 98. The end of the slide is disposed adjacent the chain and carries a head 135 having a portion 136 spaced outwardly from the chain and recessed to receive a pivot 137 on the upper end of an arm 138 (Figs. 12 to 14). The latter hangs downwardly and the end portion 139 which lies close to the chain is formed with a cam slot 140 open at opposite ends and on the side facing the chain. Projecting upwardly from its pivot 141 on the stationary plate 132 is a second arm 142 telescoping into the slot 140 and itself formed with a cam slot 143 opening toward the chain. Such telescoping permits the pivot 137 to shift horizontally with the setter slide 133 while the pivot 141 remains fixed, both axes being disposed normal to the chain.

The lower end of the cam slot 143 is flared as indicated at 144 (Figs. 12 and 13) and is disposed in register with the path traversed by the control lugs 101 on the chain as these lugs pass out of the guides 130. As the cars 100 move upwardly, their lugs are guided through the slot 143 and the cars are cammed laterally in one direction or the other depending on the inclination of the slot 143 and therefore on the position of the setter slide. In passing out of this slot, the lugs enter the flared lower end 145 of the slot 140 by which the lugs are guided in between the defining walls 146 that cam the lugs into a notch 147 in the setter slide 133. One side wall 148 of this notch is rigid with the slide 133 and the other side wall 149 is on a lug 154 projecting from a downwardly hanging arm 150 pivoted at 151 on a bracket 152 of the setter head and urged toward the side 148 by a spring 153. Thus, in passing through the setter notch 147, the car lug 101 is pressed laterally by the spring 153 against the notch wall 149 and is positioned precisely in accordance with the setter position. The coacting surfaces of the car lugs 101 and the notch walls 148 and 149 are rounded as shown to prevent any possible interference between the two.

At the instant when each control lug 101 is under the positive control of the setter, that is, when the lug is engaged and held by the setter surfaces 148 and 149, means is actuated to lock the car 100 in its guide. Herein, this means comprises a bar 155 (Figs. 11, 12 and 14) mounted in guides 156 on the setter head 136 for movement toward and away from the chain and having a flange 157 disposed between the car base 103 and the free end of the locking arm 105. The other end of the bar is notched to fit over and is slidable along a cross-bar 158 (Figs. 5, 11, 12, and 16) on the upper ends of arms 159 fast on a rockshaft 161. The lock control bar 155 is thus movable independently of the setter toward and away from the chain and is also slidable with the setter along the actuating bar 158.

The arms 159 carry rollers 162 (Figs. 11 and 16) which constitute the followers for cams 163 fast on the shaft 127 adjacent the sprocket wheels 126. The lobes of the cams are spaced to correspond to the pitch of the control lugs 101 on the chain and operate to cam the follower and lock bar 155 outwardly against the action of a return spring 164 at the instant that one of the lugs 101 is held in its set position by the surfaces 148 and 149. The pin 107 on the car arms 105 is thus moved into the depression 108, and the car is bent so as to be locked in its guide channel 98. The detent action thus obtained serves to hold the arms 105 in locked position after retraction of the bars 155.

The setters for the cars 100 of all three chains 91, 92, and 93 are of the same construction. In the case of the azimuth chain and for a purpose to appear presently, separate setters 125ᶻ and 125ᶻᶻ are employed to position the cars of the two rows. The bars 132ᶻ and 133ᶻᶻ of these are disposed side by side (Figs. 8 and 11) and the setters are spaced from each other laterally of the chain, the lock shifting bars 155 both being actuated from the same cam 163.

*Recording present altitude and range.*—To set the control lugs 101ᵃ of the altitude record 89 in accordance with the true value of the present altitude, the setter slide 133ᵃ is shifted back and forth with changes in the angular position of the altitude indicator or gear 23. In the present instance, this is accomplished by a direct mechanical connection, the slide being formed with rack teeth meshing with the gear 23 (Figs. 3, 5, and 18). Thus the lugs 101ᵃ are shifted back and forth transversely of the advancing chain, the row immediately in advance of the setting position 124 being inclined as shown in Fig. 18 when the altitude is decreasing. The row is inclined reversely when the present altitude is increasing and the row is parallel to the chain motion when the altitude remains constant.

In a similar way, the slide 133ʳ is moved in unison with the range indicator or shaft 21. The connection (see Figs. 3, 5 and 17) is through idler gears 166 of the same size, the terminal one meshing with rack teeth on the extended end of the slide 133ʳ. The row of fingers 101ʳ ahead of the setting line 124 is inclined as shown in Fig. 17 in response to a progressive increase in the range coordinate.

*Recording present azimuth.*—To facilitate adjustment of the azimuth telescope 24 in initially locating a target or in continuing to follow the target so long as the latter is within range, it is very desirable that the telescope have an unlimited movement in azimuth, that is, be movable indefinitely through more than a full revolution and also be reversible at any point. To this end, the record 87 of the azimuth coordinate is set up on the chain 91 in a special way. It is divided into two parts (see Fig. 19) respectively recorded on the rows of control lugs 101ᶻ and 101ᶻᶻ and each comprising a series of subdivisions spaced apart along the chain and staggered relative to but overlapping the subdivisions of the other row. Instead of shifting the lugs 101 in proportion to the coordinate value as in the case of the range and altitude coordinates, the lugs of each subdivision are set up according to a predetermined pattern divided into successive portions of opposite slope and having a length corresponding to a predetermined change of the azimuth coordinate.

While the two patterns may be formed by one cam by proper spacing of the cam followers, separate cam disks 168 and 169 (Figs. 3, 5, 8, and 19) are employed in the present instance. One cam comprises inclines 170 angularly spaced around the periphery of the disk 168 while the other cam has similar inclines 171 spaced around the disk 169. Shorter reversely inclined surfaces 172 and 173 connect the inner and outer ends of the adjacent inclines 170 and 171. These inclines are curved as shown to impart a uniform motion to their follower rollers 174 and 175 which are mounted on the slides 133$^z$ and 133$^{zz}$ and spring urged into contact with the cam surfaces. The disks are keyed in axially spaced relation on the sleeve 39 that is keyed to the azimuth indicator sleeve 22 with the longer inclines of the two cams staggered angularly and with the angle between the ends of the long inclines of one cam including and therefore overlapping the angle between the ends of a shorter incline of the other cam.

With this arrangement, the setters 133$^z$ and 133$^{zz}$ are shifted back and forth across the chain 91 as the followers ride up one incline and down the next during turning of the disks. Thus, the lugs 101$^z$ are shifted progressively toward the center of the chain (Fig. 19) as the follower 174 rides up an incline 170, that is, with the disk 168 turning clockwise. The row of lugs 101$^z$ between the point 176 and the recording position 124 have been set in this manner while at the same time the lugs 101$^{zz}$ on the same portion of the chain were set by the final part of the incline 171 and are inclined relative to the chain at the same angle. If the azimuth continues to change in the same sense, the row of lugs 101$^z$ will continue to be inclined in the same direction as the follower 174 rides further up the incline 170. During this motion, however, the follower 175 will be riding down the next shorter incline 173 so that the lugs 101$^{zz}$ will be moved reversely, that is, toward the center of the chain. As a result of this action of the cams, the two rows of lugs 101$^z$ and 101$^{zz}$ are set in identical patterns although, in this instance, they are shifted relative to each other longitudinally of the chain by an amount corresponding to the angular displacement of the cams 168 and 169 relative to each other, both followers 174 and 175 moving along the same radial line. It will be observed that the control lugs 101$^z$ and 101$^{zz}$ forming the spaced subdivision $a$ and $a'$ of the two cam patterns are set by the cam surfaces 170 and 171 respectively and that within the length $b$ in which subdivisions overlap, they have the same inclination. The rows produced by the corresponding cam inclines will be inclined reversely during counter-clockwise rotation of the disks so that a reversal in the direction of azimuth change is evidenced by a reversal in the slope of both rows of lugs 101$^z$ and 101$^{zz}$.

It will be observed that the value of the azimuth coordinate does not change when the target is moving in a plane including the vertical axis about which the scope 24 turns. In such a case, the disk remains stationary and the lugs become set in rows paralleling the chain travel.

*Indicating coordinates of past target position*

From the coordinate records 87, 88 and 89 prepared as above described, it is possible to locate the second point A and thus determine the line of flight L as well as the distance between the points. This is accomplished by sensing the traveling records continuously and simultaneously at points spaced from the setting position 124 a distance corresponding to a known time interval established as described later, and immediately preceding the present instant at which the coordinate values are recorded at the position 124. The coordinate values $\phi_a$, $r_a$, and $\theta_a$ thus sensed are set up in three indicators the same as in the case of the present coordinates so as to be usable in the same way in the computation of the future target position. Herein, the azimuth and range indicators are constructed the same as the present indicators and comprise a sleeve 177 (Figs. 3, 5, and 19) which is positioned angularly according to the true value of the past azimuth and a shaft 178 (Figs. 3, 5, and 17) for past range. A shaft 179 (Figs. 3, 5, and 18) is adjusted angularly according to the altitude of the target in the past position A.

*Record advance.*—Sensing of the coordinate records is effected by feelers 180 which engage and are actuated by the control lugs 101 at a point 181 (Figs. 17, 18 and 19) spaced along the respective chains in advance of the setting point 124 and therefore lagging the recording position in point of time. The distance between the recording and sensing positions is, in accordance with the present invention a function of the computed time of projectile flight thereby establishing the past time interval or spacing of the present and past target positions A and B.

Advance of the chains on the sensing sides is effected by sprockets 182 (Figs. 5, 15 and 16) engaging the heads 96 on the chain links and fast on shafts 183 which are connected by gears 184. The terminal gear of the group meshes with a gear 185 (Fig. 15) which in turn meshes with the intermediate gear 186 of a differential gearing 187. One terminal 188 of this is carried by one of the shafts 127 which carries the sprockets 126 on the setter sides of the chains, these being driven at constant speed by the motor 129 as previously described. The other differential terminal is fast on a shaft 189 which carries a gear 190 driven through gears 191 by a reversible motor 192 having a main winding 193 constantly energized by alternating current and shading windings 193' and 193" selectively energized in accordance with the changing values of the computed time of projectile flight as will be described later.

This motor operates intermittently. When it is idle, the sprockets 182 on the sensing sides of the chains are driven by the motor 129 alone at the same speed as the sprockets 126 on the setter sides. The chains are then advanced at the same speeds past the recording and sensing points and the positions of the chain loops remain fixed. With the motor 192 operating in one direction, its motion is added to the constant speed motion and the sensing sides of the chains are advanced at an increased rate. Conversely, the motions are subtracted during reverse rotation of the motor 192. Whenever the sensing sides of the chains are advanced faster or slower than the setting sides, the chain loops are lowered or raised bodily along the guides 111, the shape of the loops and the positions of the setters and sensing feelers being unchanged. Thus, an increase or a decrease in the speed of the chain past the sensing point resulting from operation of the motor 192 in one direction or the other decreases or increases the length of chain between the setting and sensing points 124 and 181 and therefore the length of the past time between the present and past target positions B and A. Since the values of the past coordinates as determined by the feelers 180 must correspond to the values at a then determined past time, the intermittent drive for varying the spacing of the setting and sensing positions must be applied to the sensing sides of the chains instead of the setter sides which are advanced at constant speed. By such drive, the length of chain between the setting and sensing positions corresponds to the computed time of flight at the time the chain is read, not at the time it is set.

The past indicators 177, 178, and 179 are set in accordance with the positions of the control lugs 101ª, 101ˣ, 101ʸ, and 101ᶻᶻ without subjecting the parts to stresses that might result in inaccuracies. To this end, the sensing feelers 180 do not set the indicators directly but instead incorporate switches which are actuated by the lugs 101 and control follow-up motor mechanisms supplying the power for actually positioning the indicators.

*Senser construction.*—Referring to Figs. 5, 20, and 20ª, each sensing feeler 180 comprises a bar 194 guided by the chain supporting plate 112 for horizontal endwise movement with its free end lying adjacent the sensing side of the chain. This end has a head 195 carrying vertical pins 196 that form pivots for a block 197. Extending through and journaled in the block perpendicular to the pivot axis is a shaft 193 rigid at one end with a shoe 198 which lies close to the chain. One edge 199 of this shoe has ends tapering toward a central flat portion paralleling the chain advance. The shoe is urged edgewise into the path of the advancing lugs 101 by a light spring 200 acting between the block 197 and the bar 194. Since the passing cars 100 are at this time firmly locked on the chain links, the lugs 101 engage the shoe and, while riding along the central portion of the shoe edge 199 and past the sensing position 181, hold the bar 194 against the action of a spring (not shown) in a position corresponding to their positions laterally of the chain. Since the shoe 198 is free to turn about the axis of the shaft 193, it becomes inclined relative to the direction of chain travel in accordance with the inclination of of the row of lugs passing the reading position (see Figs. 17 to 19).

Fast on the block 197 and lying adjacent the chain is an arm 201 (Fig. 20) carrying a contact 202 disposed between two contacts 203 carried by rigid arms 206 on the head and coacting with the contact 202 to form switches 204 and 205. If the control lugs 101 as presented successively to the sensing shoe 198 are arranged in a straight line parallel to the chain motion, the past coordinate is of a constant value and of a magnitude determined by the position of the lugs laterally of the chain on which they are carried. In such a case, the switch arm will become disposed in neutral position. Sloping of the record in one direction or the other will cause the shoe 198 to turn about the pivots 196 with a resultant closure of one or the other of the switches. In the resulting operation of the follow-up motor to set the past indicator, the sensing bar 194 is moved correspondingly so that the contact 202 is allowed to return to neutral under the action of the spring 200. In this way, the bar 194 and the indicator associated therewith are power actuated to follow the changes in the position of the feeler 198 and therefore the changing positions of the control lugs passing the position 181.

*Erasing coordinate records.*—After the control lugs 101 have performed their control function, the cars 100 carrying them may be released and restored to a central position so that the record medium thus blanked is ready for reuse. This may be accomplished in various ways. As shown in Figs. 16 and 20, it is effected by a pusher 208 mounted in guides 209 on the head 195 to slide toward and away from the chain. The outer end of the pusher is connected to and slidable along a bar 210 supported at opposite ends by arms 211 on a rockshaft 212 and urged away from the chain by a spring 213. A cam disk 214 on the sprocket shaft 183 has lobes 215 spaced according to the pitch of the chain cars 100 and operable on followers 216 carried by the arms 217 to advance the pusher toward the chain car shortly after the car has passed the line 181. In this movement, a flange 218 on the inner end of the pusher engages the end of the car arms 105 and moves the pin 107 out of the depression 108 to the position shown in dotted outline in Fig. 20. The locking force is thus released and the car is free to slide relative to the chain.

Shortly beyond the sensing position, the lugs 101 and 102 encounter cam surfaces 219 (Figs. 16 to 19) converging toward each other in the direction of the chain motion and mounted on rails 220 which are supported by a plate 221 and, like the rails 131, project downwardly along the chain. The width of the cam throat at its open end corresponds to the total range of adjustment of the control lugs 101 laterally of the chain and the narrow end is centered relative to this range. At this end, the surfaces 219 merge with straight surfaces 222 which are disposed in the same planes as the surfaces 139 on the setter side of the chain. Regardless of the car position laterally of the chain after it passes the sensing point 181, one control lug engages a surface 219 by which the advancing car is cammed toward centered position in which the lugs are received between the guide surfaces 222. In passing around the lower end of the chain loop, the lugs move out of the guides 222 and into guides 130 by which they are led to the setting position as previously described.

By resetting the cars to a position approximately centrally of their range of movement laterally of the chain, the extent of movement of any car in setting it to record a maximum or minimum coordinate value or in resetting it is kept at a minimum.

*Indicating past range.*—The past range indicator or shaft 179 is adjusted by follow-up mechanism 224 (Figs. 3 and 17) whose reversible electric motor 225 is controlled selectively by switches 204ʳ and 205ʳ which are positioned by the shoe 198ʳ of the reader 180ʳ. The motor operates through reduction gearing to drive the shaft. A gear 226 on the shaft drives gears 227 one of which meshes with rack teeth on the feeler slide 194ʳ. The arrangement is such that when the range coordinate being sensed is increasing, the lugs 101ʳ will be inclined relative to the chain as shown in Fig. 17 and the switch 204ʳ will be allowed to close intermittently. With the switch closed, the motor runs in a direction to turn the shaft 178 clockwise. In response to this, the slide bar 194$^r$ will be retracted allowing the switch 204$^r$ to open when the position of the bar exactly corresponds to that of the passing lugs 101$^r$. The reverse follow-up action takes place in response to closure of the switch 205$^r$ by a decrease in the past range coordinate.

*Indicating past altitude.*—The past altitude indicator 179 is actuated in a similar way by a follow-up mechanism 228 including a motor 229 (Figs. 3 and 18). The follow-up motion is transmitted back to the feeler slide 194$^a$ through a gear 230 on the shaft 179 and gears 231 one of which meshes with rack teeth on the slide. With the control lugs 101$^a$ inclined as shown in Fig. 18 as they pass the sensing position, the shaft 179 will be turned counterclockwise to indicate the increasing altitude.

*Indicating past azimuth.*—Referring to Figs. 3, 5, and 19, the azimuth indicator or sleeve 177 is constructed and mounted in the same manner as the present azimuth indicator 22. Keyed to this sleeve is a gear 232 meshing with a gear 233 on the slow speed shaft 234 of a follow-up unit 235 having a motor 236. Because of the different way of recording the azimuth coordinate, the motor is controlled in a different manner. The subdivisions *a* and *a'* of the divided record 87 are used alternately in controlling the motor to cause the past indicator to follow the movements of the present indicator but at a later time. The control lugs 101$^z$ and 101$^{zz}$ coact with inclines 237 and 238 on cam disks 239 and 240 which inclines constitute uniform motion cams and duplicate the inclines 170 and 171 on the disks 168 and 169. These inclines are separated by shorter inclines 241 and 242. The disks are fast on the azimuth indicator 177 and are engaged along the same radial line by followers 243 and 244 which are carried by the slides 194$^z$ and 194$^{zz}$ of the azimuth feelers 180$^z$ and 180$^{zz}$ and therefore impart the proper follow-up motions to the control switches.

To utilize the subdivisions *a* and *a'* of the azimuth record alternately, switching means is provided for transferring the control of the motor 236 from the switches 204$^z$ and 205$^z$ to 204$^{zz}$ and 205$^{zz}$ and vice versa. The transfer is made in response to movement of the past indicator 177 and within the overlap *b* of the different record subdivisions during which time the position of the indicator, as determined by the joint action of the lugs 101$^z$ and one incline 237, will be identical with the indicator position as determined jointly by the lugs 101$^{zz}$ and the active cam incline 238. This follows because the cams 239 and 240 have exactly the same contour as the setter control cams 168 and 169 and their followers are arranged in the same way. Thus, at any instant the followers 243 and 244 will engage their cams 239 and 240 at points exactly corresponding to the points on the cams 168 and 169 which were engaged by the followers 174 and 175 at the instant the lugs 101$^z$ and 101$^{zz}$, now in the position 181, were set at the recording position 124.

To effect this transfer, a cam disk 246 (Figs. 3 and 19) fast on the azimuth register sleeve 177 is formed with inclines 247 and 248 alternating in angularly spaced relation around the disk and reversely inclined relative to each other. These act on a follower 249 on a shaft 250 which carries an arm 251 disposed between two spring contacts 252 and 253 cooperating with a stationary contact 254 to form two switches 255 and 256. When the follower 249 is engaging a surface 257 of the cam or either surface 247 or 248 outwardly beyond the center of the inclines, the arm 251 is swung clockwise as shown in Fig. 19 opening the switch 256. Then, the common terminal of the windings of the follow-up motor 236 is connected by a conductor 258 and the closed switch 255 to the switch arm 201$^{zz}$ of the feeler 180$^{zz}$. When the follower is engaging either cam incline inside of their center or is riding along a surface 259, the arm 251 is swung reversely passing first through neutral position in which both of the switches 255 and 256 are closed and then engaging the arm 253 to open the switch 255. The common motor terminal is then connected to the switch arm 201$^z$ and the switches 204$^z$ and 205$^z$ are in control of the motor.

With the parts conditioned as shown in Fig. 19, the switches 204$^{zz}$ and 205$^{zz}$ and the control lugs 101$^{zz}$ are in control. In response to closure of one switch 204$^{zz}$, the motor 236 is operated to turn the azimuth indicator and the cams counterclockwise. Reverse turning of the disk and indicator occurs when the other switch 205$^{zz}$ is closed in response to a reversal in the slope of the line of lugs 101$^{zz}$ passing the reading shoe 198$^{zz}$. If there is no change in the past azimuth, the passing lugs 101$^{zz}$ will parallel the chain path and both switches will remain open and the motor 236 will be idle.

After a short clockwise turning of the azimuth indicator from the position shown in Fig. 19, the transfer follower 249 will ride down the incline 248 and, as it passes the center, will swing the arm 251 in a direction to allow the switch 255 to close. This places both rows of lugs 101$^z$ and 101$^{zz}$ in control simultaneously. However, since the pattern set up on these lugs corresponds to the cam surfaces 170 and 171 which are duplicated by the inclines 237 and 238, both rows of the lugs produce the same control effect on the motor 236 with the result that there is no conflict. This concurrent action takes place until there is a further azimuth change. If the next change is in a direction to again turn the indicator clockwise, the switch 255 will be opened, leaving the switch 256 closed so as to place the switches 204$^z$ and 205$^z$ in control of the motor 236. It will be observed that the transfer from one set of switches to the other occurs at some point within the overlapping portions *b* of the azimuth records and that the exact point of transfer is immaterial.

By setting up the azimuth coordinate in two parts each of which follows repeated cam patterns with the patterns of different parts staggered and overlapping and by controlling the follow-up action of the record feelers by an identical cam pattern, the past azimuth indicator 177 is turned angularly back and forth according to the changing value of the present azimuth coordinate but at a time lagging the present by an interval determined by the spacing of the positions 124 and 181 at which the azimuth coordinates are set up and sensed. At the same time, this arrangement permits of an unlimited movement of both the present and past indicators in either direction as well as reversal at any point. Following of the target in azimuth is thus greatly facilitated as is the changing from one target to another.

*Computing coordinates of future target position*

The coordinates of the present and past target positions as set up in the six indicators 21, 23, 22, 177, 178, and 179 may be combined in various ways and through widely different mechanisms to compute the position of the target at a future time. For example, the computation may be by direct extrapolation which, although approximate, gives results sufficiently accurate for controlling the firing of certain kinds of projectiles under certain conditions assuming that the target flight is straight. This method is illustrated in Figs. 33 to 36. A method which is exact for straight target flight is illustrated in Figs. 3, and 21 to 28. This involves the steps of geometrically representing in miniature the present and past target positions, locating on a line through these positions a point corresponding to the future position, and measuring the coordinates of the latter point.

Referring first to Fig. 22, the geometrical computer comprises generally three arms 261, 262, and 263 of variable lengths swingable universally about fixed pivots O, O', and O'' spaced apart short distances along a straight line, the arms being pivotally connected at their free ends $a''$, $b'$, and $c$ to a bar 264 which maintains the points in a straight line and variably spaced so that the distance $a''c$ bears a fixed ratio, 3 in this instance, to the distance $a''b'$. The fixed pivots are spaced in the same ratio, that is, OO''/O'O'' equals 3. In a broad sense, the arms and the bar 264 form a pantograph system which operates mechanically to adjust the length and position of the arm 261 and the point $c$ in accordance with changes in the lengths and angular positions of the arms 262 and 263.

The points $a''$ and $b'$ represent in miniature the past and present target positions as defined above and are positioned in space and relative to their pivots O'' and O' in accordance with measured coordinates of these target positions. Thus, the arm 263 is lengthened and shortened in accordance with the changing values of the past range $r_a$ and its angular position is determined by the past azimuth and altitude values $\phi_a$ and $\theta_a$. In a similar way, the arm 262 represents in miniature a line extending from the point of observation to the target in its present position. Through the pantograph system, the point $c$ will be positioned in accordance with the position of the target at a time leading the present by twice the time represented by the distance AB or in miniature by $a'b'$. This will be apparent from the following considerations and reference to Fig. 22. The lines $Oa$ and $O'a'$ are by construction parallel to $O''a''$ and of the same length as the latter. Similarly, $Ob$ is a line parallel to and of the same length as $O''b'$ but extending through O. Thus, $a''$, $a'$ and $a$ lie in a straight line and $a'b'$ is a true representation in miniature of the path of the target in traveling from the past position A to the present position B. The lines $a'b'c$ and $aa'a''$ determine a plane and triangles $a'b'a''$ and $a''ca$ lie in that plane. Since by construction of the pantograph, the ratio of $a''c/a''b'$ is fixed and equals OO''/O'O'', the triangles $aca''$ and $a'b'a''$ are similar and $ac/ab$ is equal to OO''/O'O''. Accordingly $ab$ is a true replica of the target path from the past to the present time so that if the target continues in a straight path it will arrive at a position C represented in miniature at $c$ at a time later than the present and equal to the time represented by the distance between $a$ and $b$ multiplied by the ratio OO'/O'O''.

It follows from the foregoing by setting the points $a''$ and $b'$ in accordance with the past and present target positions, the pantograph system will establish and therefore compute the location of the point $c$. The arms 261, 262, 263, the link 264, and the points O, O', O'', $a''$, $b'$, and $c$ are the only parts of Fig. 22 which have physical embodiment in the computer, the other lines being for construction purposes only.

By altering the time between the past and present target positions A and B for which the coordinate measurements are made, the target position at any future time will be computed automatically. In order, however, that the gun may be fired at any instant, the present invention contemplates adjusting the past time, that is, the time between A and B, so that the future time, that is, the time proportioned to the distance BC will be equal to the time of flight of the projectile from O to C. That is to say, the computing mechanism establishes the target location at a future time equal to the time required for the projectile to reach such location. To accomplish this, it is only necessary to insure that the time between the past and present positions A and B is equal to the time of flight multiplied by the fixed ratio O'O''/OO' in the computer.

Of course, any alteration in the past time changes the computed time of flight and that in turn alters the time between the present and past target positions. But, all parts are connected mechanically and the process is a continuous one which ultimately results in establishing a correct time of flight at all times. With the apparatus disclosed, the prediction of the future target position actually becomes correct after the target has been located and tracked for an interval equal to one half the time of flight, or in other words, for the past time interval.

It will be observed that the positions of the computer arms 261, 262, and 263 are relative so that while the free ends of these arms represent the past, present and future positions in miniature, the arms do not need to point toward the actual target positions. For convenience in manufacture, it is desirable to invert the arms and suspend them from the points O, O', and O''.

*Mounting of computer arms.*—Referring first to the construction and mounting of the arm 262, this comprises a rack bar 266 (Figs. 3, 6, 8, and 21) carrying a block 267 at its lower ends providing a socket which receives a ball 268. The center of the latter constitutes the point $b'$ which represents in miniature the present target position. A dove tail groove 269 on one side of the rack mates with and provides a guideway for a slide 270 which is guided for endwise movement in a way 271 on one side of an inverted U-shaped member 272. Fast on one end of the latter is a sleeve 273 which is journaled in one depending leg 274 of a yoke 275 keyed at 276 (Figs. 6 and 8) to the lower end of the present azimuth indicator or the sleeve 22. A pinion 277 (Fig. 21) mounted on the slide 270 meshes with rack teeth on the upper side of the bar 266 and also with teeth 278 on yoke member 272 so that as an incident to endwise shifting the rack bar, the slide is moved in the same direction. As a result, the rack bar does not overhang its supporting guide to an objectionable degree.

*Setting present coordinate arm.*—The arm 262 thus mounted turns with the indicator 22 about the axis of the latter and is positioned angularly in accordance with changes in the present azimuth measurement. The rack bar 266 is tilted about the point O' and the axis of the sleeve 273 in accordance with changes in the true value of the present altitude. To this end, the gear 59 operates through the gear 60 to drive a gear 279 (Figs. 3, 5, 6, 8, and 18) fast on the upper end of a shaft 280 which extends down through the azimuth sleeve 22. A gear 281 on the lower end of this shaft meshes with a gear 282 on a vertical shaft 283 which is journaled in the other depending leg 285 (Fig. 6) of the rotatable yoke 275 and carries a bevel pinion 284 that meshes with a gear 286 fast on the U-shaped member 272. It will be observed that rotation of the yoke member 275 in azimuth produces a corresponding rotation of the shaft 283 which effect is subtracted from the motion of the shaft in altitude. Thus, this effect cancels the part of the motion of the gear 59 produced as above described by an azimuth motion of the telescope 24. As a result, the shaft 283 turns and the arm 262 is tilted in accordance with the true value of the present altitude coordinate, and this, without the interposition of a correcting differential in the drive gearing.

The rack bar 266 is shifted endwise so as to change the length of the arm 262 in accordance with the true value of the present range coordinate. This is accomplished through the medium of a pinion 287 (Figs. 3, 6, 8, and 21) meshing with teeth on the underside of the rack and fast on a shaft 288 journaled in the sleeve 273. A bevel gear 289 on the shaft meshes with a gear 290 on the lower end of a vertical shaft 291 journaled in the yoke leg 274 and carrying a gear 292 at its upper end. This meshes with the intermediate gear 293 of a differential 294 (Figs. 3, 6, and 8) having one terminal driven from the altitude shaft 283 through gears 295. The other terminal is on a shaft 296 carrying a gear 297 meshing with a gear 298 on the lower end of a sleeve 299 which extends upwardly through the azimuth sleeve 22 in which it is journaled in bearings 300. This sleeve supports the bearings 301 in which the altitude shaft 280 is journaled.

On its upper end, the sleeve 299 carries a gear 302 meshing with the intermediate gear 303 of a differential 304 (Figs. 3, 5, 8, and 17). One terminal of the latter is fast on the present range register or shaft 21 while the other terminal carries a gear 305 meshing with the gear 33 on the azimuth sleeve 22. The differentials 294 and 304 are necessary because the arm 262 is supported by the azimuth indicator 22 and because the range motion is transmitted to the arm along the axis of this indicator and also along the axis of the sleeve 273 which turns with altitude changes. Thus, the differential 304 corrects the measured present range for motions in azimuth while the differential 294 corrects the range for motions in altitude, the length of the arm 262 being adjusted in accordance with the true value of the present range as initially indicated by the shaft 21.

*Setting past coordinate arm.*—The arm 263 is adjusted in length and angular position in accordance with the movements of the past coordinate indicators 177, 178, and 179. It is constructed and mounted in the same way as the arm 262 and the parts are numbered correspondingly with the addition of the exponent $a$. Except in the case of the past altitude, the actuating connections are the same as for the present arm 262. This exception results from the fact that the past altitude as set up initially on the shaft 179 is the true value as a result of which it is necessary to introduce a differential 306 (Figs. 3 and 18) to cancel the false altitude motion of the arm 263 which results from the motion in azimuth of the yoke 275ª on which the altitude connections are carried. The differential is interposed in the connection adjacent the past altitude indicator 179, the terminals being connected respectively to the indicator and to a gear 307 meshing with the azimuth gear 232. The intermediate gear 308 meshes with the gear 279ª. Thus, the differential 306 functions to cancel out the motion of the shaft 283ª (Fig. 3) which is caused by turning of the past azimuth indicator 177. As a result, the member 272ª and therefore the arm 263 will be tilted about the fixed pivot O″ in accordance with the true value of the past altitude and thereby move exactly in unison with the past altitude register 179.

It will be evident that the center of the ball 268ª which defines the point $a''$ of the pantograph, is swung around the axis of the past azimuth indicator 177 with changes in the past azimuth, is tilted about the fixed pivot center O″ with changes in past altitude and is moved toward and away from this center as the past range decreases and increases.

*Pantograph and its operation.*—Referring now to Figs. 3 and 23, the pantograph proper includes an I-beam 317 carrying a rigid upstanding post 318 on the upper end of which is the ball 268. The point $b'$ is thus rigid with the beam. Freely movable longitudinally of the beam on opposite end portions thereof are two slides 319 and 320 each of which comprises a flat plate 321 disposed above the beam (see Fig. 23) having V-shaped ways 322 along its under side receiving balls 324 which are held in spaced relation by a cage plate 323 and ride along ways 330 on the upper side of the beam. Similar balls 329 beneath the beam flanges 325 roll along ways 326 on the under side of the beam flanges and also along ways 327 supported in brackets 328 and held in place by a cage 331. The latter extends up through slots 332 in the beam flanges and is clamped to the cage 323. The brackets depend from opposite margins of the plate 321 and leaf springs 333 on the under sides of the brackets urge the ways upwardly relative to the brackets and take up any looseness in the bearings.

The antifriction mounting thus provided guides the slides 319 and 320 accurately and permits the slides to move freely along the beam.

The ball 268ª, the center of which constitutes the point $a''$ of the pantograph, is on the upper end of a post 318ª upstanding from the slide 319. A similar post 318ᶜ on the slide 320 supports the ball 268ᶜ which defines the pantograph point $c$.

The slides 319 and 320 are movable along the beam to permit of the variation above referred to in the spacing of the points $a''$ and $c$ from the point $b'$. To maintain the ratio $a''c'/a''b'$ equal to three, a gear 334 (Fig. 3) is mounted on the top of the beam 317 to turn about a vertical axis. with it turns a gear 335 of one-half the pitch diameter of the gear 334. The latter gear meshes with a rack 336 rigid with one end of a leaf spring 337 attached to a block 338 on top of the slide 319 so that the rack is urged toward the gear. A rack 339 meshes with the opposite side of the gear 334 and is similarly mounted on a leaf spring 340 secured to the under side of the slide 320. By virtue of this connection between the two slides and the beam, relative movement between the points $a''$ and $b'$ will be transmitted to the point c in the desired fixed ratio.

To minimize friction on the parts and provide for accuracy in the transmission of motion by the pantograph, suitable means is provided for counterbalancing the weight of the beam and other parts.

With the pantograph constructed as above described, it will be observed that the ball 268c or point c will be moved in accordance with changes in the lengths and inclinations of the present and past position arms 262 and 263 while the ratio $a''c/a''b'$ is maintained fixed. The points $a''$, $b'$ and $c$ are of course always maintained in a straight line. Accordingly, the movements of the points $a''$ and $b'$, which represent in miniature the past and present target positions, are utilized through the medium of the pantograph system to combine the present and past coordinates as recorded on the indicators and thus compute or establish the location of the point $c$ which represents the future or predicted target position.

*Measuring future coordinates.*—To ascertain the azimuth, range, and altitude coordinates of the computed future target position, the future arm 261 is adjusted in length and position in response to changes in the position of the point c, and these adjustments are communicated to shafts 355 and 356 and a sleeve 357 (Figs. 3, 10, 17, 18, and 19) which constitute respectively the indicators for the future range, future altitude and future azimuth coordinates $r_c$, $\theta_c$, and $\phi_c$. These indicators and the arm 261 are constructed and mounted on the frame plates 35 and 44 in the same way as the present and past registers previously described, and the connections between the arm and the indicators are of the same general construction, the main parts being indicated by corresponding reference numerals to which the exponent c has been added.

Instead of making the socket for the ball 268c rigid with the arm 261 as is in the case of the arms 262 and 263, a connection is provided which permits of relative movement between the arm and socket in three directions respectively corresponding to the range, azimuth, and altitude movements of the point c. The degree of such movement is sufficient to permit the actuation of switches controlling follow-up mechanisms 358, 359 and 360 (Figs. 3 and 29) by which the future azimuth, altitude, and range indicators and the arm 261 are actuated. To these ends, the ball socket is rigid with a lever 361 (Figs. 3, 23, and 24) projecting through a hole 362' in a square tube 362 to which the lever 361 is pivotally connected intermediate its ends by pins 363 and thereby adapted to swing about an axis parallel to the rack bar 266c but guided by surfaces 368 on the tube 362 so as to be held against movement along the rack bar. The tube 362 in turn projects through a hole 395 in a lever 364 and is pivotally connected to the latter by pins 365 which extend perpendicular to the pins 363. The lever is disposed between the lower end of the rack bar 266c and a bracket 367 thereon and is pivoted on a pin 366.

The multiple gimbal pivot thus formed provides for three independent motions of the pantograph point c relative to the arm 261 and functions to segregate from each other the motions of the point which are due to changes in azimuth, altitude and range. Thus, the lever 364 is swung about the pivot 366 in response to movements of the ball 268c in altitude. Such actuation controls switches 369 and 370 (Figs. 18, 23, and 25) each of which comprises a common contact 371 coacting with contacts on fingers 372 carried by a block 373 of insulation fast on the arm 261 beyond the end of the lever 364. The fingers are disposed on opposite sides of the contact 371 which comprises a disk on the free end of the lever 364, the arrangement being such that an increase in altitude when the switches are in neutral position or open as shown in Fig. 23 closes the switch 370. Similarly, reverse movement of the lever as the future altitude decreases closes the switch 369 as shown in Fig. 18.

The switches 369 and 370 control the operation of the follow-up mechanism 359 (Figs. 3 and 18) to position the future altitude indicator or shaft 356. This mechanism comprises a reversible motor 375 having windings respectively controlled by the switches and its shaft connected through speed reduction gearing to one terminal of a differential 378. The other differential terminal is driven from a gear 380 on the azimuth indicator 357 through a gear 386 and its intermediate gear 377 meshes with a gear 394 fast on the shaft 280c (Figs. 3 and 18). In response to closure of the switch 369, the motor 375 runs in a direction to turn the register 356 and, through the gears 231c, 282c, 284c, 286c and the shaft 283c, tilt the yoke member 272c and the arm 261 in a direction to follow-up the motion of the lever 364 until the switch 369 is again opened. In a similar way, the motor is operated reversely to follow-up a motion of the lever 364 which closes the switch 370. Thus, the arm 261 is positioned in altitude in accordance with the motions of the ball 268c resulting from changes in the positions in points $a''$ and $b'$ caused by changes in the past and present altitude coordinates.

Changes in the future range as computed by the pantograph system cause movement of the lever 361 about the pivot 365 and a disk 390 (Fig. 23) thereon operates switches 381 and 382 which are of the same construction as the switches 369 and 370 with their spring contacts mounted on a block 383 of insulation and coacting with the contact disk. The block is carried by a bracket 384 rigid with and projecting laterally from the lower bracket 367. The switches control the reversible motor 385 (Figs. 3 and 17) of the follow-up mechanism 360 which operates through reduction gearing to drive the future range indicator shaft 355. The latter is on one terminal of a differential 387 whose intermediate gear 388 meshes with the gear 302c. The other differential terminal is connected by a gear 305c to the gear 380 on the azimuth indicator. Thus, the motor 385 operates through the medium of the gears 388, 302c, 298c, 297c, the differential 294c and the gears 292c, 290c, 289c and the pinion 287c to adjust the length of the arm 261. In response to closure of either of the switches 381 and 382 following a change in the computed or future range, the motor 385 runs the pinion 287c in a direction to lengthen or shorten the arm 261 to correspond to such change. The motor stops when the follow-up motion imparted to the switch contacts causes the active switch to be opened.

Changes in the future azimuth as determined by the pantograph system cause swinging of the lever 361 (Figs. 19 and 23) at right angles to the range motion and about the pivot 363. In these motions, the disk 390 operates switches 391 and 392 which are mounted on the block 383 and disposed on opposite sides of the disk 390 along a diameter at right angles to the diameter through the range switches. The follow-up mechanism 358 includes a reversible motor 401 (Figs. 3 and 19) controlled by these switches and operating through reduction gearing to drive a shaft 402 carrying a gear 402 that meshes with the gear 386 connected to the gear 389 on the azimuth sleeve 357. As a result, this sleeve will be turned in one direction or the other according to which of the switches 391 and 392 is closed, and the motion will continue until the arm 261 has followed up the movement of the lever 361 and opened the controlling switch. As in the case of the present indicators, the arm 261 and all of the parts for actuating the same are carried by the yoke 275c which in turn is journaled in the main frame plates 35 and 44.

There is an additional normally closed switch 393 (Figs. 23 to 26) associated with each of the switches 369, 370, 381, 382, 391, and 392 above described and arranged to be opened in the event of over travel of either of the levers 361 and 364 in either direction. These switches are safety devices and act through appropriate relays, magnetic clutches or the like to disable one or more of the drive mechanisms in the event of such over travel.

From the foregoing, it will be observed that the pantagraph system, which is actuated in accordance with changes in the present and past coordinates, geometrically computes the future target position as represented in miniature by the point c and controls the switches by which the follow-up mechanisms are actuated to set up the separate indicators and thereby segregate the computed future coordinates. By utilizing the follow-ups, straining of the parts and consequent inaccuracy are avoided in the positioning of the arm 261 and setting of the future indicators, both of these functions being performed by one set of follow-ups.

Transfer of future azimuth coordinate

The motions of the future azimuth indicator 357 may be utilized directly to control the positioning of the gun in this coordinate. This may best be accomplished by providing a Selsyn transmitter 405 (Figs. 3 and 19) having its rotor fast on the shaft 403 which carries the gear 386 that turns in unison with the future azimuth indicator. This Selsyn may be of the dual or high and low speed type to increase the accuracy of motion transmission. A Selsyn receiver 404 (Fig. 19) of similar type is energized from the transmitter through the electrical connections above referred to and utilized in the usual way through a power driven servo actuator (not shown) to position the gun continuously so that except for the influence of windage and parallax, the gun is always set in accordance with the future azimuth coordinate as computed by the director.

Control of quadrant elevation

This setting of the gun is determined not only by the computed future altitude coordinate but also by the future range, trajectory, etc. It is computed by means of a three-dimensional cam 407 (Figs. 3, 17, 18, and 27) contoured in a manner well known in the art to provide a point on its peripheral surface radially spaced according to the correct quadrant elevation for each different combination of range and altitude. The cam is mounted for rotation in accordance with the changing value of the computed future range and is shifted axially with changes in the future altitude. Its follower, which comprises a ball 408, is mounted on the end of a rack bar 409 guided for endwise movement and meshing with a gear 410 on the rotor shaft of a dual motor type of transmitting Selsyn 411. Through electrical connections, the transmitter motion is reproduced in a Selsyn receiver 412 on the gun carriage and this receiver is utilized to control a servo actuator by which the gun is positioned for the correct quadrant elevation.

The cam 407 is fast on a vertical shaft 414 journaled in the main frame 32 to slide endwise. A gear 415 fast on the shaft has sliding meshing engagement with an elongated gear 416 on a shaft 417 which herein is driven from the future range indicator 355. Herein the connection includes interconnected gears 418 and 419, a vertical shaft 420 and gears 421. Through this connection, the same 407 will be oscillated varying distances back and forth in accordance with the continously changing values of the computed future range coordinate, the power for producing these motions being supplied by the follow-up mechanism 360. With an increase in range, the cam rotation is counterclockwise as viewed in Fig. 3. The connection is here illustrated somewhat diagrammatically and, of course, is constructed to provide for the proper ratio of transmission of the motions of the future altitude indicator.

To provide for axial shifting of the cam 407, a screw threaded portion 423 (Figs. 3 and 18) of the shaft 414 carries a nut 424 which is journaled in the main frame and carries a gear 425 meshing with a gear 426. The latter is driven through bevel gears 427, a horizontal shaft 428, and gears 429 and 430, one of the latter being fast on the shaft 356 or future altitude indicator. The connection thus provided is driven by power derived from the follow-up motor 359 with the result that the angular motion of the future altitude indicator is converted into axial movement of the cam 407 which is lowered during an increase in altitude and raised as the future altitude decreases. The ratios of gearing, herein shown more or less diagrammatically, are of course correlated with the contour of the cam so that the latter changes the position of the follower 409 exactly in accordance with changes in the position of the altitude indicator.

The scale factor of the cam 407 may be improved, if desired, by contouring the cam so that its follower will be actuated in accordance with so-called super-elevation. In such a case, a differential would be provided to add the super elevation correction to the future altitude measurement, the sum being quadrant elevation. Such an arrangement is incorporated in the simplified predictor shown in Figs. 33 to 36.

Corrections for windage and parallax

The apparatus described above may be modified to introduce corrections for windage and parallax. One way of accomplishing this is to mount the future azimuth indicator 357 (Fig. 3) for axial or vertical adjustment so that the position of the pivot center O of the arm 261 may be changed relative to the centers O' and O'' of the other computer arms 262 and 263. In the case of windage, which is the more important of the two corrections, the change in the center O would depend upon the amount of the wind, and its direction, and also upon the computed time of flight. Provision for such corrections would of course involve some rearrangement of the parts as described above and the use of universal joints in certain of the connections to permit of the adjustment of the center O.

*Establishing time of a projectile flight*

The time required for the projectile to travel from the gun or other projector to the target in the predicted future position of the latter is also controlled by the future range and future altitude coordinates and computed by a three dimensional cam 434 (Figs. 3, 17, 18, and 27) fast on the shaft 414 and engaged by a follower 435. The peripheral contour of the cam is such that the follower occupies a definite endwise position for each combination of future altitude and range which respectively determine the axial and angular positions of the cam. The time of flight thus determined is used to establish the variable past time interval above referred to and also to control the fuse setter of the gun. It is impractical, however, to set the fuse after the shell is inserted in the gun and in actual practice there is a so-called "dead time" which elapses between the setting of the fuse and firing of the gun. This time ranges from one to two seconds but is nearly constant for any one gun crew.

This dead time cannot be corrected for by adjustment of the fuse setter. The present invention contemplates the incorporation of further correction of the fuse setting by an amount determined by the change in target position which occurs during an interval immediately preceding the present and equal to the dead time. This correction is sufficiently accurate in most instances, the compensation being exact where the rate of change of the time of flight remains constant.

The general method of ascertaining the amount and sense of the correction involves recording the computed values of the time of flight on a traveling medium, sensing the recorded values at a point on the medium beyond the recording position and therefore lagging in point of time by the amount of the dead time, comparing this reading with the present value of the time of flight to determine whether the time of flight is increasing or decreasing, and adding or subtracting the time change to the computed time of flight to ascertain the correct fuse setting. Provision is also made for adjusting the length of the dead time as used to determine the correction so that the correction may be adapted to different gun crews.

As shown in Figs. 3, 5, 10, 15, and 27, the apparatus used to ascertain the correction includes an endless chain 437 constructed and mounted in the same manner as the chains 91, 92 and 93 previously described and having corresponding parts bearing the same reference numerals except for the addition of an exponent $d$. This chain is located at the rear of the main frame and the parts are mounted on a sub-frame including side members 436 (Fig. 10) which guide the chain supporting frame bars 116$^d$ and are connected by bars 438 (Fig. 27) bolted to the side members 436 and support the guides 130$^d$ which engage and reset the lugs 101$^d$ and 102$^d$ of the chain cars 100$^d$.

The chain 437 is driven at constant speed by the same constant speed motor 129 (Fig. 15) which drives the setting sides of the present memory chains. This drive is from the motor shaft through shafts 439, 440, and 441 which are connected by sets of beved gears 442. The shaft 441 carries sprockets 443 meshing with the straight run of the chain on the reading side thereof. Immediately beyond the setter, the chain cars are locked, and beyond the sensing feeler, the cars are unlocked in the manner previously described by cams 163$^d$ and 214$^d$ (Figs. 5, 15, and 27) whose followers actuate the bars 155$^d$ and 208$^d$ of the setter and sensing feeler. The cam 214$^d$ is fast on the sprocket shaft 441 while the cam 163$^d$ is driven from this shaft through gears 445.

The computed values of the time of flight are recorded on one straight run of the chain 437 by a setter 125$^d$ of the same construction as the setter 125 previously described in detail and engageable with the control lugs 101$^d$ to shift the chain cars 100$^d$ transversely of the moving chain. The head 135$^d$ of this setter is carried by an upstanding arm 446 on an L-shaped slide 447 which is suitably guided in the sub-frame and which is attached rigidly to the cam follower 435. The latter is thus shifted and the lugs 101$^d$ are set relative to the chain in accordance with the prevailing values of the time of flight.

The time of flight record thus produced is sensed preferably on the other straight run of the chain 437 at a point spaced beyond the setter 125$^d$ by a distance corresponding exactly to the dead time which is manually adjustable. The sensing is effected by a feeler 180$^d$ (Figs. 10 and 27) constructed the same as the memory chain readers previously described and having a shoe 198$^d$ with a surface 199$^d$ engageable with the lugs 101$^d$. This shoe is carried by a bar 451 slidable endwise on the sub-frame.

The present time of flight values as determined by the position of the setter 125$^d$ and the past values as determined by the position of the bar 451 (Figs. 10 and 27) are compared to determine the amount and sense of the change in the time of flight occurring during the past dead time interval and the change thus determined is incorporated in the fuse setting. This is accomplished herein by a differential comprising a lever 452 pivoted at its center on a stud 454 which is mounted on a lug 455 upstanding from the setter carrying slide 447. One end of the lever is pivotally connected at 456 to the feeler slide 451. Because the pivot 455 floats with the setter slide, the end 457 will be moved in accordance with the difference between the present and past values of the computed time of flight. If these values are the same, the lever will be disposed in the position shown in Fig. 27. The end 457 will be swung to the left and right respectively as viewed in this figure when the past value of the time of flight is greater or lesser than the present value.

The change in time of flight thus determined is added algebraically to the computed value of the time of flight as determined by the motion of the cam follower 435 and the resultant is communicated to an accurate Selsyn transmitter 458 (Fig. 10) which in turn is connected electrically to a receiving Selsyn (not shown) associated with the gun and controlling the fuse setter therefor in a well known manner. For this purpose, the drive shaft 460 of the Selsyn 458 is arranged to be driven through appropriate reduction gearing by a follow-up mechanism 463 (Figs. 3 and 10) including a reversible motor 462 controlled by switches 464 and 465 (Fig. 27) which are actuated in response to movement of the time of flight follower 435 and the difference between the present and past time of flight values as reflected in the displacement of the lever end 457 from a neutral position. The switches comprise arms 466 and 467 coacting with contacts on a tongue 468 which constitutes the long arm of a bell crank 469 pivoted at 470 on a slide 471 and having a short arm connected to the lever end 457. Through a bracket 472, the arms are supported on the slide 471 which is suitably guided for endwise movement and is longitudinally threaded to form a nut 474 threading onto the end of the shaft 460. In response to a time of flight change, the bell crank 469 will be swung in a direction to close one of the switches 464 or 465 and the motor 462 will be energized to turn the shaft 460 until the switch is again opened. In this way, the Selsyn 458 is set in accordance with the computed time of flight combined with a dead time correction of the proper sense and amount.

To enable the length of the dead time to be adjusted at will, one of the side bars 116d (Figs. 3 and 10) supporting the chain 437 carries a nut 475 into which threads a vertical shaft 476 journaled in the director frame. At its upper end, the shaft carries a hand crank 477 which may be turned to raise or lower the chain carrier and thereby increase or decrease the length of the chain 437 between the recording and reading points. The chain being driven at constant speed, this represents a change in the effective dead time.

Automatic adjustment of the past time

As set forth above, the reversible motor 192 (Figs. 5, 10, and 15) is operated intermittently to vary the speed of advance of the record chains 91, 92, and 93 past the reading positions and thereby correspondingly change the length of the memory or past time interval so as to maintain the fixed ratio between this interval and the computed value of the time of flight. Herein, the direction and extent of operation of the motor are controlled by switches 481 and 482, (Figs. 3 and 27) which are formed by contacts on arms 483 coacting with a tongue 484 on a lever 485 pivoted at 486 on a block 487 which is mounted adjacent the slide 447 and guided for movement parallel to the latter. Beyond the pivot, the lever is connected to a pin 459 depending from the slide 447 so that the lever is swung back and forth with changes in the time of flight as evidenced by movement of the cam follower 435.

The block 487 carries a nut 488 into which threads a shaft 489 connected through bevel gears 490 and a gear 491 which meshes with the gear 199 driven by the motor 192 and carried by one terminal of the differential 187 (Fig. 15). Through these connections, the motor 192 acts as a follow-up to position the slide 487 in accordance with time of flight changes, the differential 187 acting to add or subtract the motor motion to the constant speed motion imparted to the chains by the motor 129. Since the variable advance of the chains in accordance with changes in the time of flight is on the reader sides of the chains, the length of chain between the recording and reading points and therefore the time interval that elapses before the reading of the records corresponds exactly to one-half the time of flight existing at the time the chain cars are read, not when they are set.

The system of prediction above described possesses numerous advantages over prior practice. One advantage is the greater accuracy that may be achieved through the averaging of the measurements which results from basing the prediction on the determination of spaced positions of the target instead of on instantaneous rates of target motion. By making the past time interval above referred to proportional to the time of projectile flight, a longer base of averaging is employed for the longer target ranges.

The computer employed has the substantial advantage of being less subject to scale factor errors than the mechanisms heretofore employed and the provision for an unlimited motion in azimuth greatly simplifies the apparatus required.

Correction for non-linear flight

Assume for example that the target being tracked is moving in a path L' (Fig. 28) lying in a plane through the point O of observation and having uniform curvature. At the instant the target arrives at B, the director above described will compute the future position C on a line through B and the measure past position A. In view of the curved line of flight, the target actually passes through a point B' after the lapse of the computed time of flight. This becomes a new present position which together with a new past position A' controls the prediction of a new future position C' which also deviates from the actual future position B'' after the lapse of the computed time of flight from B'.

The improved correcting mechanism about to be described measures the sense and extent of the deviation CB' and adds this difference algebraically to the current computed position C' so that the prediction made by the director when the target is a B' will locate the future position at B'' instead of at C'. In view of the correction, this predicted position coincides with the actual target position following the lapse of the computed time of flight from B', the line of flight changing at a uniform rate.

More particularly, the improved method of correcting for non-uniform flight involves the steps of continuously comparing the values of the measured present coordinates with the values previously computed for a time corresponding to the present, and adding the differences ascertained by such comparison to the coordinates of the future position being predicted on the basis of the present position. The process is continuous so that after the target has been followed for one and one-half times of flight, the corrections will just compensate for non-uniform flight and the target position actually measured at any instant will coincide with the previously computed position for that instant provided that the deviation from linear flight continues at a constant rate.

The comparison above referred to is made by continuously recording on separate traveling carriers the values $r_c$, $\theta_c$, and $\phi_c$ of the computed future coordinates as set up on the future indicators 355, 356, and 357, continuously reading these records at a time corresponding to the present, that is, advanced from recording position by the computed time of flight, and comparing the coordinate values thus read with the present values $r$, $\theta$, and $\phi$ being measured and set up in the indicators 21, 22, and 23 whereby to determine the sense and amount of the differences that constitute the corrections to be combined with the respective coordinates of the future target position then being predicted.

*Advance of future record carriers.*—Referring now to Figs. 10, 15, and 29 to 32, the computed future azimuth, range and altitude coordinates are recorded on chains 501, 502, and 503 which are identical in construction to the present record chains 91, 92, and 93. A detailed description is therefore unnecessary, the parts of the chains and the associated devices bearing the same reference numerals with the addition of the exponent $f$. The cars and the control lugs $101^{fz}$, $101^{fzz}$, $101^{fr}$ and $101^{fa}$ of these chains are positioned by setters $125^{fz}$, $125^{fr}$, and $125^{fa}$ which are actuated by the shifting of bars $133^{fz}$, $133^{fzz}$, $133^{fr}$, and $133^{fa}$ the lugs coacting with feelers $180^{fz}$, $180^{fr}$, and $180^{fa}$ which are on slides $194^{fz}$, $194^{fzz}$, $194^{fr}$, and $194^{fa}$. The chains are advanced past the recording positions by sprockets $126^{f}$ and past the sensing position 505 by sprockets $182^{f}$ (Fig. 15). Cams $163^{f}$ and $214^{f}$ control the locking and release of the cars $109^{f}$. The only difference between the present and future record chains is that in the latter, the constant speed drive from the motor 129 through the shafts 439, 440 and gears 442 (see Fig. 15) is to the sprockets $182^{f}$ on the feeler side instead of to the sprockets $126^{f}$ on the setter side as with the present record chains.

The shafts $127^{f}$ of the sprockets $126^{f}$ are interconnected by gears 506 (Fig. 15) and driven through bevel gears 507, a shaft 508, and bevel gears 509 from the shaft 183 which, as previously described, is driven through the differential 187 so as to respond to the combined motions of the constant speed motor 129 and the motor 192 which is operated intermittently and selectively in opposite directions in accordance with changes in the computed time of flight. The sprockets $182^{f}$ are driven at constant speed from the shaft 440 through gears 510. Since the drive motions from the shaft 439 to the shaft 440 and from the shaft 508 to the first shaft $127^{f}$ are reduced in a 1 to 2 ratio by the gears 442 and 507, the future chains will be advanced at one-half the speed of the present chains and with the same spacing of the setting and sensing positions 504 and 505, the interval between these positions equals the time of flight instead of one-half the time of flight as in the case of the present record chains.

With the arrangement thus employed, the position of each chain car passing the sensing point corresponds to the coordinate value at a time prior to the reading time by an amount equal to the time of flight at the time the particular chain car was set. As a result, the future record chains provide a continuous record of the past computed target positions.

*Azimuth correction.*—By comparing Figs. 19 and 30, it will be seen that the future azimuth coordinates are set up on the chain 501 in the same way that the present coordinates are recorded on the chain 91. The bars $133^{fz}$ and $133^{fzz}$ of the setters $125^{fz}$ and $125^{fzz}$ are actuated by cams $168^{f}$ and $169^{f}$ (Figs. 29 and 32) which turn with the future azimuth indicator or sleeve 357. Thus, the rows of control lugs $101^{fz}$ and $101^{fzz}$ are shaped in accordance with the cam patterns and the changes in computed azimuth so as to form traveling records of this coordinate.

At the sensing position 505, the control lugs on the cars actuate shoes $198^{fz}$ and $198^{fzz}$ of feelers $180^{fz}$ and $180^{fzz}$ to position switches $204^{fz}$, $205^{fz}$, $204^{fzz}$, and $205^{fzz}$ and control the reversible follow-up motor 511 of a follow-up unit 512 (Figs. 29 and 30) which through appropriate reduction gearing turns a shaft 513 which carries a gear 514 meshing with a gear 515 with which cams $239^{f}$ and $240^{f}$ rotate. These cams are of the same shape as the setter cams $168^{f}$ and $169^{f}$ and their followers are on the slides $194^{fz}$ and $194^{fzz}$ through which the switches $204^{fz}$, $205^{fz}$, $204^{fzz}$, and $205^{fzz}$ are actuated to control the follow-up action so that the gear 515 is turned back and forth with changes in the computed future azimuth as sensed. A cam $246^{f}$ rotatable with the cams $239^{f}$ and $240^{f}$, actuates an arm $251^{f}$ and switches $255^{f}$ and $256^{f}$ to transfer the control of the motor 511 from one set of switches to the other so that the motion imparted to the gear 515 duplicates that of the future indicator 357 but later by an interval equal to the time of flight. Thus, the shaft 513 turns in accordance with the azimuth of the computed present position of the target and constitutes the indicator for the computed present azimuth.

To compare this computed azimuth with the actual present value $\phi$, the gear 514 on the indicator 513 drives a gear 516 connected to one terminal member of a differential 517 having its other terminal member driven by a gear 518 from the gear 36 which is positioned angularly in accordance with the actual present value of the azimuth coordinate as it is measured by tracking the target. If the target path is a straight line, the actual and computed values will be the same, and the intermediate gear 519 will occupy a neutral position in which no correction will be added. If however, the computed and actual values differ, for example, because the target is traversing a curved path, the differential 519 will move away from such position in a direction and by an amount corresponding to the deviation. Of course, the corrections are small so that a lever might be used instead of the differential gearing in making the comparison.

The correction thus determined is added algebraically to the computed value of the azimuth coordinate as transmitted to the azimuth Selsyn 405 from the future azimuth indicator 357. To this end, one terminal of a differential 520 is driven through a gear 521 from the gear 380 on the future azimuth indicator 357, and the other terminal carries a gear 522 driven by gears 523 from the intermediate gear 519 of the comparing differential 517. The intermediate 524 of the differential 520 drives the gear 386 of the azimuth Selsyn 405.

*Range correction.*—Referring to Figs. 29 and 32, the rack bar $133^{fr}$ for positioning the setter $125^{fr}$ to record the computed future range on the chain 502 meshes with and is shifted back and forth by a gear 525 on a shaft which is driven through gears 526 from the shaft 355 which, as previously described, is positioned angularly to register the future range as computed by the director. The control lugs $101^{fr}$ of the chain cars $100^{fr}$ thus positioned are carried to the sensing position 505 where they engage a shoe $198^{fr}$ and actuate switches $204^{fr}$ and $205^{fr}$ controlling the motor 527 of a follow-up unit 528 whose driven shaft 529 is connected to the rack bar $194^{fr}$ through gears 530 so as to impart the follow-up motion to the switches. In this way, the shaft 529 is positioned angularly to indicate the previously computed present value of the target range. This value is compared with the actual present value by a differential 531 having one terminal carried by the shaft and the other terminal carrying a gear 532 which is driven through gears 533 to the gear 169 on the present range shaft 21.

The intermediate 534 of the differential 531 will thus be positioned angularly in accordance with the difference between the computed and actual values of the present range. This correction is added to or subtracted from the motion transmitted from the future range indicator 355 to the time of flight cam. To this end, the intermediate gear 534 meshes with a gear 535 on one terminal member of a differential 536 having a gear 537 on its other terminal meshing with the last gear of the train 526 which is driven from the future range indicator or shaft 355. The intermediate gear 538 of the differential meshes with a gear 539 on the lower end of the shaft 420 which as previously described operates through the gearing 418 and 419 to turn the time of flight and quadrant elevation cams 434 and 407.

*Altitude correction.*—Referring now to Figs. 29 and 31, the rack bar 133$^{fa}$ for positioning the future altitude setter 125$^{fa}$ is actuated through gears 540 from the shaft or future altitude indicator 356. This coordinate is thus recorded at the position 504 on the control lugs 101$^{fa}$ of the chain 503. The lugs are advanced to the reading position 505 where they act on the shoe 198$^{fa}$ of the feeler 180$^{fa}$ and actuate switches 204$^{fa}$ and 205$^{fa}$. These switches control the motor 541 of a follow-up unit 542 to drive a shaft 543 which through gears 544 drives the rack bar 194$^{fa}$ to position the switches and produce the follow-up action. The shaft 543 thus indicates the computed value of present altitude. This is compared with the actual value then set up on the present altitude indicator 23. To this end, a differential 546 has one terminal member fast on the shaft 543 and the other terminal shaft 547 carrying a gear 548 which through a gear 549 is driven from the intermediate 23 of the differential gearing 61 which intermediate, as previously described, constitutes the present altitude indicator. The intermediate 550 of the differential 546 is of course moved in one direction or the other away from a neutral position in accordance with the differences between the computed and actual values of the present altitude, being disposed in such neutral position when these values coincide. This will be the case when the target path is straight.

The altitude correction thus ascertained is added to or subtracted from the computed future altitude coordinate by means of a differential 551 one terminal of which carries a gear 552 meshing with the intermediate gear 556. The other terminal carries a gear 553 which through a gear 554 and the gear 540 is driven from the future altitude indicator 356. The intermediate gear 555 of the differential 551 meshes with the gear 430 which, as previously described, operates through the gears 426, 427 and 429 to drive the nut 424 by which the elevation and time of flight cams 407 and 434 are positioned axially.

It will be observed from the foregoing that the computed future coordinates are corrected continuously by the addition or subtraction of increments of the proper sense and proportional in magnitude to the deviation of target coordinates in the present target position from the future coordinates computed for the present target position at a time lagging the present by exactly the time of flight corresponding to the present target position. Of course, if the target is traveling in a straight line and at uniform speed, all three of the computed and actual values of the present coordinates will be equal and no correction will be made assuming of course that no mechanical or tracking errors are made. If, however, the target traverses a path which deviates from a straight line and this deviation is uniform, as will be the case for example when the target path is a true arc, the deviation of one or more of the actual future coordinates from that predicted will be constant and will be offset exactly by the coordinate corrections thus introduced. As a result, the computed future target position thus corrected should coincide with the actual future position so that a hit should be scored. However, the correction will not become exact until after the lapse of an interval equal to one and one-half times of flight, that is, one-half a time of flight to establish the future prediction and one time of flight to make the correction fully effective. Of course, where the curvature of the target path does not change uniformly, the correction will not compensate exactly for the deviation from a straight path. It will, however, effect a substantial increase in accuracy particularly where the target deviation from a straight path remains of the same sense for the time necessary for the correction to become fully effective.

Modified director

As pointed out above, the polar coordinates defining the past and present target positions may be combined by direct extrapolation to compute the coordinates of a future target position. This will give the true future position only if there is no change in the rate of change of the polar coordinates during the computing periods, that is, if the second derivatives of these coordinates are zero. Of course, such a condition seldom obtains in the flight of an airplane. It has been found, however, that under certain conditions and for short ranges the error in prediction is surprisingly small so that this method of computation may be used to advantage.

In accordance with this method of computation, the present and past coordinate values are ascertained as above described and to the past value is added the difference between the past and present values multiplied by a fixed ratio $n$ which is a ratio of the distances AC/BC. Thus, Future range $(r_c) = n(r_b - r_a) + r_a$
Future altitude $(\theta_c) = n(\theta_b - \theta_a) + \theta_a$
Future azimuth $(\phi_c) = n(\phi_b - \phi_a) + \phi_a$ where the subscripts refer to the coordinates of the past, present, and computed future target positions A, B, and C.

Figs. 33 to 36 illustrate a simplified director for controlling the firing of a projectile not employing a timed fuse. For this purpose, the director operates to compute the future azimuth, the future elevation and a super-elevation correction which is a function of both range and elevation. In this director, the ratio $n$ above referred to is 2 instead of 3 as in the director first described. That is to say, the computed future target position is disposed beyond the present position a distance equal to the spacing of the past position from the present.

Using this value of $n$, the above equations may be simplified as follows:

$$r_c = 2r_b - r_a \qquad (1)$$
$$\theta_c = 2\theta_b - \theta_a \qquad (2)$$
$$\phi_c = \phi_b + (\phi_b - \phi_a) \qquad (3)$$

To simplify the disclosure, the parts in common with the predictor previously described are indicated by the same reference numerals and in many instances the duplicated mechanisms are shown schematically.

*General arrangement of parts.*—This apparatus is characterized by the mounting of substantially all of the moving parts common to the director first described on a frame structure shown at 560 (Figs. 33 and 35) having a central hub 561 supported by a thrust bearing 562 and rotatable about a vertical post 563 concentric with the azimuth axis 564. Two chains 91 and 91' instead of one are provided for recording the present azimuth and these are supported by the frame 560 on opposite sides of the post 563. Above these and also disposed on opposite sides of the frame axis are the future azimuth chains 501 and 501'. The chains 93 and 503 for recording the present and computed future values of altitude are disposed one above the other and adjacent the azimuth chains 91' and 501'. Similarly positioned adjacent the other azimuth chains 91 and 501 are the chains 92 and 502 on which the present and computed range coordinates are recorded. The cars 100 of the eight chains are locked and unlocked in the manner previously described, and the supports defining the chain loops are mounted on plates 565 (Fig. 35) which are interconnected to form a unitary frame slidable in guides 566 rigid with the revolving frame 560. As before, the setter sides of the present chains 91, 91', 92 and 93 are engaged by the drive sprockets 126 and the reader sides of the future chains 501, 501', 502, and 503 are engaged by the drive sprockets 183' all mounted on the frame 560 and driven at constant speed by the motor 129 which is mounted on the revolving frame and operates through gears 559 as shown in Fig. 35.

Variation in the speed of advance of the present chains past their readers and of the future chains past their setters to change the past and future time intervals is effected in this instance by shifting the chain loops in an endwise direction relative to the frame 560 and also relative to their constant speed driving sprockets 126' and 183'. This is accomplished by moving the plates 565 back and forth in accordance with changes in the time of flight, the driving power being supplied by a reversible follow-up mechanism 567 (Fig. 35) having a motor 568 and driving a pinion 569 which meshes with rack teeth 570 on one of the plates 565. The motor is controlled in a manner to be described later to vary the lengths of chain between the setters and feelers and establish the selected fixed ratio between the past or memory time represented by AB (Fig. 1) and the future time represented by BC and also to keep this future time equal to the time required for the projectile to travel from O to C.

*Ascertaining future corrected range.*—The present range is measured as before by the separate range finder and the measurement is transmitted to the accurate Selsyn 67 which controls the motor of the follow-up unit 70 to turn a pinion 571 in accordance with changes in the present range. The pinion meshes with rack teeth on the bar 133$^r$ which, in this form of predictor, constitutes the present range indicator. The bar carries the range setter 125$^r$ by which the control lugs 101$^r$ are shifted laterally of the chain 92 to record the changing range values. The record is read by engagement of the lugs with the shoe 198$^r$ (Fig. 36) of the reader 180$^r$. The shoe movements actuate switches 204$^r$ and 205$^r$ which control the motor 225 of the follow-up 224 which drives a pinion 572 and and with the follow-up action previously described, positions the rack bar 194$^r$ in accordance with the value of the past range. The bar thus constitutes the past range indicator.

The computed future range is obtained by solving Equation 1 above. This is accomplished by a differential preferably comprising a floating lever 573 pivoted at its center 574 on the present indicator or setter bar 133$^r$ and connected at its upper end to a link 575 which is connected at 576 to the bifurcated end 577 of the past indicator or bar 194$^r$. Extending from the lower end 578 of the lever is a link 579 paralleling the setter bar 133$^r$ and pivoted at 580 on the lower end of a second floating lever 581. For any given position of the past indicator 194$^r$, the pivot 580 will move a distance equal to twice the movement of the present indicator 133$^r$. Similarly, the motion of the pivot 580 due to movement of the past indicator 194$^r$ is equal to the latter movement but the direction is reversed so that such movement is subtracted in accordance with Equation 1. Accordingly, the instantaneous position of the pivot 580 represents the computed value of the range of the target in its future position C. The equalizing links 575 and 579 serve to eliminate foreshortening in the differential system.

To record the computed future range on the chain 502, the bar 133$^{fr}$ of the setter 125$^{fr}$ is connected rigidly by a bar 582 to an extension 583 of the link 579. The setter 125$^{fr}$ is thus actuated in accordance with the computed future range coordinate to record the changing values thereof. One time of flight beyond the setting position, the chain lugs 101$^{fr}$ actuate the feeler 180$^{fr}$ whose switches 204$^{fr}$ and 205$^{fr}$ control the follow-up motor 568 which operates, in a manner to be described presently, to cause movement of the reader bar 194$^{fr}$ back and forth axially in accordance with the changing values of the computed present range. At any instant, the bar position corresponds to the previously predicted value of the range coordinate for the present position B of the target.

This computed present value is compared with the actual present range by a differential comprising a lever 584 fulcrumed on a floating pivot 585 on the lower end of an arm 586 suspended from a pivot 587 on the frame 560. The upper end of the lever is connected by a link 588 to the bifurcated end 589 of the feeler bar 194$^{fr}$. The other end of the differential lever 584 is connected to links 590 carrying a cross-pin 591 which slides along a horizontal guideway 592 on the frame 560. Intermediate their ends, these links are pivotally connected to the upper end of a lever 593 fulcrumed at 594 on the frame 560 and connected at 595 to a link 596 which is pivotally connected to the extended end 597 of the present range indicator bar 133$^r$. The lever 593 thus receives the motion of the present indicator and applies it to the lever 584 whose pivot 585 is disposed in a neutral position when the computed and actual present values of the range coordinate are exactly equal. When these values differ, the pivot 585 moves in one direction or the other an amount corresponding to one-half of the deviation thereby determining the correction to be introduced. Thus, the lever performs the same functions as the differential gearing 531 in the predictor first described.

To modify the computed range value in accordance with this correction, the pivot 585 of the differential 584 is connected by links 599 to the pivot 598 of the floating lever 581 which latter pivot is supported on the lower free end of arms 600 which are suspended from a pivot 601 paralleling the pivot 587. A pivot 602 on the upper end of this lever is connected through an equalizing link 603 to a horizontally slidable bar 604. It will be observed that the center 598 moves one-half the amount of the correction to be introduced and that this motion is doubled by the lever 581 so that the full value of the correction is added, the bar 604 thus being positioned in accordance with the corrected future range. It will be observed that the lever 581 acts in the same way as a differential 536 to incorporate the correction.

*Variable advance of chains.*—In this form of predictor, the motor 568 acts as a servo not only for shifting the plates 565 back and forth to vary the advance of the present chains past their sensing positions and the advance of the future chains past their setting positions, but also functions to produce the follow-up motion of the computed present range reader 194fr. To accomplish these two functions, the motor is controlled as above described from the reader switches 204fr and 205fr and a cam plate 605 mounted on one of the plates 565 extends transversely of the bar 604. A follower 607 on the bar 604 is urged by a spring 608 into engagement with an inclined surface 606 of the cam. The motion of the plate 565 is thus transmitted back to the contacts of the feeler switches through the medium of the slide 604, links 603, lever 581, links 599, and lever 584 so as to produce the follow-up action. As a result, the motor 568 is operated intermittently and the feeler bar 194fr and also the chain supporting plates 565 are positioned accurately in accordance with the changing values of the corrected future range, and the spacing of the setting and sensing positions on all of the chains is varied accordingly while maintaining the fixed ratio above referred to between the past and future times. When the computed value of the present range is decreasing, the cam 605 will be retracted and the bar 604 will be permitted to move to the right (see Figs. 33 and 36) under the action of the spring 608, the plates 565 being retracted to reduce the length of chain between the setting and sensing positions. The cam surface 606 is shaped so that the time of flight is a function of the corrected future range.

*Ascertaining corrected elevation.*—The present altitude coordinate is measured by observing the target through the telescope 55 whose motion relative to the revolving frame 560 is, as in the geometrical predictor, transmitted directly to the present altitude indicator which herein comprises the bar 133a carrying the setter 125a of the chain 93. The motion is transmitted from the telescope shaft 26 through spiral gears 610 and a shaft 611 to a pinion 612 meshing with rack teeth on the setter bar 133a.

The fingers 101a operate the reader 180a to actuate the switches thereof that control the follow-up motor 229 which, through a pinion 609 meshing with teeth on the reader bar 194a, positions the latter to indicate the altitude coordinate at the past time. Through a system of links and differential levers identical to those used in determining the computed future range and shown on the right side of Fig. 33, the past and present altitude coordinates are combined by extrapolation to solve Equation 2 above and compute the future position C and position the setter 125fa so as to record the computed future altitude on the chain 593. Solution of the equation is effected by the lever 573'. The parts of the differential system are indicated by primed numbers corresponding to those of the range system above described.

The switches of the chain feeler 180fa control the follow-up motor 543 which through the pinion 546 shifts the bar 194fa whose position indicates the computed value of the present altitude coordinate. Through the lever 584' this is compared with the actual value of the present altitude to determine the future altitude correction represented by the position of the pivot 585'. This is added by the lever 581' to the computed future altitude to produce a motion of the pivot 602' and a slide 614 corresponding to the corrected value of the future altitude coordinate.

*Computing quadrant elevation.*—The elevation coordinate is transmitted to the gun or projector from an accurate Selsyn 615 which is actuated in accordance with the corrected altitude coordinate modified by a correction known as super-elevation which compensates satisfactorily for trajectory errors. This is accomplished by a differential lever 616 supported by and pivotally connected at its lower end to the corrected future altitude indicator on slide 614. The opposite end is pivotally connected to a link 617 which in turn is joined to a rack bar 618 meshing with a pinion 619 on the shaft of the Selsyn. The super-elevation correction is applied through a bar 620 paralleling the bars 614 and 617 and connected to a center pivot 621 on the lever 616.

The super-elevation correction is represented by the formula $$\frac{Kg}{2v} R_f \cos \theta_f$$

where $R_f$ is the corrected future range determined by the position of the slide 604, $\theta_f$ is the corrected future altitude determined by the position of the slide 614, $g$ is gravity, $v$ is the projectile velocity, and $K$ is a constant.

The correction is ascertained by adding the logarithms of the functions $$\frac{g}{2v} R_f \text{ and } \cos \theta_f$$

by means of differential gearing 623 (Fig. 33) of the planetary type having its sun gear 624 fast on a vertical shaft 625 which carries a cam 626 whose surface 627 is urged by a torsion spring 628 into contact with a follower roller 629 carried by the ring shaped end 630 of the bar 604. The surface 627 is contoured so that the bar 604, moving in accordance with the computed future range, turns the shaft 625 and therefore the differential terminal in accordance with $$\log \frac{g}{2v} R_f$$

A follower roller 630' on the bar 614 engages a cam 631 whose surface 632 is contoured so that a sleeve 633 carrying the cam turns in accordance with log cos $\theta_f$. This sleeve carries the ring gear terminal 634 of the differential.

The planet gear 635 is carried by an arm 636 on a shaft 637 which constitutes the intermediate of the differential and thus is turned in accordance with $$\log \frac{g}{2v} R_f \cos \theta_f$$

The shaft carries an anti-logarithm cam 638 whose surface 639 contacts a follower roller 640 on the slide 620 and is so shaped as to produce a motion of this slide equal to one-half the superelevation correction whose logarithm is represented by the angular position of the shaft 637. Since the follower is connected to the center pivot 621 on the lever 616, its movement is doubled by the lever and added to that of the corrected future altitude indicator bar 614 to cause actuation of the Selsyn 615 in accordance with the correct quadrant elevation. The constant $$\frac{K}{2}$$

may be incorporated in the scale factor of the antilog cam 638 or any of the other cams.

*Computing future azimuth.*—The telescope 24 by which the target is tracked in azimuth is, in this simplified director, carried by the frame 560 which therefore turns about the axis 564 in accordance with changes in the present azimuth coordinate. To thus support the telescope, the shaft 26 is journaled in bearings 642 rigid with the top of the frame so that the telescope will swing relative to the frame in elevation only. With this arrangement, the cam pattern which controls the recording of present azimuth is stationary and is concentric with the frame axis 564 so that its position relative to the frame is a measure of the present azimuth angle. Only one such cam 168 (Figs. 33 and 34) is required because in this instance the followers 174 and 174′ for actuating the setters 125$^z$ and 125$^{zz}$ contact the cam inclines 170 and 172 on diametrically opposite sides of the axis 564. The other pattern cams 239, 168$^f$, and 239$^f$ are similarly constructed and arranged concentric with the axis 564 and loose on the post 563. Each acts on the associated setter or produces the follow-up action of the associated feeler in the same way as in the director first described. As will appear presently, these cams 239, 168$^f$, and 239$^f$ are positioned relative to the rotatable frame 560 in accordance with the values of the past azimuth, the computed future azimuth and the computed present azimuth, the same as the stationary cam 168 is positioned relative to the same reference point to indicate present azimuth. Accordingly, the cams may, by relating their angular positions to the rotatable frame 560, be considered as indicators for the respective coordinate values.

The bars 133$^z$ and 133$^{zz}$ whose followers 174 and 174′ engage the cam inclines 170 and 172 are actuated in accordance with changes in present azimuth and the control lugs 101$^z$ and 101$^{zz}$ are set on the traveling carriers to form the azimuth records 87 and 87′. Similarly, the followers 243 and 243′ on the reader bars 194$^z$ and 194$^{zz}$ engage opposite sides of the cam 239. These act in conjunction with the shoes of the feelers 180$^z$ and 180$^{zz}$ to actuate the switches 204$^z$, 205$^z$, 204$^{zz}$, and 205$^{zz}$ that control the follow-up mechanism 235 which is mounted on the frame 560. The motor 236 drives the pinion 233 meshing with the gear 232 rigid with the cam 239. The cam 246 for transferring the control of the follow-up alternately from one azimuth record to the other is rigid with the cam 239 and acts on a follower 249 to actuate the switches 255 and 256 in the manner previously described. In this instance, the transfer is made when the follower is contacting points 642.

The cam 239 or past position indicator is thus positioned relative to the frame 560 according to the value of the azimuth coordinate of the target in the past position A. The angular difference between the positions of the cams 168 and 239 is equal to the present minus the past azimuth ($\phi_b - \phi_a$) in Equation 3 above and this must be added to the present azimuth to give the computed future azimuth in accordance with the equation. This equation is solved in the present instance by gearing including an internally toothed segment 643 rigid with the cam disk 239 and the gear 232 and meshing with a gear 644 on the lower end of a shaft 645 which is journaled in a lateral extension 646 of the non-rotatable post 563. A gear 647 on the upper end of the shaft meshes with a gear 648 rotatable about the post and rigid with the cam 168$^f$.

It will be observed that a motion of the frame 560 in azimuth results in a corresponding angular displacement of the gear 648 relative to the frame thus accounting for the present azimuth ($\phi_b$) in the Equation 3. Since the cams 168 and 239 are respectively displaced relative to the frame 560 in accordance with the present and past azimuth values, the angular difference between these two cams constitutes ($\phi_b - \phi_a$). Through the gears 643, 644, and 647, this difference is added to the angular displacement of the gear 648 relative to the frame 560 so that this gear 648 and therefore the cam 168$^f$ becomes displaced relative to the frame 560 in accordance with the computed future azimuth, that is, the present azimuth ($\phi_b$) plus the difference between the present and past azimuth ($\phi_b - \phi_a$). Since the chains 501 and 501′ are mounted on the frame, the cam inclines 170$^f$ and 172$^f$ actuate the follower bars 133$^{fz}$ and 133$^{fzz}$ and the setters 125$^{fz}$ and 125$^{fzz}$ so as to set the lugs 101$^{fz}$ and 101$^{fzz}$ in accordance with the true values of the computed future azimuth.

At the sensing positions, these lugs act on the feelers 180$^{fz}$ and 180$^{fzz}$ whose switches govern the operation of the follow-up mechanism 512 (Fig. 33) the same as in the predictor first described (see Fig. 30). The follow-up 512 is carried by the frame 560 and drives a pinion 514 meshing with a gear 515 fast on the cam 239$^f$. Switches actuated by the cam 246$^f$ transfer the control of the follow-up motor alternately from one record to the other with the result that the cam 239$^f$ becomes angularly positioned relative to the frame 560 according to the previously computed azimuth angle at a time corresponding to the present.

Since the angular relation of the rotatable frame 560 and a stationary point such as the cam 168 is a measure of the actual present azimuth, the comparison of the azimuth angles for the actual and computed present target positions is made automatically, the difference being the angle that the cam 239$^f$ departs from the stationary reference point. That is to say, if the present target position coincides with the future predicted for the present time so that their azimuth coordinates are the same, the angular position of the cam 239$^f$ will coincide exactly with the cam 168. Accordingly, to incorporate any difference between the actual and computed azimuth angles and thereby ascertain the corrected future azimuth value, it is only necessary to add the angular motion of the cam 239$^f$ relative to the stationary cam 168 to the difference between the present and past azimuth represented by the angular position of the shaft 645, and then to position the rotor shaft 403 of the azimuth Selsyn 405 in accordance with the sum of these differences. The stator of this Selsyn is, in this simplified predictor, rigid with the rotatable frame 560 and concentric with the azimuth axis as shown in Fig. 33 so that its angular position relative to the stationary cam corresponds to the present azimuth value ($\phi_b$).

The addition, $\phi_b+(\phi_b-\phi_a)$ plus the correction for non-linear flight, may be effected by differential gearing 650 (Fig. 33) of the spur gear type having one terminal in the form of a gear segment 651 fast on a sleeve 652 which is concentric with the azimuth axis and rigid with the cam 239ᶠ so as to be actuated in accordance with the difference between computed present azimuth and the measured present azimuth and thereby incorporate the azimuth correction. The intermediate gear 653 meshes with a gear 654 on the upper end of the shaft 645 and thus is turned according to the angle that the computed future azimuth leads the present azimuth. The other terminal gear 656 of the differential is fast on the shaft 463 of the Selsyn. The gears 654 and 653 divide the motion in half so that if the gear 652 is stationary, that is, no correction is to be added, the terminal gear 656 will be turned the same amount as the shaft 645 and the cam 168ᶠ ($\phi_b-\phi_a$) and the rotor shaft 403 will be displaced angularly relative to the stationary stator according to $\phi_b+(\phi_b-\phi_a)$. Any movement of the cam 239ᶠ will rotate the sleeve 652 a corresponding amount introducing the correction which equals the angular displacement of the computed present azimuth cam 239ᶠ relative to the actual present azimuth cam 168.

We claim as our invention:

1. Predicting apparatus having, in combination, means for preparing separate records of the changing values of the instantaneous coordinates of a moving object relative to a projectile firing position, means for sensing said records to ascertain the coordinates of said object at a known but variable past time, mechanism selectively adjusted in accordance with the individual values of the present coordinates and the past coordinates as measured and sensed by said means to compute the time of projectile flight from said firing position to a future position of said object leading the present position by an interval related to the interval between the present and past times, and means operable automatically to vary the length of said past time interval and maintain said future interval equal to the computed time of flight.

2. The combination of three spaced arms each supported to swing about two intersecting perpendicular axes, each arm being extensible along a line projecting transversely of both of its axes, the distances between the axes intersections of adjacent pairs of arms bearing a predetermined relation to each other, universal joints at the other ends of said arms, mechanisms operable continuously to change the position of an intermediate arm and the length thereof in accordance with the values of the coordinates that locate a moving object in space, mechanism for similarly setting one of the terminal arms in accordance with the coordinates of the object at a known past time, a linkage pivotally connecting said joints and acting to maintain the joint of the third arm on a straight line including the other joints and also maintain said fixed ratio between the spacing of the joints of the first mentioned and third arms and those of the first mentioned and second mentioned arms whereby said third joint represents in miniature a future position of said object, the connection between said linkage and said third arm permitting of relative movement between the two in a plurality of directions corresponding to coordinates of said future object position, and individual follow-up actuators controlled in accordance with said relative movements and operable to position and lengthen said third arm in accordance with the values of said future coordinates.

3. In apparatus of the character described, the combination of a plurality of longitudinally extensible arms mounted at one of their ends to swing universally about spaced centers disposed on a line, bars pivotally connecting the free ends of said arms to maintain the pivots on a straight line, said bars being longitudinally extensible to permit variation in the spacing of the adjacent pivots, mechanism operable continuously to set the intermediate arm angularly in accordance with the changing value of azimuth and altitude of a moving object and to simultaneously adjust the length of the arm to correspond to the present range of the object, mechanism for similarly setting and adjusting the length of another of said arms in accordance with the coordinates of the object at a past time whereby the third of said arms becomes positioned angularly and lengthened longitudinally in accordance with the coordinates of the object at a future time leading the present in accordance with the ratio of the spacing of the moving pivots of said first and third arms to the spacing of the pivots of said first and second arms, and means for varying the length of the interval between said present and past times.

4. In apparatus of the character described, three points, means positioning two of said points to reproduce in miniature the present and past positions of an object moving in space, a bar rigidly supporting the point representing the present position, a slide on said bar rigidly supporting said past point on one side of the present point for movement toward and from the present point along a straight line connecting the two, a second slide supporting said third point on said line and on the opposite side of said present point, and mechanism connecting said slides and operating to move the latter relative to each other to maintain said third and past points spaced from said present point in a predetermined ratio.

5. In an apparatus of the character described, the combination of means supporting three points for individual movement in three dimensions about fixed pivot centers spaced along a straight line in a predetermined ratio, means mechanically connecting said points and maintaining them on a straight line and spaced along the line according to said ratio, mechanism operable to position the intermediate point to represent in miniature the present position of a moving object moving in space, mechanism operable to similarly position one of the other points to represent in miniature a past position of said object, said third point being mounted for movement relative to its support in three directions corresponding to the coordinates that locate it in space, and power driven actuators controlled by said relative movements and operating said support to follow-up the motions of said third point.

6. In an apparatus of the character described, the combination of means supporting three points for individual movement in three dimensions about fixed pivot centers spaced along a straight line in a predetermined ratio, means mechanically connecting said points and maintaining them on a straight line and spaced from each other according to said ratio, mechanism operable to position the intermediate point to represent in miniature the present position of a moving object, and mechanism operable to similarly position one of the other points to represent in miniature a past position of said object.

7. In an apparatus of the character described, the combination of means supporting three points for individual movement in three dimensions about fixed pivot centers spaced along a straight line in a predetermined ratio, means mechanically connecting said points and maintaining them on a straight line and spaced according to said ratio, mechanism operable to position the intermediate point to represent in miniature the present position of an object moving in space, mechanism operable to similarly position one of the other points to represent in miniature a past position of said object, and means for measuring the coordinates of said third point whereby to determine the location of a future position of said object.

8. In an apparatus of the character described, the combination of means supporting three points for individual movement in three dimensions about fixed pivot centers spaced along a straight line, means mechanically connecting said points and maintaining them on a straight line, mechanism operable to position the intermediate point to represent in miniature the present position of an object moving in space, mechanism operable to similarly position one of the other points to represent in miniature a past position of said object whereby said third point represents a future position of said object in miniature, said third point being adapted for movement relative to its support in three directions corresponding to the coordinates of said future object position, a plurality of concentric members respectively rotatable to position said support in said directions, and power driven operators controlled by said relative movements to actuate said members in directions and by amounts such as to cause said support to follow-up the motions of said third point.

9. In an apparatus of the character described, the combination of a longitudinally extensible arm, means supporting said arm to swing about fixed axes intersecting each other at right angles, individual reversible servo actuators respectively operable to lengthen or shorten said arm and swing the latter about the individual axes, rotary coordinate registers operated by the respective servo actuators, a universal joint having coacting elements, mechanism for variably changing the position of one element of said joint to reproduce in miniature the changing future position of a moving object, means mounted on the free end of said arm and supporting the other joint element for movement relative to the latter in three directions corresponding to the values of the coordinates defining the position of said first joint element, switches responsive to the respective relative movements and controlling the direction and extent of operation of the respective servo actuators to turn said registers and apply a follow-up action to said arm.

10. In an apparatus of the character described, the combination of a longitudinally extensible arm, means supporting said arm to swing about intersecting perpendicular axes, mechanism for measuring the coordinates of a moving object and positioning said arm and varying the length thereof so that a point on the arm represents in miniature the future position of said object, a plurality of movable coordinate indicators, and means controlled by the movements of said point and operable to position the respective indicators in accordance with the length of said arm and the angular positions thereof about said axes.

11. In an apparatus of the character described, the combination of, mechanism for computing the time of flight of a projectile to a future predicted position of a moving target, a traveling record medium of variable shape, means for shaping said medium in accordance with the continuously changing value of said time of flight, means for reading the recorded values after the lapse of a time interval equal to the dead time, means for comparing the relative magnitudes of the time of flight values being recorded relative to those being read, and means by which the length of said medium between recording and reading positions on said medium may be changed in accordance with different lengths of dead time.

12. In an apparatus of the character described, the combination of, mechanism for computing the time of flight of a projectile to a future position, an endless traveling carrier providing a record medium of variable shape, means operable to record the continuously changing values of said time of flight on said medium at a predetermined point, means for reading said record at a point spaced from said recording point, means for advancing said carrier past said points at constant speed, selectively adjustable means by which the amount of medium between said points may be varied, and means for determining the difference between the value of the time of flight being recorded and that being read.

13. In an apparatus of the character described the combination of, mechanism for computing the time of flight of a projectile to a future predicted position of a moving object, mechanism for keeping a mechanical record of the changing values of said time of flight, and means for comparing the values of the time of flight being recorded with the recorded value corresponding to a past time whereby to determine the change in the time of flight that occurred during the past time interval.

14. In an apparatus of the character described, the combination of, mechanism for computing the time of flight of a projectile to a future position, means operable to record the changing values of said time of flight, means for reading said record progressively at a point spaced from said recording point, means for determining the difference between the value of the time of flight being recorded and that being read, and mechanism for adding said difference to said time of flight.

15. In an apparatus of the character described, a frame, a plurality of cams of identical contour, each having alternate peripheral rises and falls, one of said cams being adapted to turn relative to the other cam, means supporting said frame and the second cam for relative rotation about a fixed axis, a traveling medium carried by said frame and adapted to be shaped variably to record coordinate values, means for advancing said medium relative to said frame past recording and reading positions, a follower for said second cam, means actuated by said follower and operable to shape said medium at said recording position in accordance with the changing contour of the cam effective on said follower in accordance with the extent of said relative rotation, a feeler moved in accordance with changes in the shape of said medium at said reading position, a follower for said first cam, and means controlled jointly by said feeler and said second follower and operating to position said first cam angularly in accordance with changes in the contour of said medium at said reading position.

16. In an apparatus of the character described, a frame, an annular cam having alternate rises and falls, a traveling record medium carried by said frame and adapted to be variably shaped, a follower for said cam carried by said frame, means supporting said cam and said frame for substantially unlimited relative rotation about a fixed axis, means for following a moving object and relatively turning said cam and frame about said axis in accordance with changes in the position of said object in azimuth, and mechanism actuated by said follower and operable to vary the shape of said medium to produce a pattern thereon determined by the shape of said cam and the extent of the motion of said object in azimuth.

17. In an apparatus of the character described, the combination of, a member mounted for unlimited rotary motion in either direction, two traveling record mediums of selectively variable shape, means responsive to the angular displacement of said member to set up on said mediums similar patterns each comprising inclined portions of slopes varying in direction and magnitude according to the direction and extent of displacement of said member, a second rotary member, and mechanism responsive to changes in the slope of said patterns first one and then the other to position said second member and cause the latter to follow the displacement of said first member.

18. In an apparatus of the character described, the combination of, a member mounted for unlimited rotary motion in either direction, mechanism for turning said member in accordance with the changes in the azimuth of a moving object whereby the angular position of said member corresponds to the instantaneous azimuth coordinate of the object, a traveling record medium, means controlled by the angular position of said element to form thereon two similar record patterns each having successive portions of reverse slope, a second rotary member, power operated follow-up means for actuating said second member, and feeler mechanism controlled first by one pattern and then by the corresponding portion of the other pattern and controlling said actuator to cause said second member to follow the movements of said first member but to lag the latter by an interval determined by the spacing of the recording and feeling positions on said medium.

19. In apparatus of the character described, the combination of, two traveling carriers adapted to be shaped variably, a rotary member, means for turning said member in accordance with changes in the azimuth coordinate of the object, cam means responsive to rotation of said member and operable to set said carriers to form identical patterns thereon, a rotary element, a second cam means having the same contour as said first cam means, and mechanism controlled alternately by corresponding portions of said two patterns and jointly by said second cam means and operable to turn said element and cause the latter to follow the motion of said member at a time determined by the spacing of the positions at which said carriers are set and read.

20. In apparatus of the character described, the combination of, two traveling carriers adapted to be shaped variably, a rotary member, means for turning said member in accordance with changes in the azimuth coordinate of the object, cam means responsive to rotation of said member and operable to shape said carriers to form identical patterns thereon each with reverse inclines alternating with each other, a rotary element, feelers engaging the respective patterns on said carriers, a second cam means having the same contour as said first cam means, followers for said second cam means, and mechanism alternately controlled jointly by one of said feelers and the corresponding follower and operable to turn said element in accordance with changes in the corresponding portions of said two patterns and reproduce the motion of said member.

21. In apparatus of the character described, the combination of, two traveling carriers adapted to be shaped variably, a rotary member, means for turning said member in accordance with changes in the azimuth coordinate of the object, cam means responsive to rotation of said member and operable to shape said carriers to form identical patterns thereon each having inclines reversing alternately, a rotary element, feelers engageable with the respective patterns on said carriers, a second cam means having the same contour as said first cam means, followers for said second cam means, a servo actuator for turning said element and said second cam means, means controlling the direction and extent of operation of said actuator and controlled jointly by one feeler and the corresponding follower, and means for transferring the control of said actuator from one follower and feeler to the others at times when the two are engaging corresponding parts of said patterns and second cam means.

22. In a predictor, the combination of a rotary member, two traveling carriers of selectively variable shape, cam means having annularly spaced inclines of one slope and intervening shorter inclines of reverse slope, said cam means being responsive to turning of said member and operable to shape said carriers to form continuous patterns thereon, a second cam means of the same shape as said first cam means, followers coacting therewith, a rotary element, and mechanism controlled jointly and alternately by corresponding portions of said patterns and corresponding inclines on said second cam means and operable to turn said element and cause the latter to follow the motion of said member, and means for transferring the control of said mechanism from one pattern and cam incline to the other at times when both coact to produce the same position of said element.

23. In an apparatus of the character described, the combination of, a member mounted for unlimited rotary motion about an axis mechanism for turning said member back and forth about said axis in accordance with the changing azimuth of a moving object, two traveling record mediums of selectively variable shape, and means responsive to the angular displacement of said member to set up on said mediums similar patterns each comprising inclined portions of slopes varying in direction and magnitude according to the direction and extent of displacement of said member.

24. In an apparatus of the character described, a frame mounted to turn about a fixed axis, a plurality of cams concentric with said axis and each having alternate peripheral rises and falls, one of said cams being stationary and the other being adapted to turn relative to said frame and the first cam, a traveling record medium of variable shape carried by said frame, means for advancing said medium relative to said frame past recording and reading positions, a follower for said first cam, means actuated by said follower and operable to shape said medium at said recording position in accordance with the changing contour of the cam effective on said follower in different angular positions of said frame, a feeler moved in accordance with changes in the shape of said medium at said reading position, a servo actuator for turning said second cam relative to said frame, a follower for said second cam, and means controlled by said feeler and said second follower and governing the operation of said actuator to position said second cam angularly in accordance with changes in the contour of said medium at said reading position.

25. In an apparatus of the character described, a frame mounted to turn about a fixed axis, an annular cam concentric with said axis having alternate rises and falls, a traveling record medium carried by said frame and adapted to be variably shaped, a follower for said cam carried by said frame, and mechanism actuated by said follower and operable to vary the shape of said medium to produce a record thereon of the changes in the angular position of said frame.

26. In a predictor, the combination of means for measuring continuously one of the coordinates that locate a moving object in its present position, a floating differential lever having one input part positioned in accordance with the changing values of said coordinate, means for preparing a continuous record of the changing values of said coordinate, mechanism for reading said record and positioning another input part of the lever in accordance with the value of said coordinate at a known past time, means for preparing a continuous record of the changes in the position of the output part of said differential lever, a second floating differential lever having one input part positioned in accordance with the changing present values of said coordinate, and means for reading said second record at a point corresponding to a future time leading the present by an interval related to the interval that said past time lags the present, whereby the output member of said second lever is positioned in accordance with the difference between the actual and computed values of the coordinate in the present position of said object.

27. Predicting apparatus having, in combination, means for preparing three separate records of the changing values of the three instantaneous coordinates of a moving object relative to a projectile firing position, means for sensing said records individually to ascertain the respective coordinates of said object at a known but variable past time, a computer mechanism selectively adjusted in accordance with the individual values of the three present coordinates and the three past coordinates as measured and sensed by said means to ascertain the coordinates of said object in a future position, means actuated in response to said ascertained coordinates to compute the time of projectile flight from said firing position to such future position, and mechanism actuated in accordance with the changing computed values of said time of flight and operable to correspondingly adjust the spacing between the points of recording and sensing of the coordinates on said records so as to maintain at all times a fixed relation between such spacing and said computed time of flight.

28. Predicting apparatus having, in combination, mechanism for measuring the three coordinates which locate the present position of an object moving in space, three traveling record carriers, recording devices individually adjusted in accordance with the changing values of the three coordinates as measured by said mechanism and operable to form on said carriers individual records showing said changing values, feelers operable continuously to sense said records of the individual coordinates at positions thereon spaced from the points of recording, and a computer having six input elements positioned in accordance with the changing measured values of said three measured present coordinates and with the changing positions of said feelers, said computer including three output elements and mechanism responsive to the changing positions of said six input elements to compute the position of said object at a future time and position the respective output elements in accordance with the values of the coordinates of the object in said future position.

DUNCAN J. STEWART.
HOWARD D. COLMAN.

REFERENCES CITED

The following references are of record in the file of this patent:

UNITED STATES PATENTS

| Number | Name | Date |
|---|---|---|
| 1,345,697 | Routin | July 6, 1920 |
| 1,387,551 | Meitner | Aug. 16, 1921 |
| 1,632,976 | Kourtzman | June 21, 1927 |
| 1,697,166 | Davis | Jan. 1, 1929 |
| 1,732,718 | Gluer | Oct. 22, 1929 |
| 1,811,688 | Gray | June 23, 1931 |
| 1,849,611 | Bussei | Mar. 15, 1932 |
| 2,009,264 | Henderson et al. | July 23, 1935 |
| 2,027,926 | Myers | Jan. 14, 1936 |
| 2,065,303 | Chafee et al. | Dec. 22, 1936 |
| 2,235,826 | Chafee | Mar. 25, 1941 |
| 2,283,922 | Fischer | May 26, 1942 |
| 2,313,136 | Fischer | Mar. 9, 1943 |
| 2,333,605 | Watson | Nov. 2, 1943 |
| 2,389,861 | Macomber | Nov. 27, 1945 |

FOREIGN PATENTS

| Number | Country | Date |
|---|---|---|
| 612,618 | Germany | Apr. 29, 1935 |
| 634,862 | Germany | Sept. 5, 1936 |